(12) United States Patent
Fuji et al.

(10) Patent No.: US 8,048,612 B2
(45) Date of Patent: Nov. 1, 2011

(54) POLYMER AND CHEMICALLY AMPLIFIED RESIST COMPOSITION COMPRISING THE SAME

(75) Inventors: Yusuke Fuji, Ibaraki (JP); Mitsuhiro Hata, Toyonaka (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 369 days.

(21) Appl. No.: 12/467,683

(22) Filed: May 18, 2009

(65) Prior Publication Data
US 2009/0317744 A1 Dec. 24, 2009

(30) Foreign Application Priority Data
May 21, 2008 (JP) ................................. 2008-133405

(51) Int. Cl.
*G03F 7/00* (2006.01)
*G03F 7/004* (2006.01)
*C08F 10/00* (2006.01)

(52) U.S. Cl. ..................... 430/270.1; 430/913; 526/280; 526/281; 526/308; 526/309

(58) Field of Classification Search ............... 420/270.1, 420/913; 526/280, 281, 308, 309
See application file for complete search history.

(56) References Cited

U.S. PATENT DOCUMENTS

| | | | |
|---|---|---|---|
| 5,968,713 A | 10/1999 | Nozaki et al. | |
| 6,239,231 B1 | 5/2001 | Fujishima et al. | |
| 7,175,963 B2 | 2/2007 | Fuji et al. | |
| 7,262,321 B2 | 8/2007 | Harada et al. | |
| 7,301,047 B2 | 11/2007 | Yoshida et al. | |
| 7,304,175 B2 | 12/2007 | Harada et al. | |
| 7,439,006 B2 | 10/2008 | Yoshida et al. | |
| 7,527,910 B2 | 5/2009 | Yamaguchi et al. | |
| 7,531,686 B2 | 5/2009 | Harada et al. | |
| 7,566,522 B2 | 7/2009 | Takata et al. | |
| 7,575,850 B2 | 8/2009 | Takata et al. | |
| 7,579,497 B2 | 8/2009 | Harada et al. | |
| 7,604,920 B2 * | 10/2009 | Shiono et al. | 430/270.1 |
| 7,611,821 B2 * | 11/2009 | Nishi et al. | 430/270.1 |
| 7,893,293 B2 * | 2/2011 | Akita et al. | 560/8 |
| 2003/0004289 A1 * | 1/2003 | Shin et al. | 526/171 |
| 2003/0235783 A1 * | 12/2003 | Liu et al. | 430/270.11 |
| 2007/0027336 A1 | 2/2007 | Yoshida et al. | |
| 2007/0122750 A1 | 5/2007 | Yamaguchi et al. | |
| 2008/0081293 A1 | 4/2008 | Harada et al. | |
| 2008/0086014 A1 | 4/2008 | Shigematsu et al. | |
| 2009/0142696 A1 | 6/2009 | Furuya et al. | |
| 2009/0264565 A1 | 10/2009 | Fuji et al. | |
| 2009/0306328 A1 * | 12/2009 | Yamagishi et al. | 528/272 |
| 2010/0112482 A1 * | 5/2010 | Watanabe et al. | 430/286.1 |
| 2010/0216071 A1 * | 8/2010 | Goldfarb et al. | 430/285.1 |

\* cited by examiner

*Primary Examiner* — Amanda C. Walke
(74) *Attorney, Agent, or Firm* — Birch, Stewart, Kolasch & Birch, LLP

(57) ABSTRACT

A polymer comprising a structural unit represented by the formula (Ia) or (Ib):

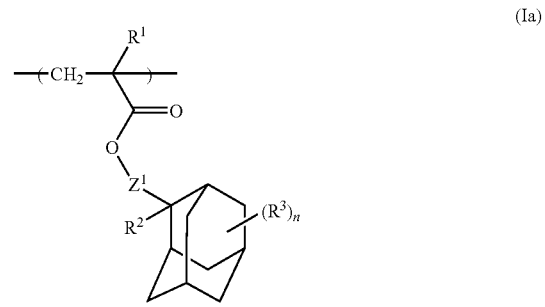

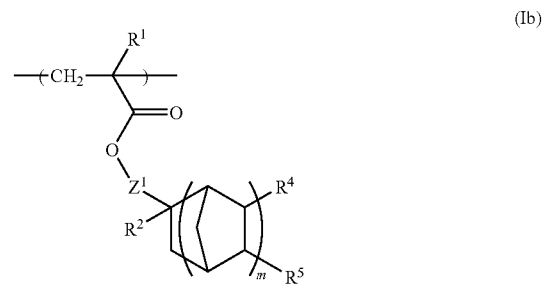

wherein $R^1$ represents a hydrogen atom etc., $R^2$ represents a linear, branched chain or cyclic C1-C8 alkyl group, $R^3$ represents a methyl group, n represents an integer of 0 to 14, $Z^1$ represents a single bond etc., k represents an integer of 1 to 4, $R^4$ and $R^5$ each independently represents a hydrogen atom etc., and m represents an integer of 1 to 3, a structural unit represented by the formula (II):

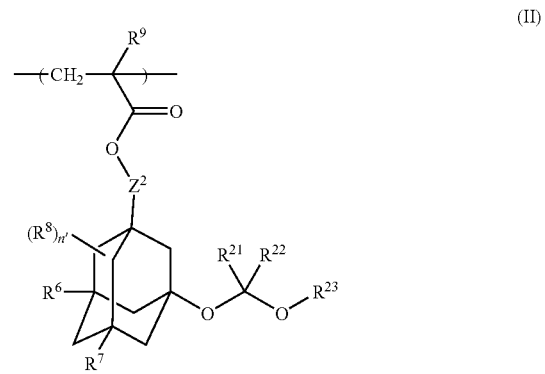

wherein $R^6$ and $R^7$ each independently represents a hydrogen atom etc., $R^8$ represents a methyl group, $R^9$ represents a hydrogen atom etc., n' represents an integer of 0 to 12, $Z^2$ represents a single bond etc., k' represents an integer of 1 to 4, $R^{21}$ and $R^{22}$ each independently represents a hydrogen atom etc., and $R^{23}$ represents a C1-C30 monovalent hydrocarbon group, and at least one structural unit selected from the group consisting of structural units represented by the formulae (IIIa), (IIIb), (IIIc), (IIId) and (IIIf)

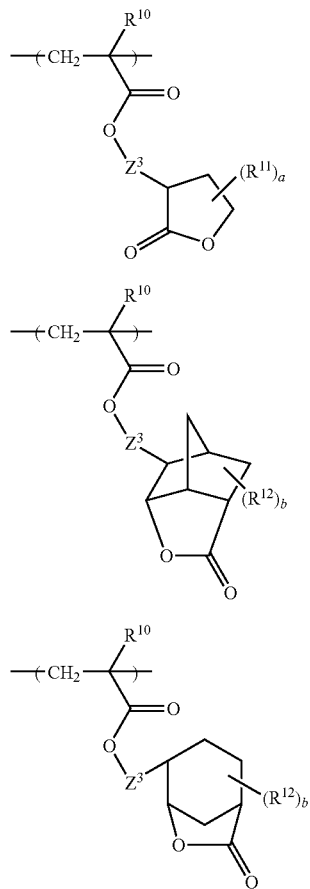

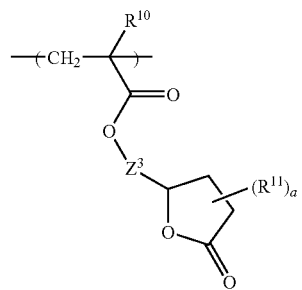

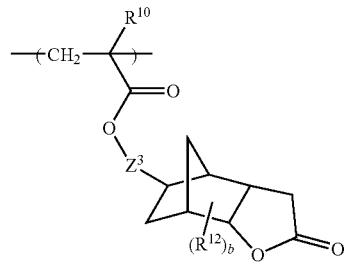

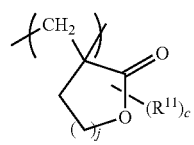

wherein $R^{10}$ represents a hydrogen atom etc., $R^{11}$ represents a methyl group, $R^{12}$ is independently in each occurrence a carboxyl group etc., j represents an integer of 0 to 3, a represents an integer of 0 to 5, b represents an integer of 0 to 3, c represents an integer of 0 to (2j+2), $Z^3$ represents a single bond etc., and k" represents an integer of 1 to 4.

6 Claims, No Drawings

POLYMER AND CHEMICALLY AMPLIFIED RESIST COMPOSITION COMPRISING THE SAME

This nonprovisional application claims priority under 35 U.S.C. §119(a) on Patent Application No. 2008-133405 filed in JAPAN on May 21, 2008, the entire contents of which are hereby incorporated by reference.

FIELD OF THE INVENTION

The present invention relates to a polymer and a chemically amplified resist composition comprising the same.

BACKGROUND OF THE INVENTION

A chemically amplified resist composition used for semiconductor microfabrication employing a lithography process contains an acid generator comprising a compound generating an acid by irradiation.

In semiconductor microfabrication, it is desirable to form patterns having high resolution and good pattern profile, and it is expected for a chemically amplified resist composition to give such patterns.

U.S. Pat. No. 5,968,713 A discloses a chemically amplified resist composition comprising a resin which comprises a structural unit derived from 2-methyl-2-adamantyl methacrylate.

U.S. Pat. No. 6,239,231 B1 discloses a chemically amplified resist composition comprising a resin which comprises a structural unit derived from 2-alkyl-2-adamantyl methacrylate and a structural unit derived from 3-hydroxy-1-adamantyl acrylate.

US 2005/0100819 A1 discloses a chemically amplified resist composition comprising a resin which comprises a structural unit derived from 2-isopropyl-2-adamantyl methacrylate, a structural unit derived from 3-hydroxy-1-adamantyl acrylate and a structural unit derived from 5-acryloyloxy-2,6-norbornenelactone.

WO 2007/046388 A1 discloses a chemically amplified resist composition comprising a resin which comprises a structural unit derived from 1-ethyl-1-cyclohexyl methacrylate, a structural unit derived from 3-tert-butoxycarbonyloxy-1-adamantyl acrylate and a structural unit derived from α-acryloyloxy-γ-butyrolactone.

SUMMARY OF THE INVENTION

The present invention is to provide a novel polymer and a chemically amplified resist composition comprising the same.

The present invention relates to the followings:

<1> A polymer comprising a structural unit represented by the formula (Ia) or (Ib):

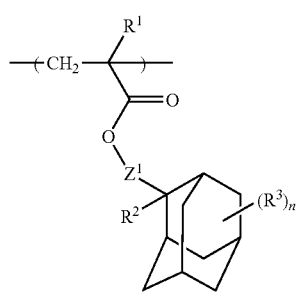
(Ia)

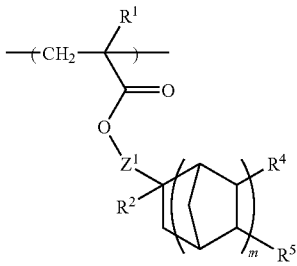
(Ib)

wherein $R^1$ represents a hydrogen atom or a methyl group, $R^2$ represents a linear, branched chain or cyclic C1-C8 alkyl group, $R^3$ represents a methyl group, n represents an integer of 0 to 14, $Z^1$ represents a single bond or —$[CH_2]_k$—COO—, k represents an integer of 1 to 4, $R^4$ and $R^5$ each independently represents a hydrogen atom or a C1-C8 monovalent hydrocarbon group which may have one or more heteroatoms, or $R^4$ and $R^5$ may be bonded to form a C1-C8 divalent hydrocarbon group which may have one or more heteroatoms and which forms a ring together with the adjacent carbon atoms to which $R^4$ and $R^5$ are bonded, or $R^4$ and $R^5$ may be bonded to form a carbon-carbon double bond between the carbon atom to which $R^4$ is bonded and the carbon atom to which $R^5$ is bonded, and m represents an integer of 1 to 3, a structural unit represented by the formula (II):

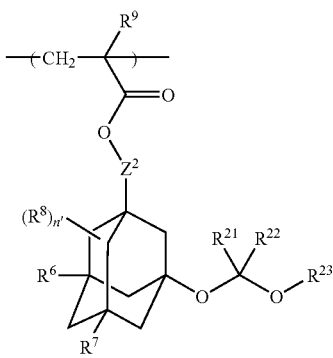
(II)

wherein $R^6$ and $R^7$ each independently represents a hydrogen atom, a methyl group or a hydroxyl group, $R^8$ represents a methyl group, $R^9$ represents a hydrogen atom or a methyl group, $n_1$ represents an integer of 0 to 12, $Z^2$ represents a single bond or —$[CH_2]_{k'}$—COO—, k' represents an integer of 1 to 4, $R^{21}$ and $R^{22}$ each independently represents a hydrogen atom or a C1-C4 alkyl group, and $R^{23}$ represents a C1-C30 monovalent hydrocarbon group, and at least one structural unit selected from the group consisting of structural units represented by the formulae (IIIa), (IIIb), (IIIc), (IIId) and (IIIf):

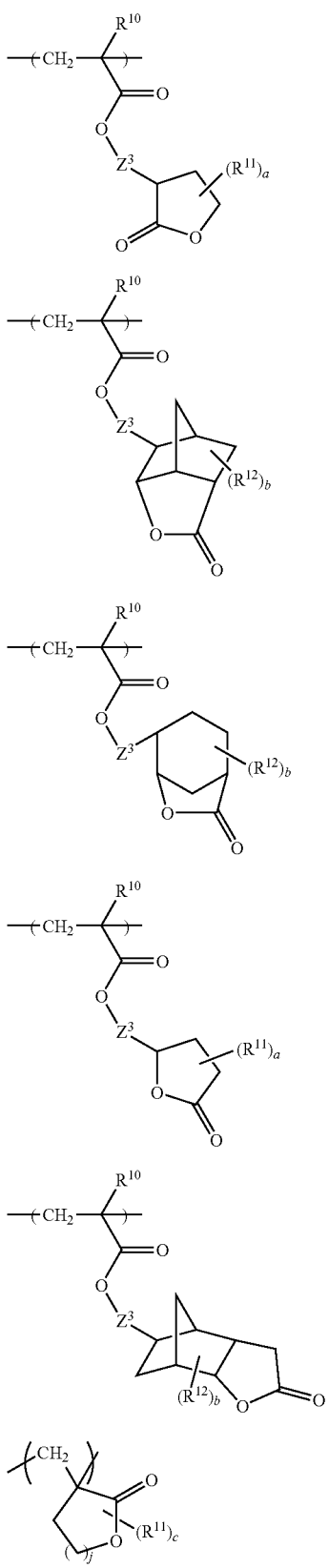

wherein $R^{10}$ represents a hydrogen atom or a methyl group, $R^{11}$ represents a methyl group, $R^{12}$ is independently in each occurrence a carboxyl group, a cyano group or a C1-C4 hydrocarbon group, j represents an integer of 0 to 3, a represents an integer of 0 to 5, b represents an integer of 0 to 3, c represents an integer of 0 to (2j+2), $Z^3$ represents a single bond or a $-(CH_2)_{k''}-COO-$ group, and k'' represents an integer of 1 to 4;

<2> The polymer according to <1>, wherein $R^{23}$ in the formula (II) is a C4-C10 monovalent alicyclic hydrocarbon group;

<3> The polymer according to <1> or <2>, wherein the polymer contains the structural unit represented by the formula (IIIb);

<4> The polymer according to any one of <1> to <3>, wherein the polymer further contains the structural unit represented by the formula (IV):

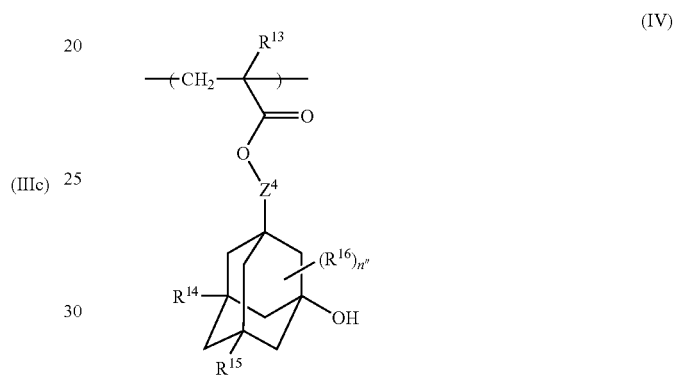

wherein $R^{13}$ represents a hydrogen atom or a methyl group, $R^{14}$ and $R^{15}$ each independently represents a hydrogen atom, a methyl group or a hydroxyl group, $R^{16}$ represents a methyl group, n'' represents an integer of 0 to 12, $Z^4$ represents a single bond or a $-(CH_2)-COO-$ group, and q represents an integer of 1 to 4;

<5> A chemically amplified resist composition comprising a polymer according to any one of <1> to <4> and an acid generator;

<6> The chemically amplified resist composition according to <5>, wherein the acid generator is a salt represented by the formula (V):

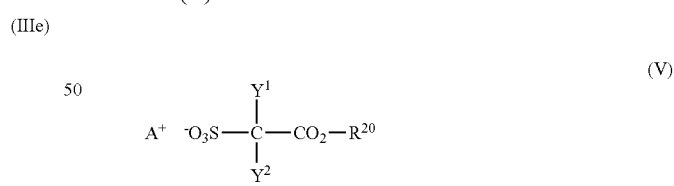

wherein $Y^1$ and $Y^2$ each independently represent a fluorine atom or a C1-C6 perfluoroalkyl group, $R^{20}$ represents a C1-C6 linear or branched chain hydrocarbon group or a C3-C30 monocyclic or polycyclic hydrocarbon group which may be substituted with at least one selected from the group consisting of a C1-C6 alkyl group, a C1-C6 alkoxy group, a C1-C4 perfluoroalkyl group, a hydroxyl group and a cyano group, and at least one $-CH_2-$ in the hydrocarbon group may be substituted with $-CO-$ or $-O-$ or at least one hydrogen atom in the hydrocarbon group may be substituted with a hydroxyl group, and $A^+$ represents an organic counter ion.

DESCRIPTION OF PREFERRED EMBODIMENTS

The present polymer comprises a structural unit represented by the formula (Ia) or (Ib):

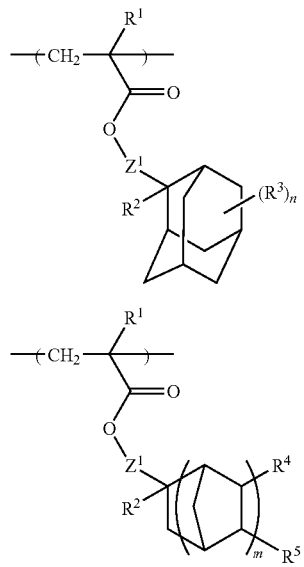

(hereinafter, simply referred to as the structural unit (Ia), (Ib), respectively),
a structural unit represented by the formula (II):

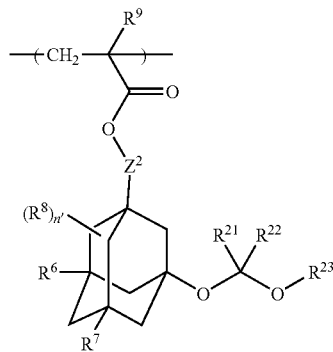

(hereinafter, simply referred to as the structural unit (II)), and at least one structural unit selected from the group consisting of structural units represented by the formulae (IIIa), (IIIb), (IIIc), (IIId) and (IIIf):

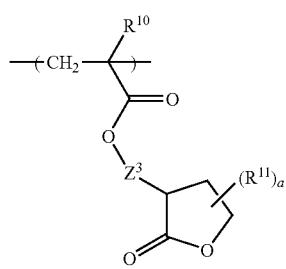

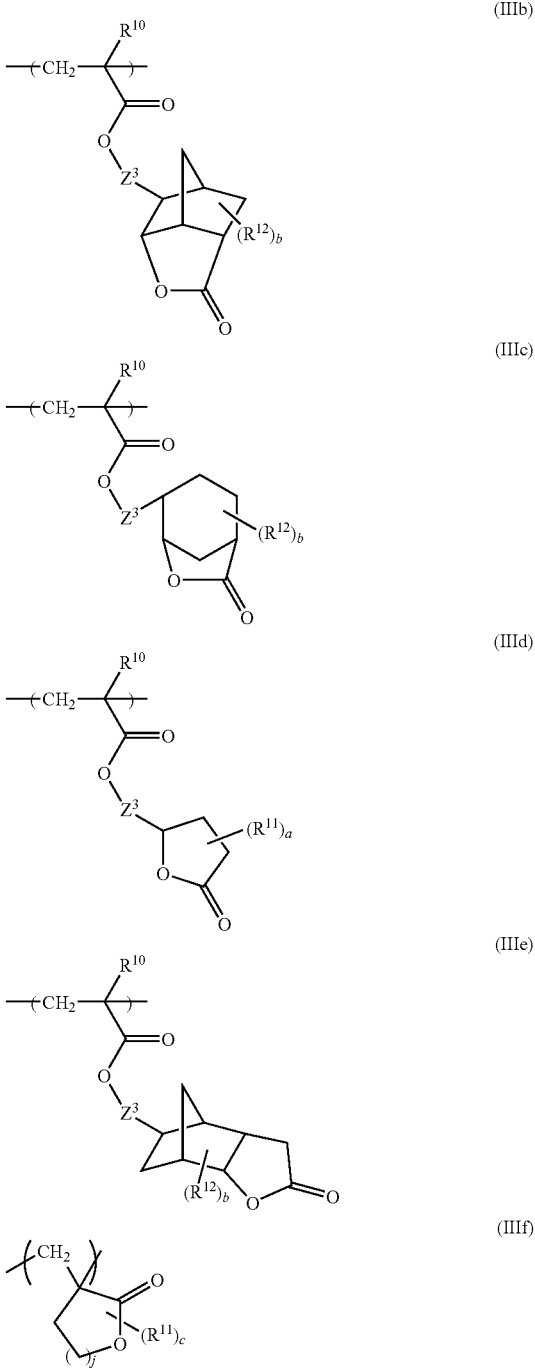

(hereinafter, simply referred to as the structural unit (IIIa), (IIIb), (IIIc), (IIId), (IIIf), respectively).

In the formulae (Ia) and (Ib), $R^1$ represents a hydrogen atom or a methyl group, and $R^2$ represents a linear, branched chain or cyclic C1-C8 alkyl group. Examples of the linear, branched chain or cyclic C1-C8 alkyl group include a methyl group, an ethyl group, an n-propyl group, an isopropyl group, an n-butyl group, an isobutyl group, a sec-butyl group, an n-pentyl group, an isopentyl group, a neopentyl group, an n-hexyl group, an n-heptyl group, an n-octyl group, a cyclopentyl group, a cyclohexyl group, a cyclooctyl group, a 2-methylcyclopentyl group, a 3-methylcyclohexyl group, a 4-methylcyclohexyl group, a 2,3-dimethylcyclohexyl group, a 4,4- dimethylcyclohexyl group, a 2-norbornyl group and a 5-methyl-2-norbornyl group, and a C2-C8 linear, branched chain or cyclic alkyl group is preferable.

In the formula (Ia), $R^3$ represents a methyl group, n represents an integer of 0 to 14, and n is preferably 0 or 1. $Z^1$ represents a single bond or —[$CH_2$]$_k$—COO—, and k represents an integer of 1 to 4. $Z^1$ preferably represents a single bond or —$CH_2$—COO—, and more preferably represents a single bond.

In the formula (Ib), $R^4$ and $R^5$ each independently represent a hydrogen atom or a C1-C8 monovalent hydrocarbon group which may have one or more heteroatoms, and m represents an integer of 1 to 3. Examples of the C1-C8 monovalent hydrocarbon group include a methyl group, an ethyl group, an n-propyl group, an isopropyl group, an n-butyl group, an isobutyl group, a sec-butyl group, an n-pentyl group, an n-hexyl group, an n-heptyl group and an n-octyl group.

$R^4$ and $R^5$ may be bonded to form a C1-C8 divalent hydrocarbon group which may have one or more heteroatoms and which forms a ring together with the adjacent carbon atoms to which $R^4$ and $R^5$ are bonded, and examples thereof include an ethylene group and a trimethylene group.

$R^4$ and $R^5$ may be also bonded to form a carbon-carbon double bond between the carbon atom to which $R^4$ is bonded and the carbon atom to which $R^5$ is bonded.

The structural units (Ia) and (Ib) are structural units having an acid-labile group in a side chain. In this specification, "an acid-labile group" means a group capable to eliminate by the action of an acid.

The present polymer may have any one of the structural units (Ia) and (Ib), and may have both of them.

The structural unit (Ia) is derived from the monomer represented by the formula (Ia-1):

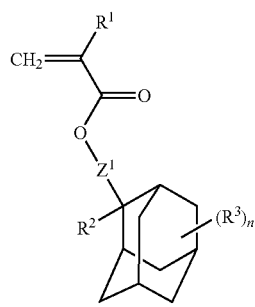

(Ia-1)

wherein $R^1$, $R^2$, $R^3$, $Z^1$ and n are the same as defined above.

Specific examples of the monomer represented by the formula (Ia-1) include the followings.

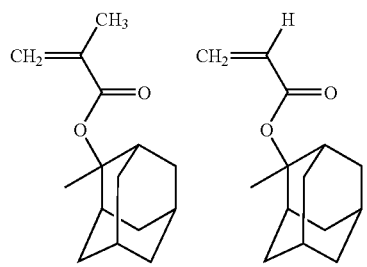

-continued

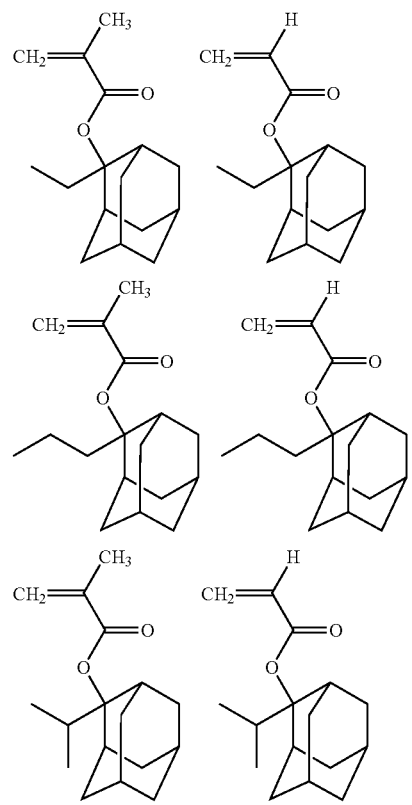

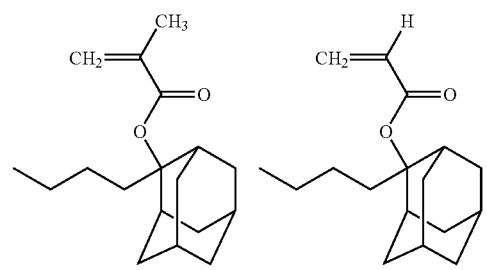

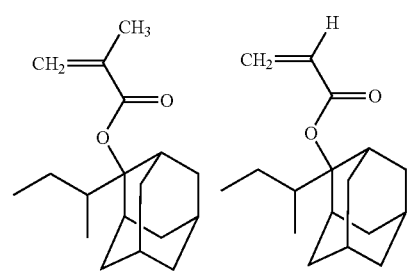

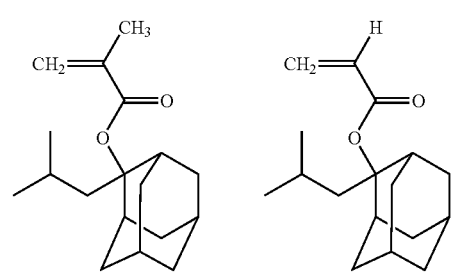

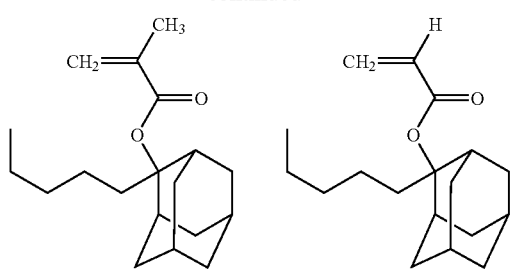
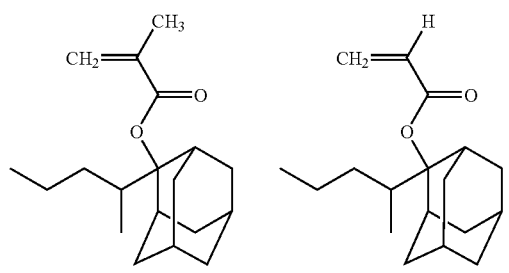
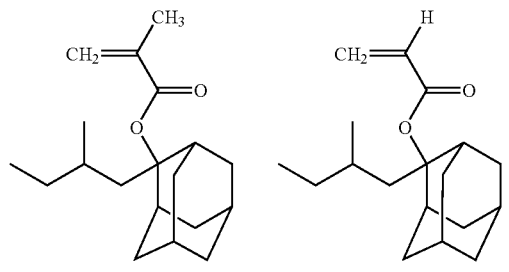
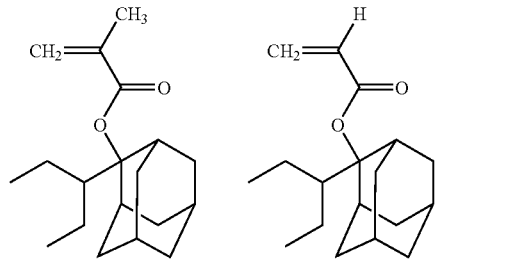
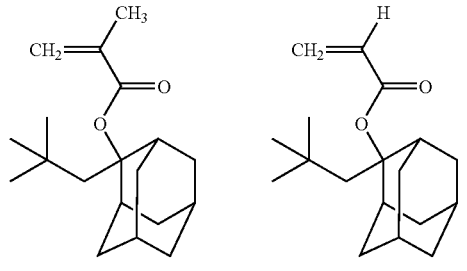
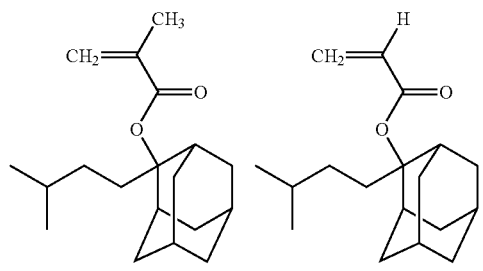
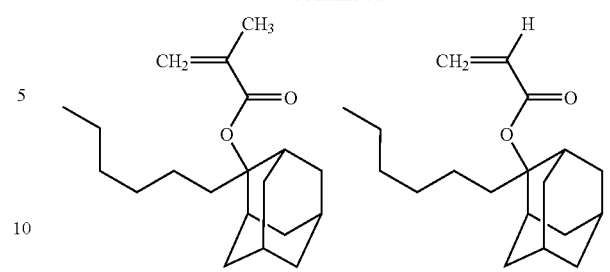
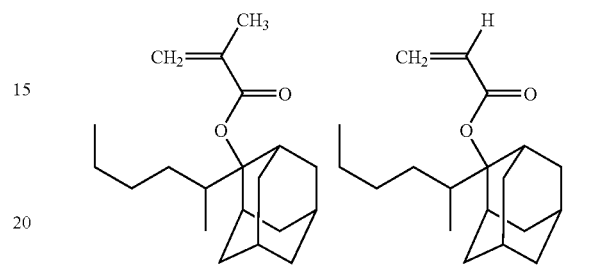
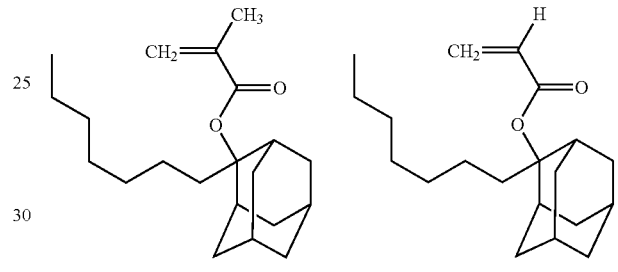
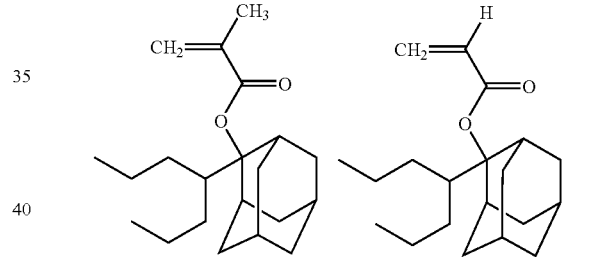
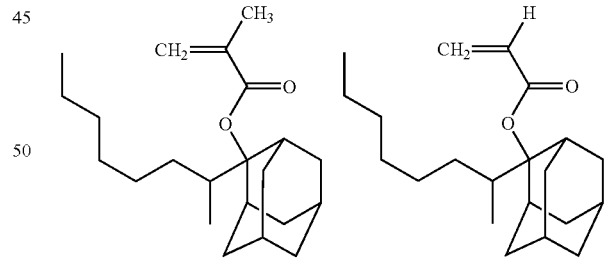
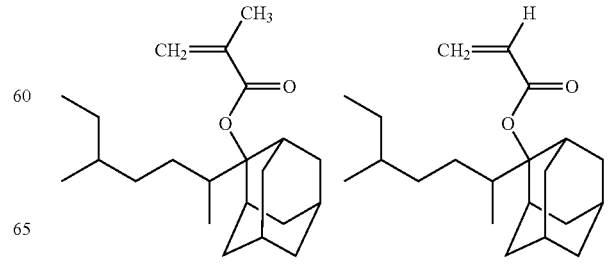

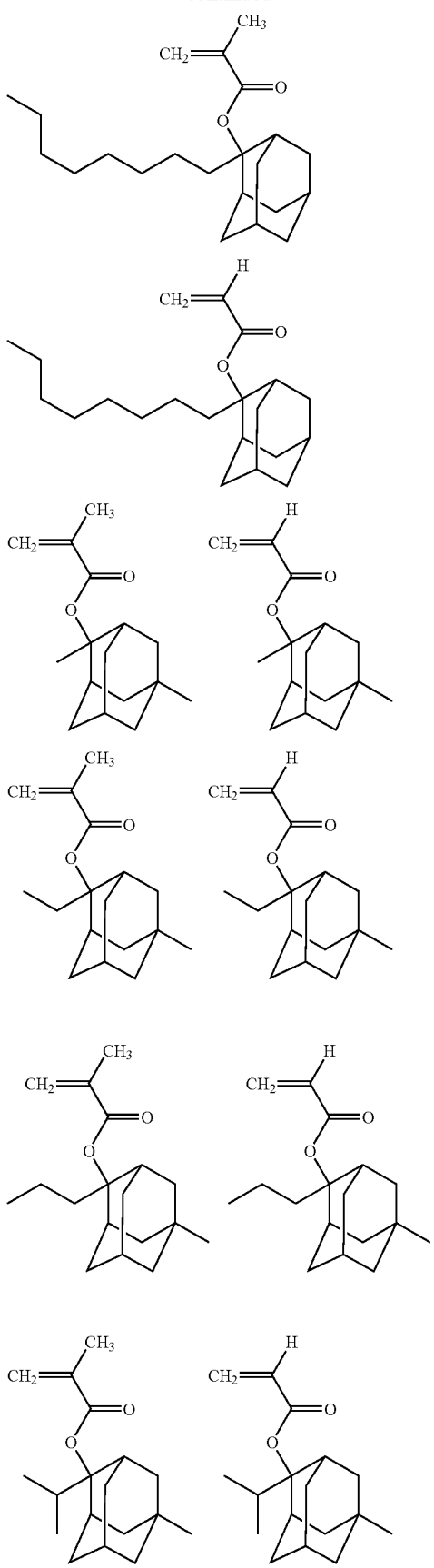
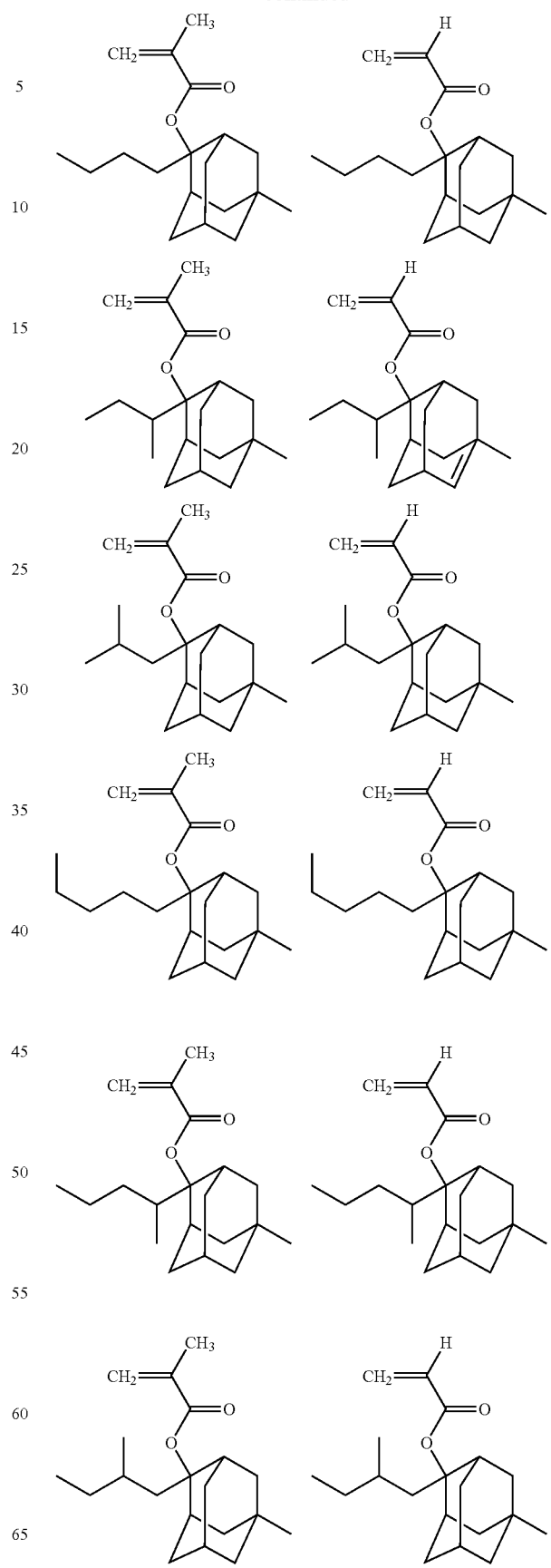

-continued
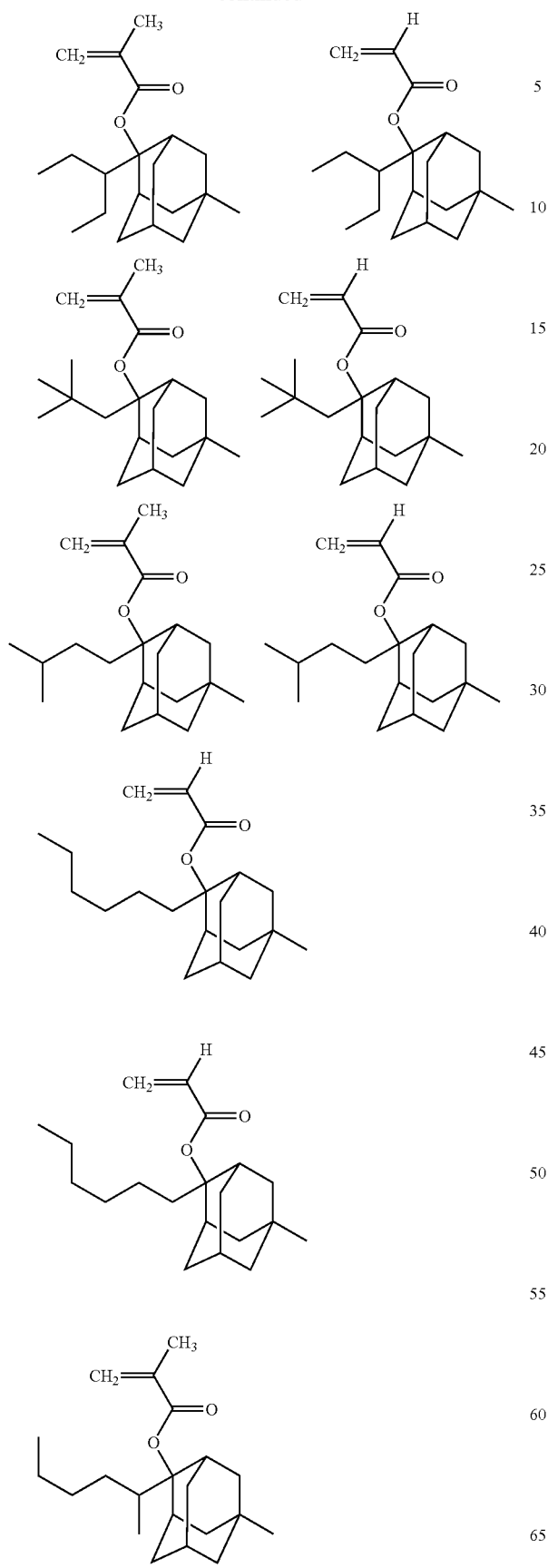
-continued
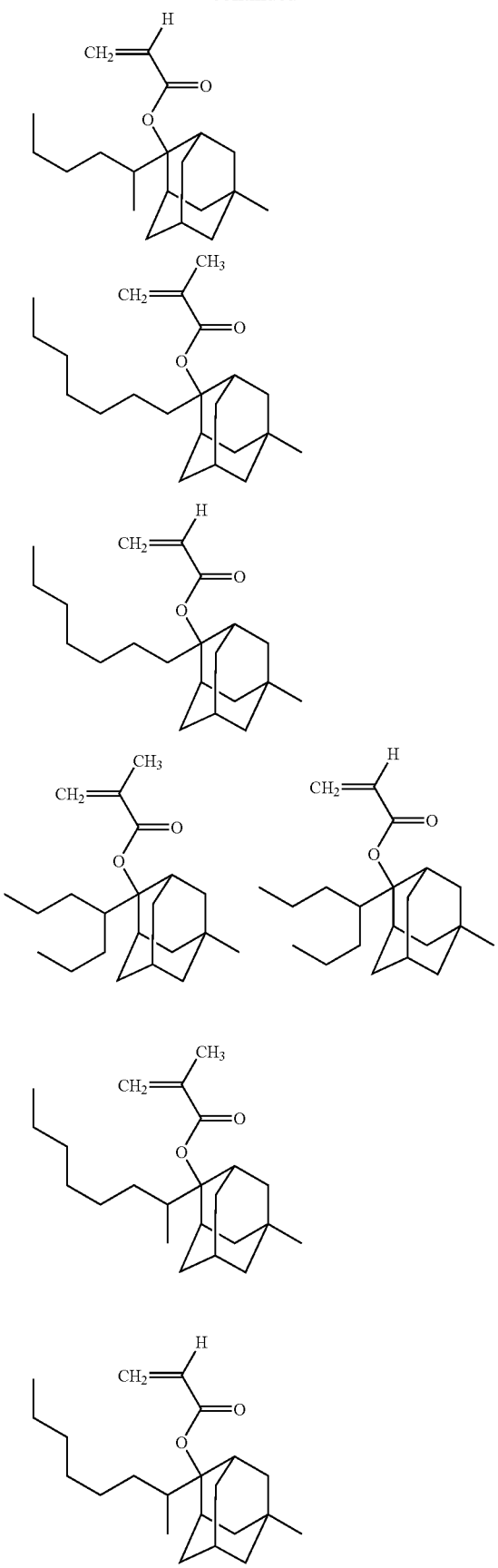

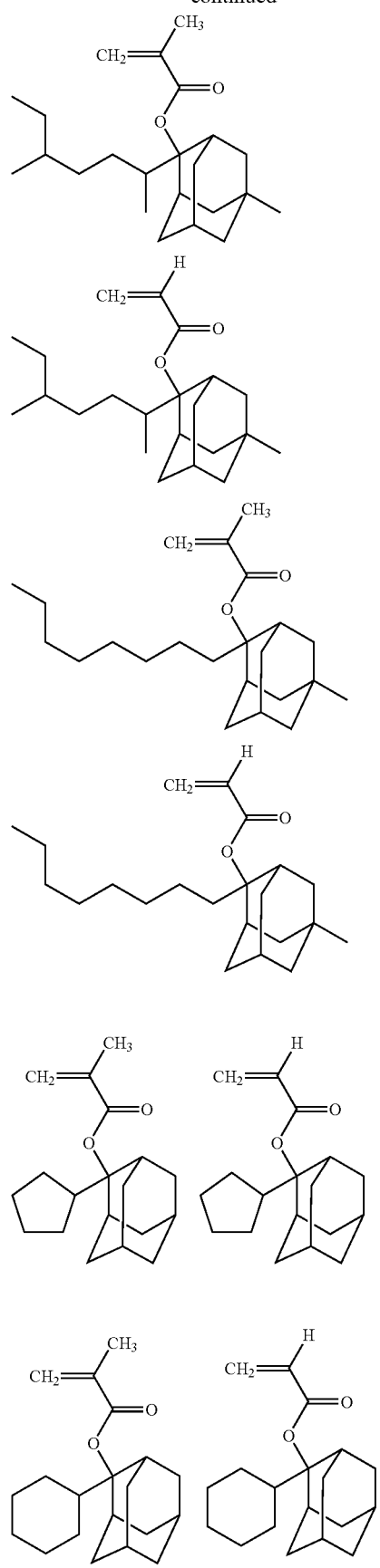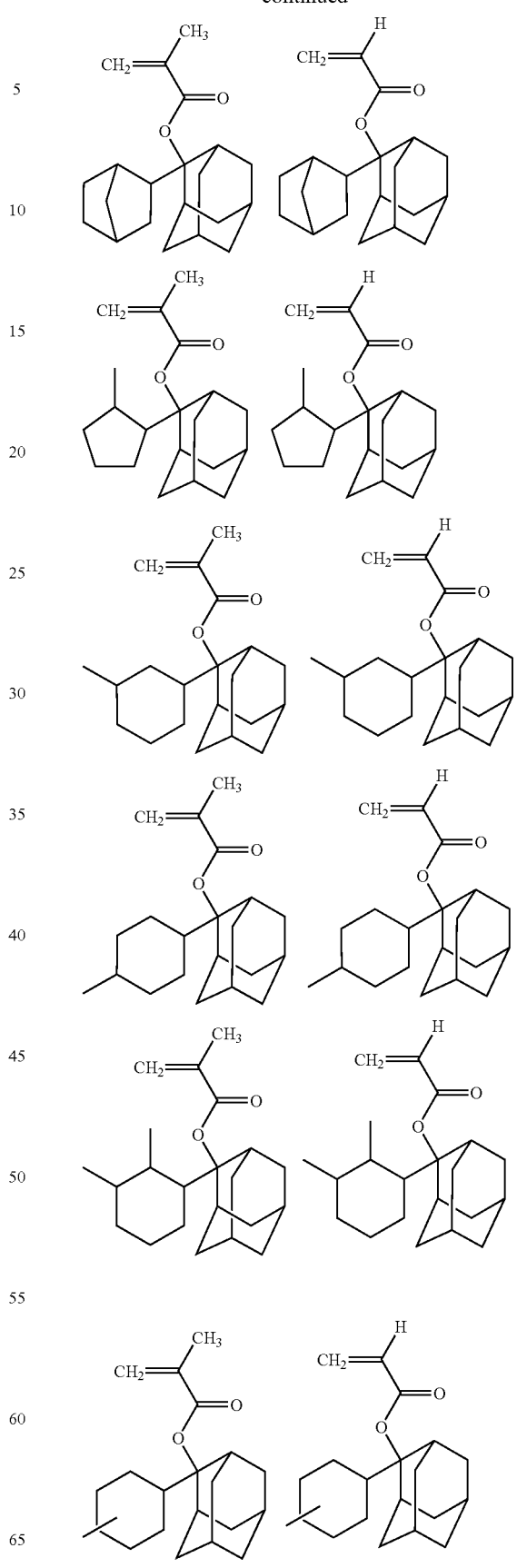

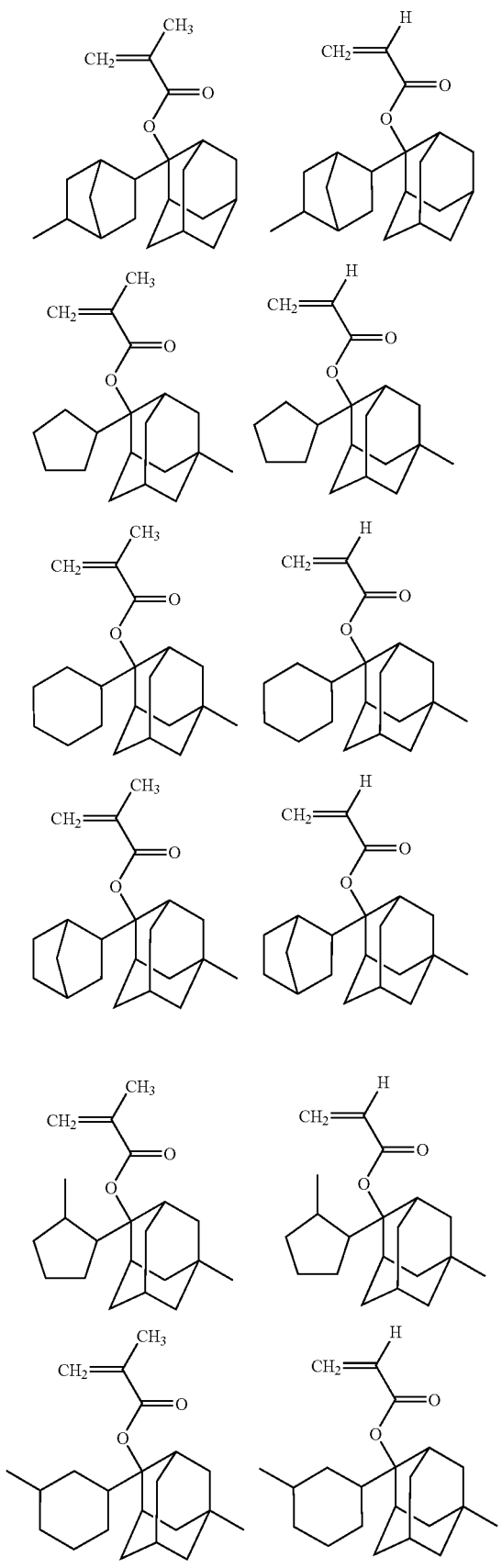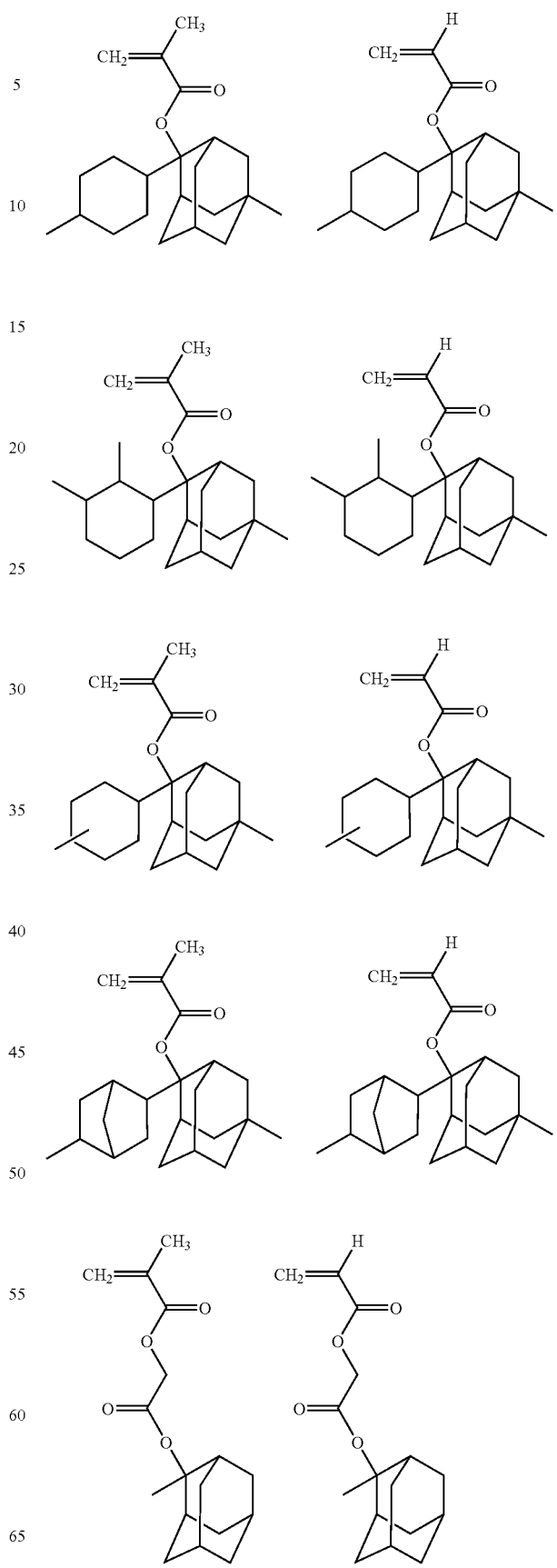

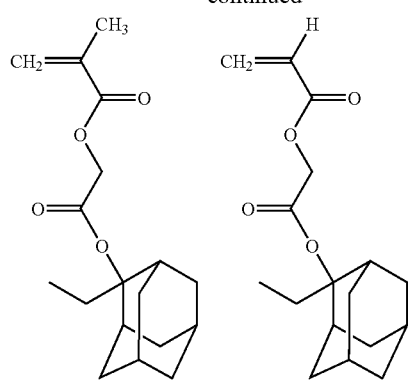
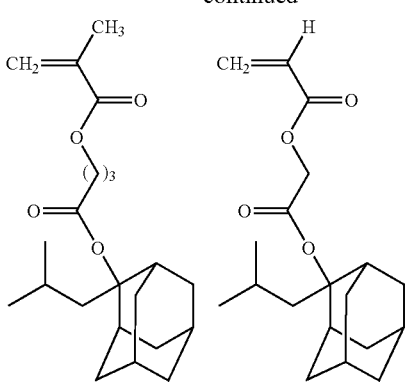
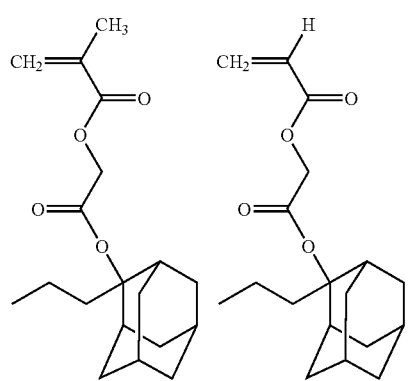
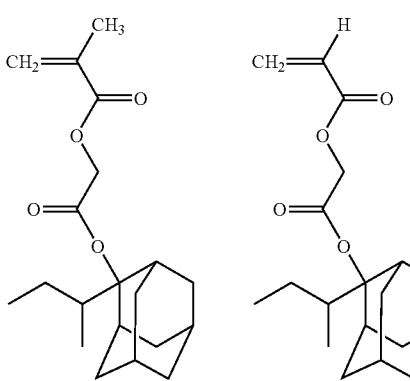
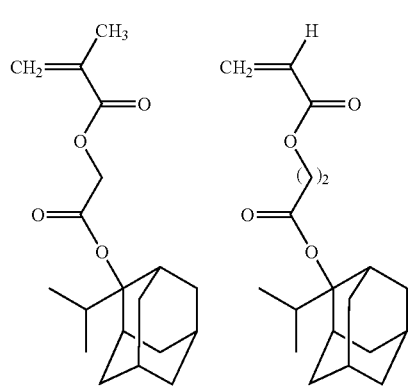
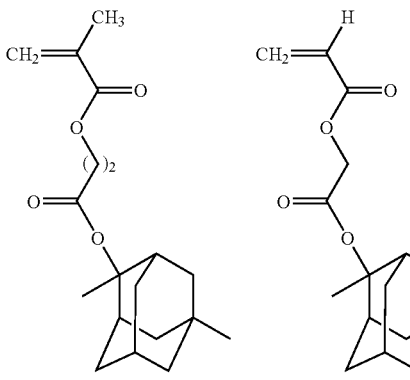
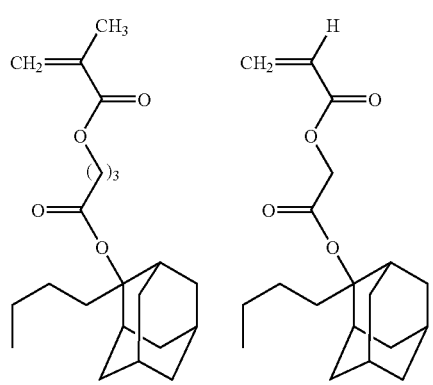
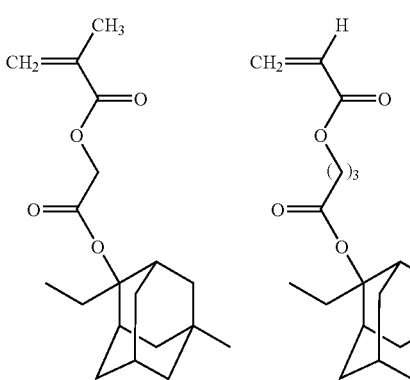

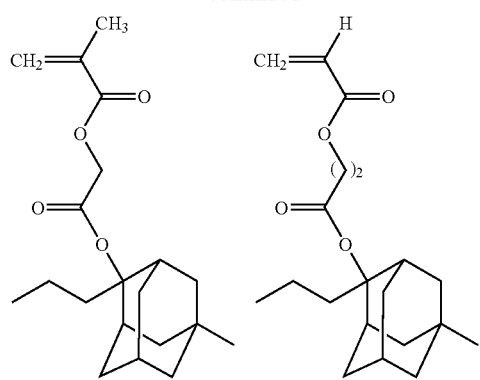
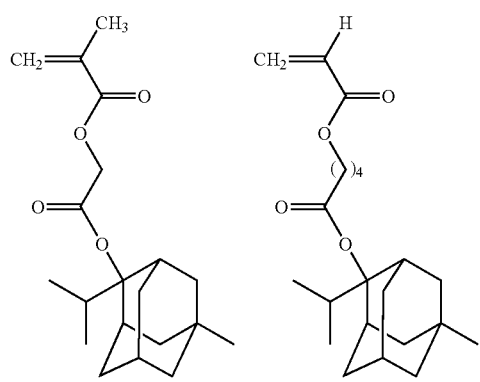
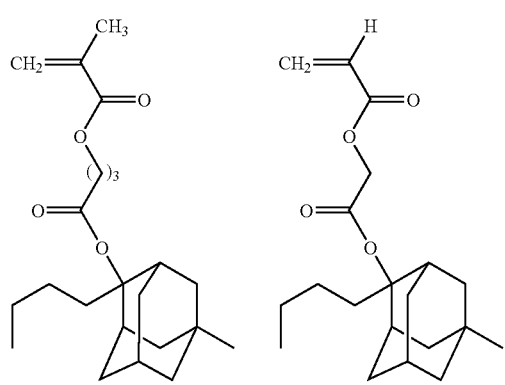
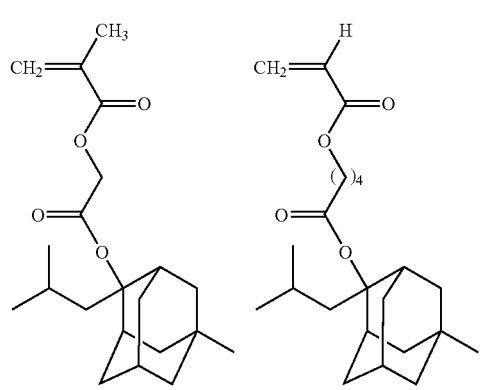
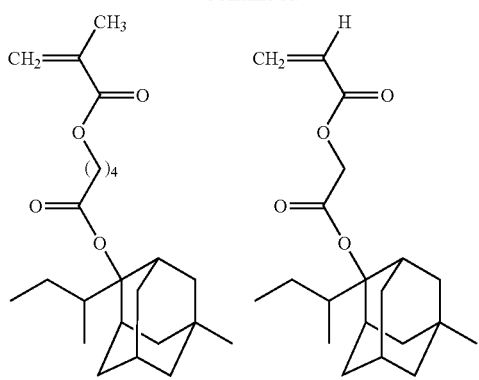
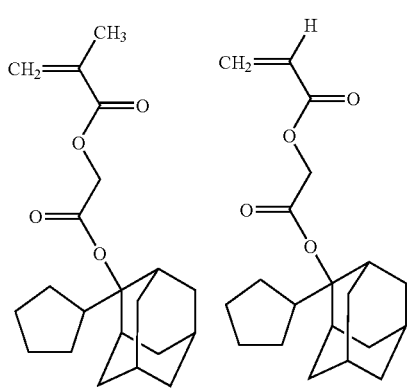
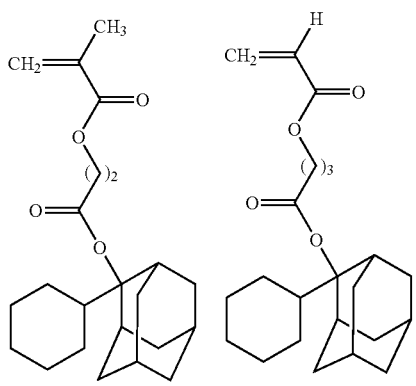
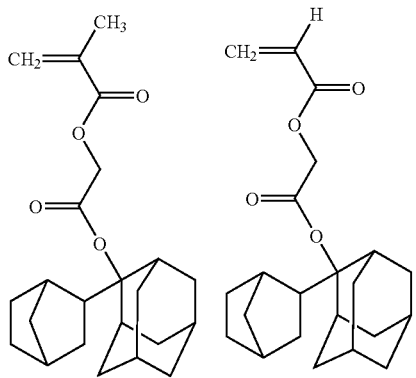

-continued
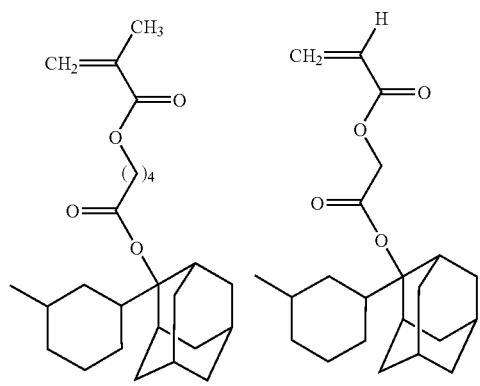
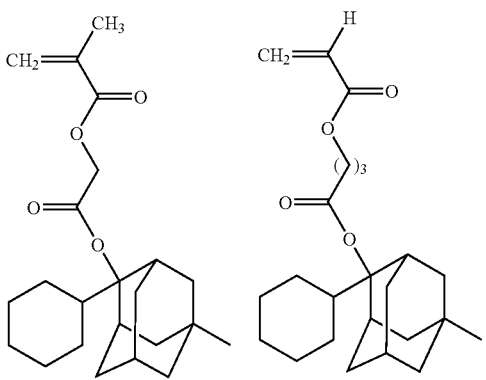
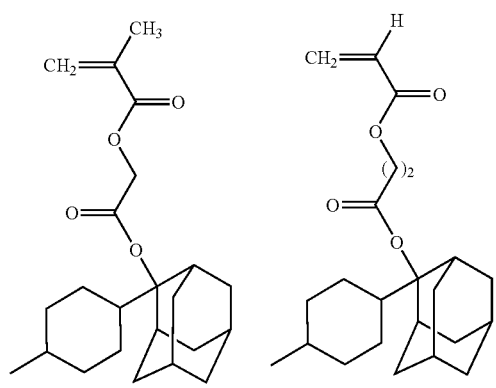
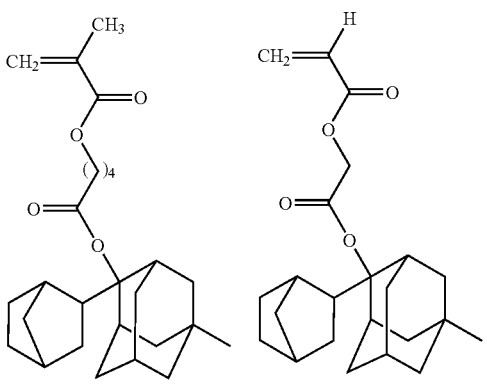
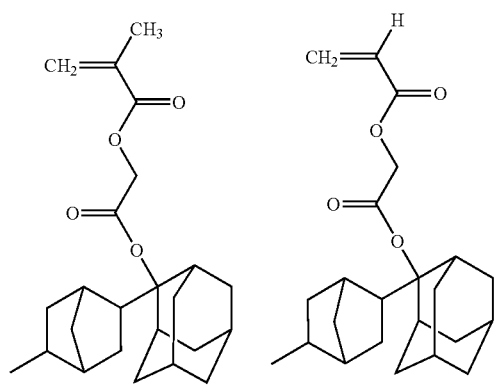
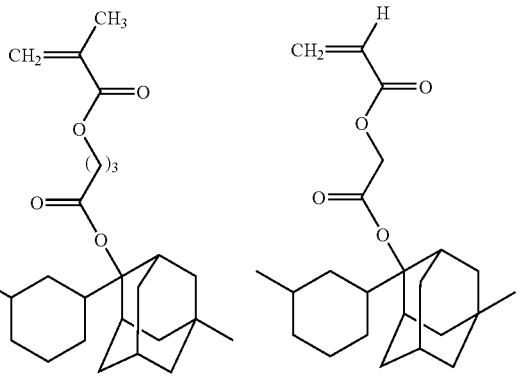
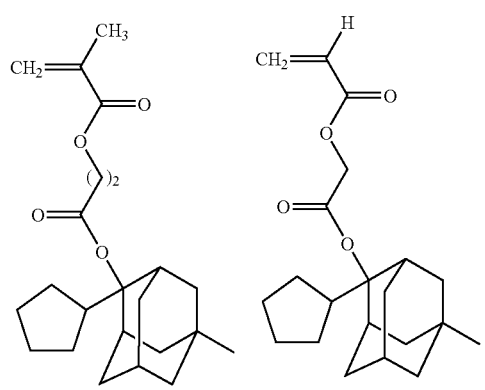
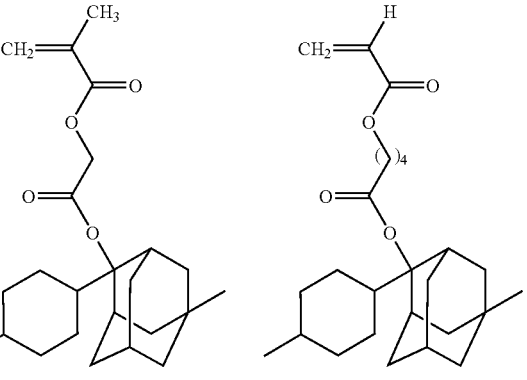

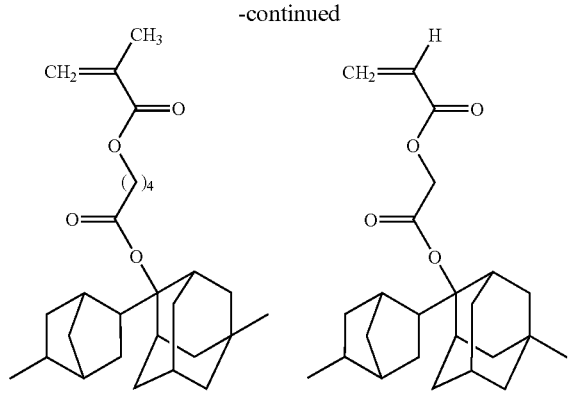
The structural unit (Ib) is derived from the monomer represented by the formula (Ib-1):
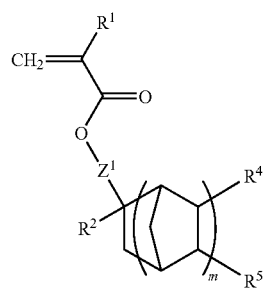
wherein $R^1$, $R^2$, $R^4$, $R^5$, $Z^1$ and m are the same as defined above.
Specific examples of the monomer represented by the formula (Ib-1) include the followings.
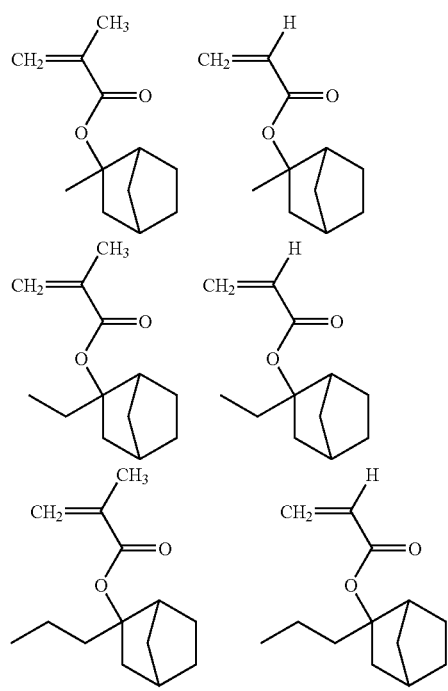
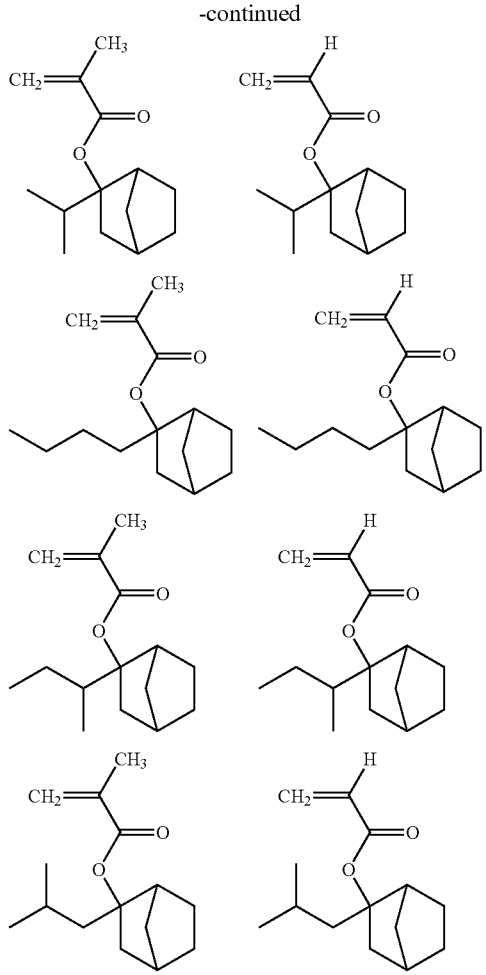
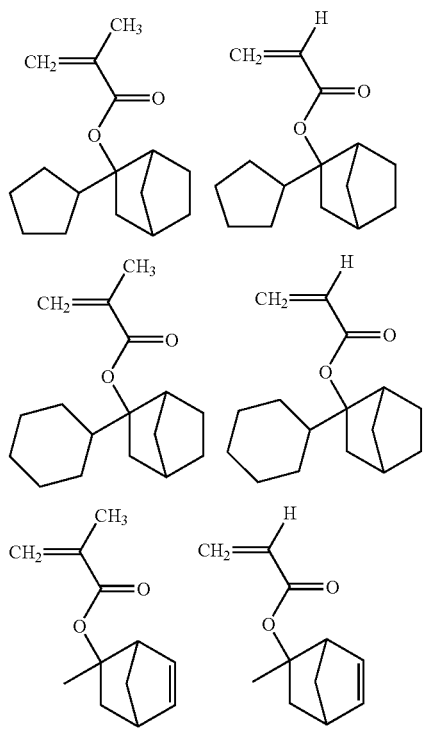

27
-continued
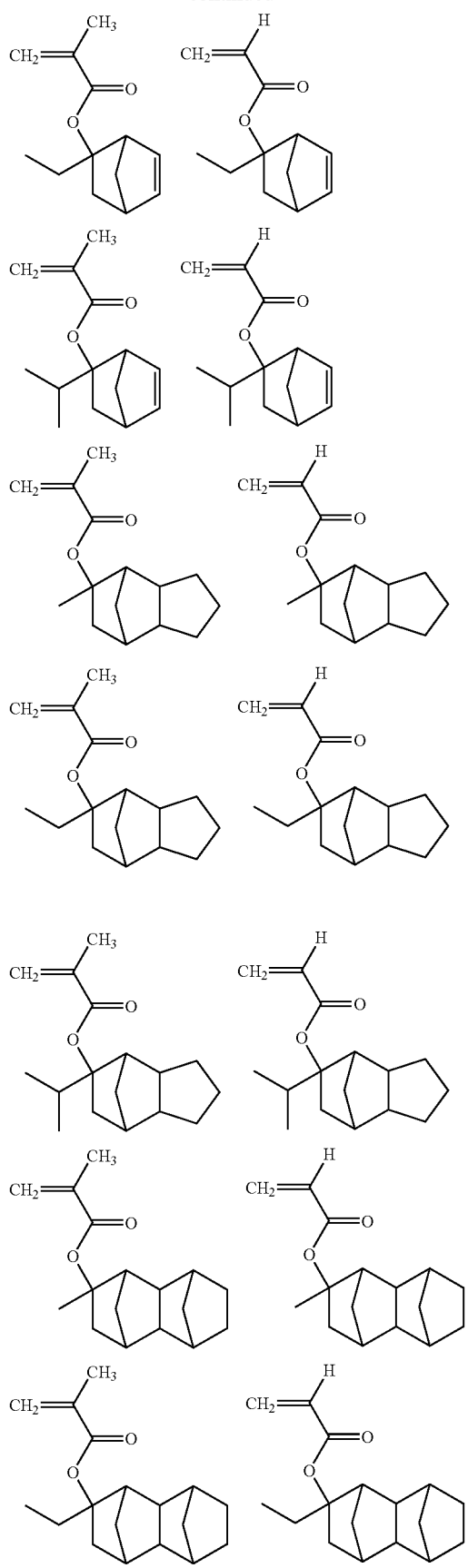
28
-continued
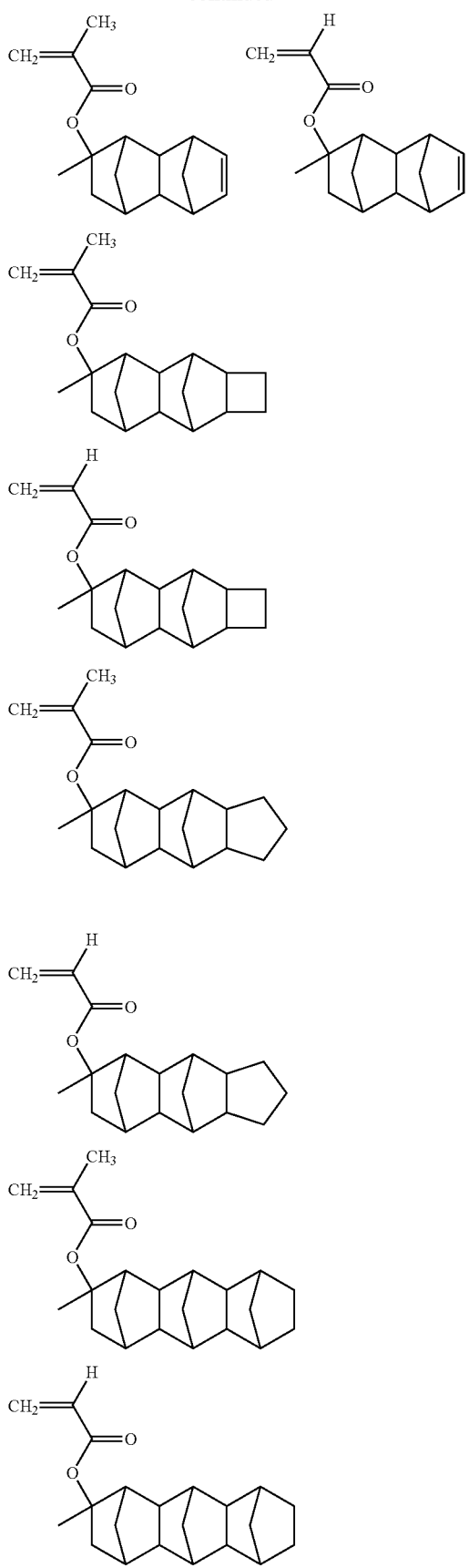

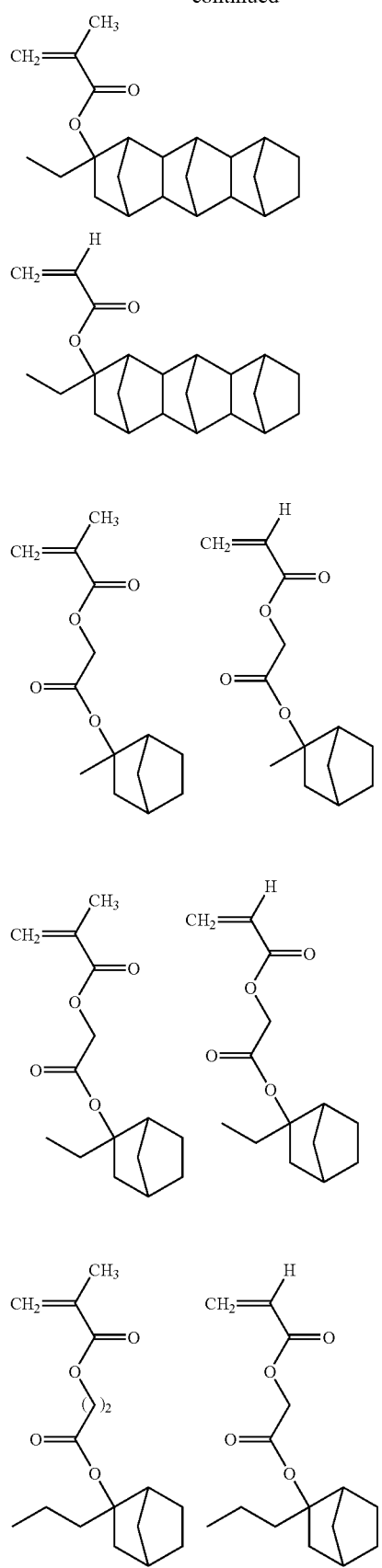
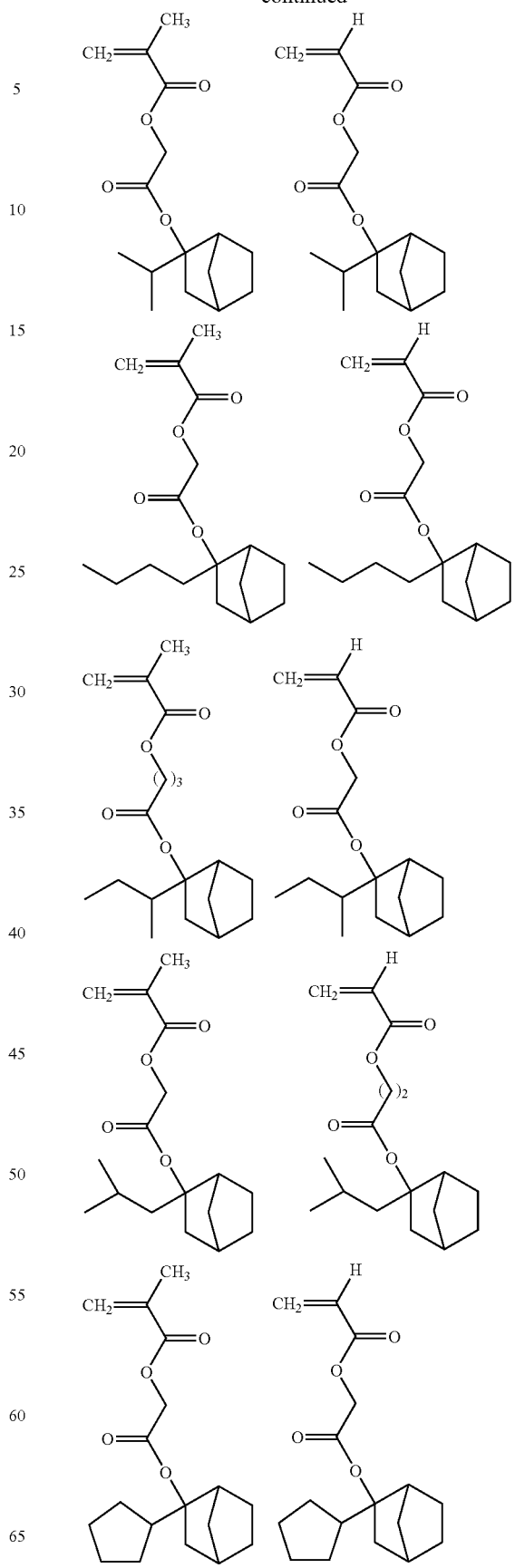

-continued

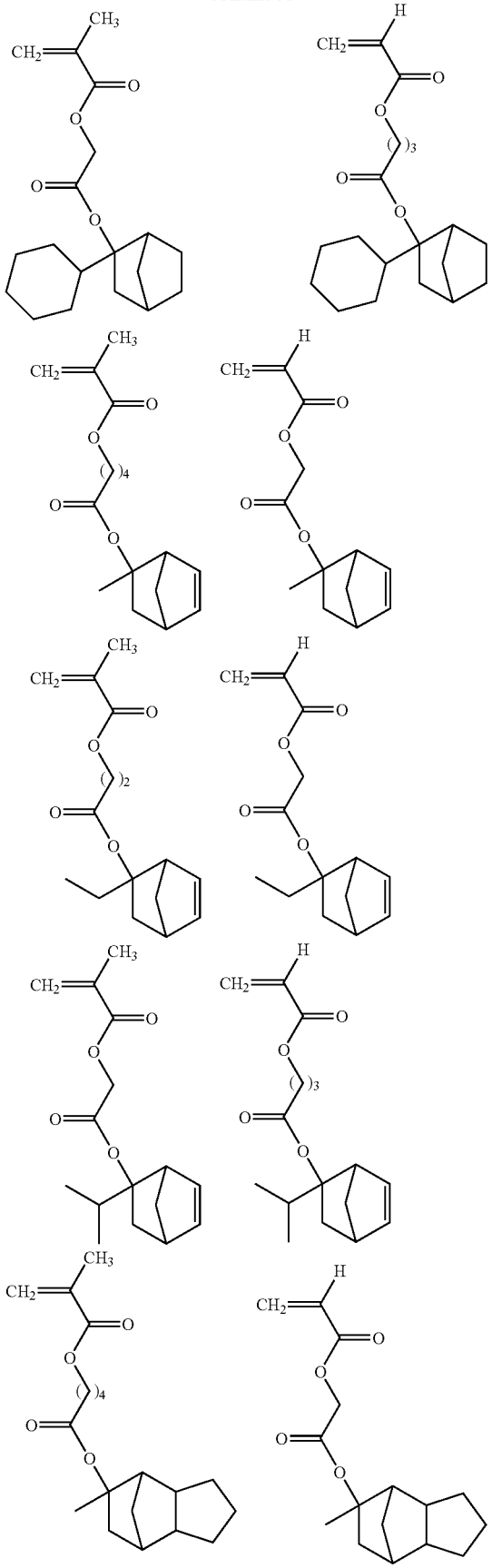

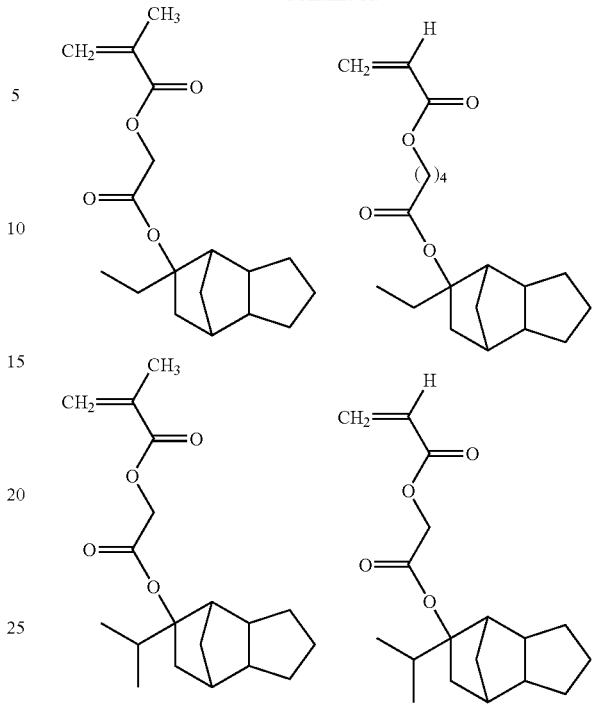

Among them, the structural unit (Ia) is preferable. When the structural unit (Ia) is particularly the structural unit derived from 2-ethyl-2-adamantyl acrylate, 2-ethyl-2-adamantyl methacrylate, 2-isopropyl-2-adamantyl acrylate or 2-isopropyl-2-adamantyl methacrylate, a resist composition having excellent sensitivity and heat resistance tends to be obtained.

The monomer represented by the formula (Ia-1) can usually be produced by a reaction of the corresponding hydroxyl-containing adamantane compound with an acrylic halide or a methacrylic halide. The monomer represented by the formula (Ib-1) can usually be produced by a reaction of the corresponding hydroxyl-containing norbornene compound with an acrylic halide or a methacrylic halide.

In the formula (II), $R^6$ and $R^7$ each independently represents a hydrogen atom, a methyl group or a hydroxyl group, $R^8$ represents a methyl group, $R^9$ represents a hydrogen atom or a methyl group, n' represents an integer of 0 to 12, and n' is preferably 0 or 1 and n' is more preferably 0. $Z^2$ represents a single bond or —$[CH_2]_{k'}$—COO—, k' represents an integer of 1 to 4, and k' is preferably 0 or 1, $R^{21}$ and $R^{22}$ each independently represents a hydrogen atom or a C1-C4 alkyl group, and $R^{23}$ represents a C1-C30 monovalent hydrocarbon group.

$Z^2$ preferably represents a single bond or —$CH_2$—COO—, and more preferably represents a single bond.

Examples of the C1-C4 alkyl group include a methyl group, an ethyl group, an n-propyl group, an isopropyl group, an n-butyl group, an isobutyl group, a sec-butyl group and a tert-butyl group. It is preferred that $R^{21}$ and $R^{22}$ each independently represents a hydrogen atom, a methyl group or an ethyl group, and it is more preferred that $R^{21}$ and $R^{22}$ are hydrogen atoms.

Examples of the C1-C30 monovalent hydrocarbon group include a methyl group, an ethyl group, an n-propyl group, an isopropyl group, an n-butyl group, an isobutyl group, a sec-butyl group, an n-pentyl group, an isopentyl group, a neopentyl group, an n-hexyl group, an n-heptyl group, an n-octyl group, a cyclopentyl group, a cyclohexyl group, a cyclooctyl group, a 1-adamantyl group and a 2-adamantyl group, and a C3-C30 monovalent cyclic hydrocarbon group is preferable, and a C4-C10 monovalent alicyclic hydrocarbon group is more preferable.

Examples of the group represented by the following formula:

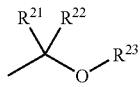

include a methoxymethyl group, an ethoxymethyl group, a propoxymethyl group, a butoxymethyl group, a pentyloxymethyl group, a hexyloxymethyl group, a cyclopentyloxymethyl group, a cyclohexyloxymethyl group, an adamantyloxymethyl group, a 1-methoxyethyl group, a 1-ethoxyethyl group, a 1-propoxyethyl group, a 1-butoxyethyl group, a 1-pentyloxyethyl group, a 1-hexyloxyethyl group, a 1-cyclopentyloxyethyl group, a 1-cyclohexyloxyethyl group, a 1-adamantyloxyethyl group, a 1-methoxypropyl group, a 1-ethoxypropyl group, a 1-propoxypropyl group, a 1-butoxypropyl group, a 1-pentyloxypropyl group, a 1-hexyloxypropyl group, a 1-cyclopentyloxypropyl group, a 1-cyclohexyloxypropyl group and a 1-adamantyloxypropyl group. Among them, a cyclopentyloxymethyl group and a cyclohexyloxymethyl group are preferable.

The group represented by the following formula:

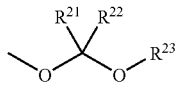

is also an acid-labile group, and this group is converted to a hydroxyl group by an action of an acid.

The polymer of the present invention may have two or more kinds of the structural unit (II).

The structural unit (II) is derived from the monomer represented by the formula (II-1):

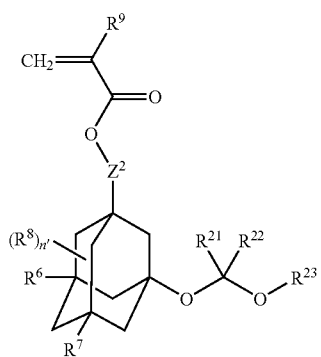

(II-1)

wherein $R^6$, $R^7$, $R^8$, $R^9$, $R^{21}$, $R^{22}$, $R^{23}$, $Z^2$ and n' are the same as defined above.

Specific examples of the monomer represented by the formula (II-1) include the followings, and in the following formulae, "Cyc" means a cyclohexyl group.

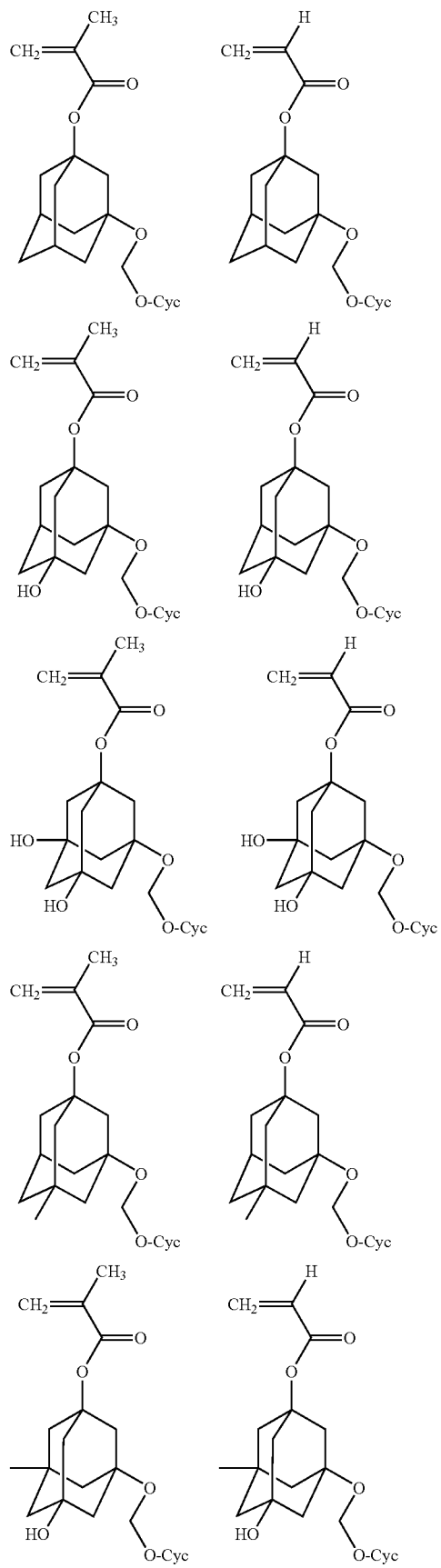

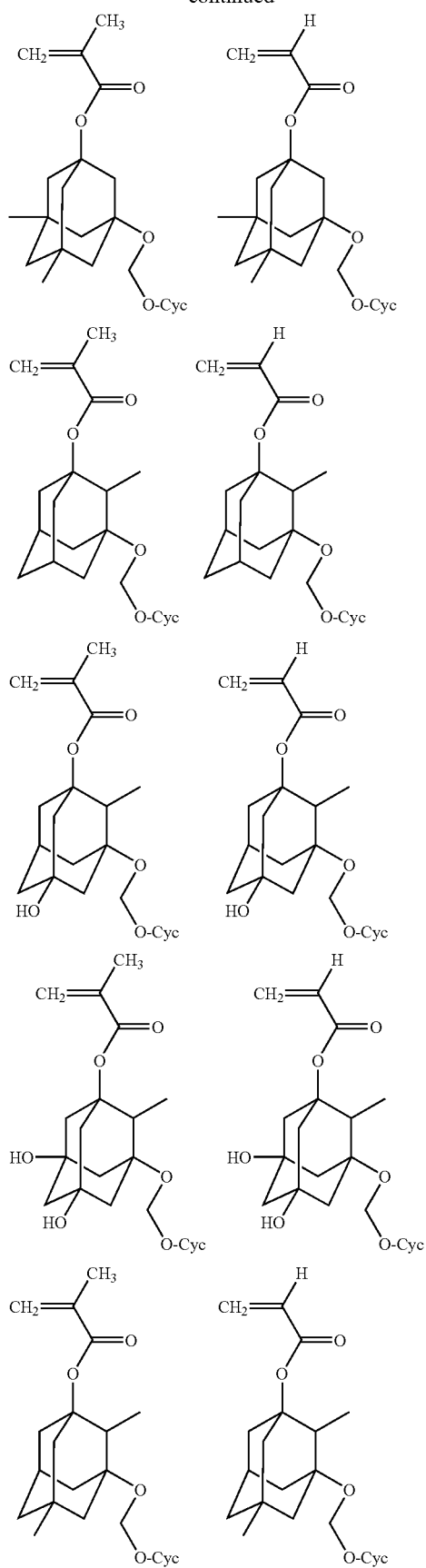
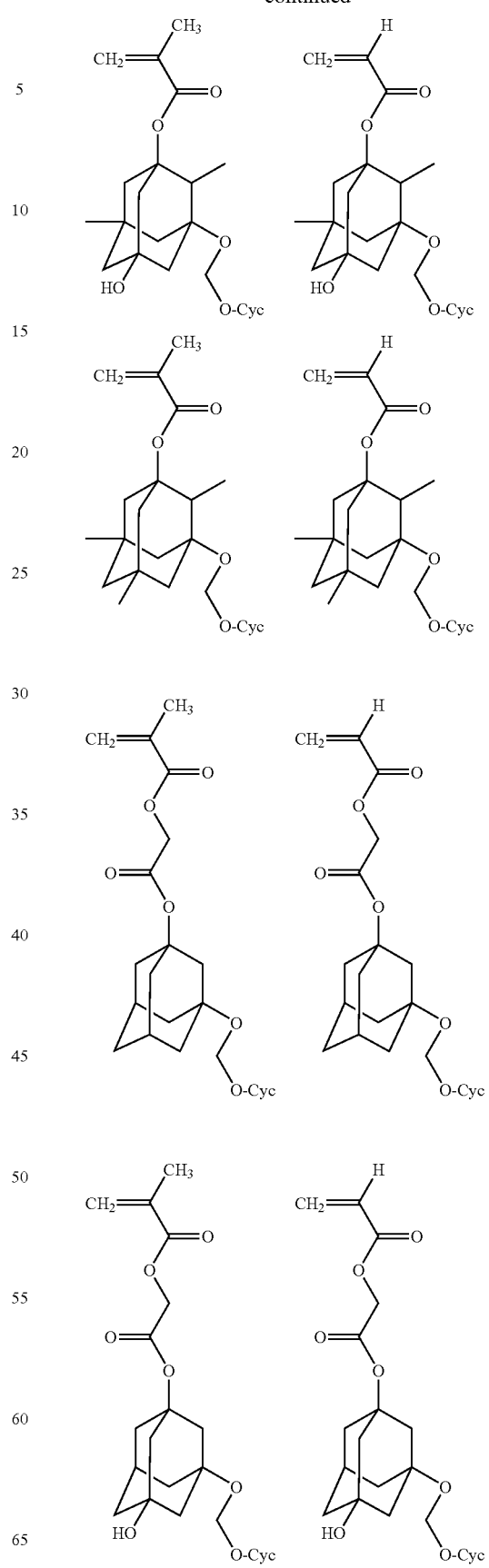

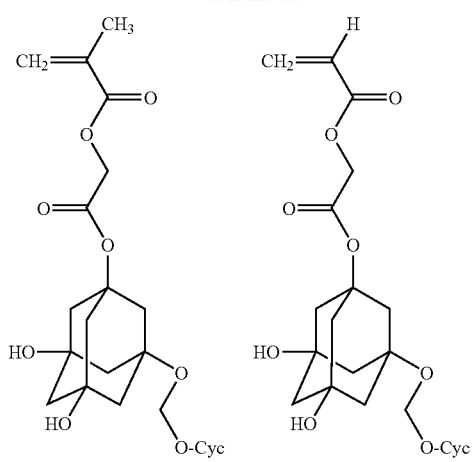
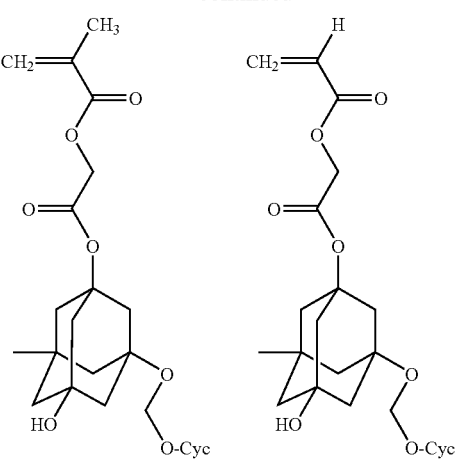
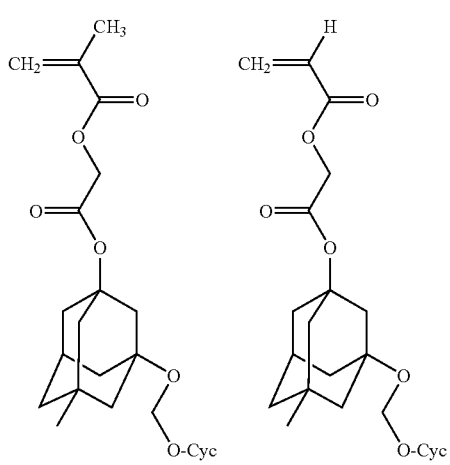
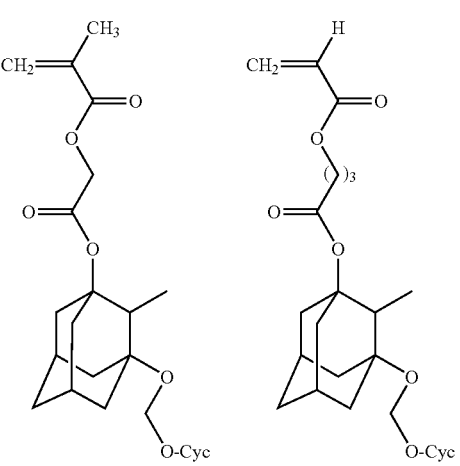
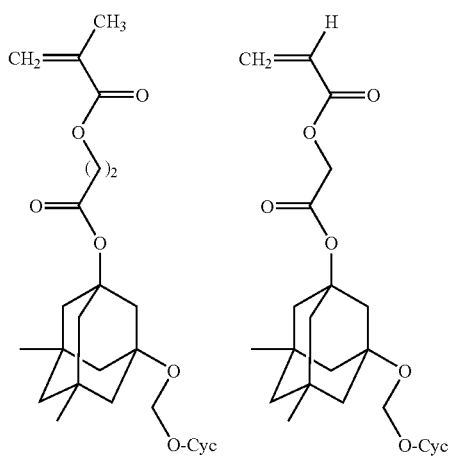
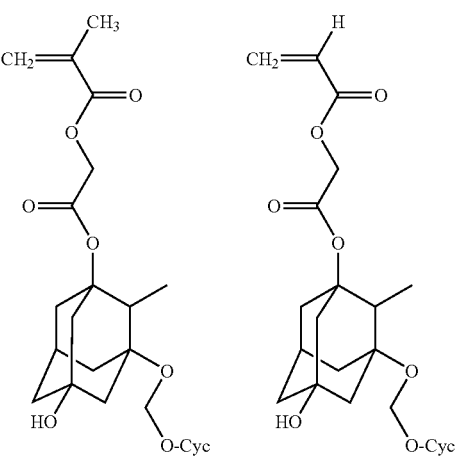

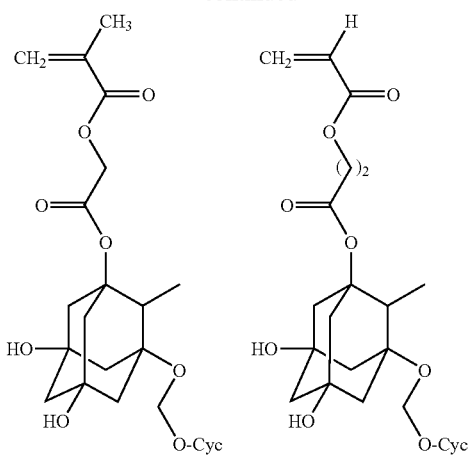
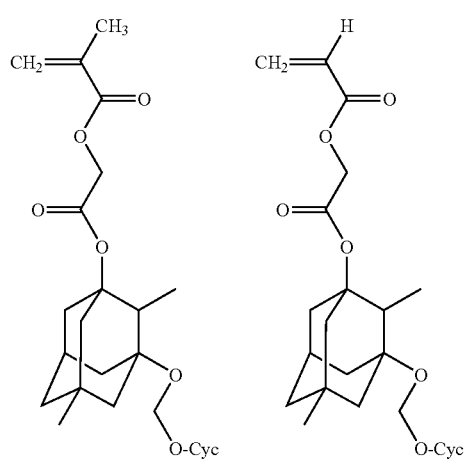
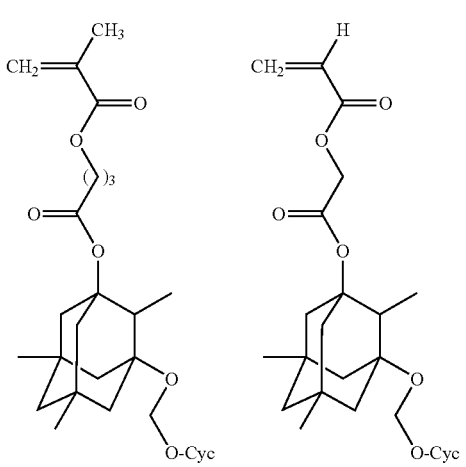
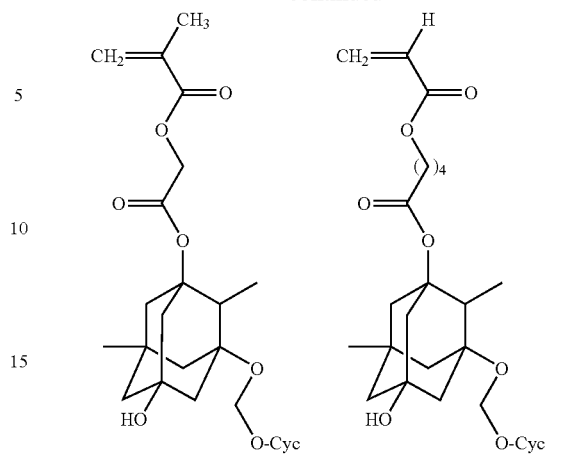
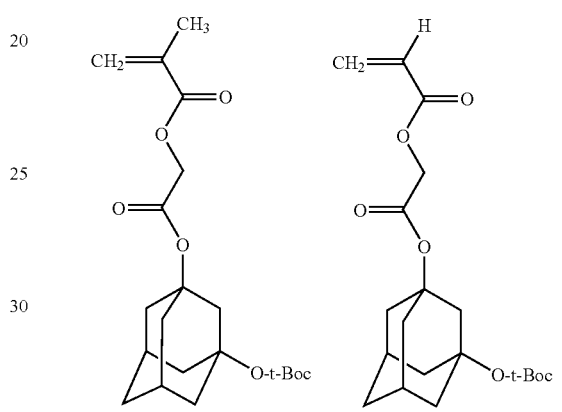
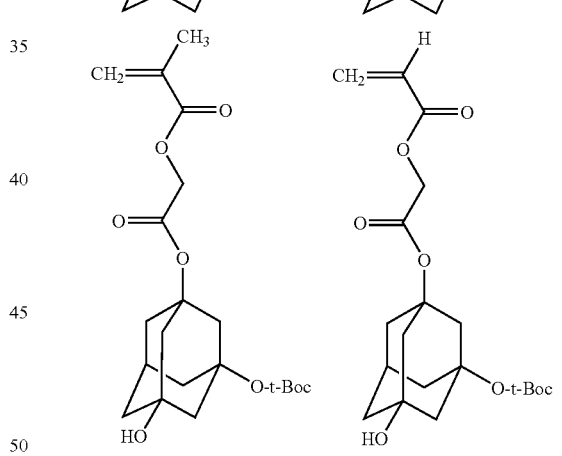
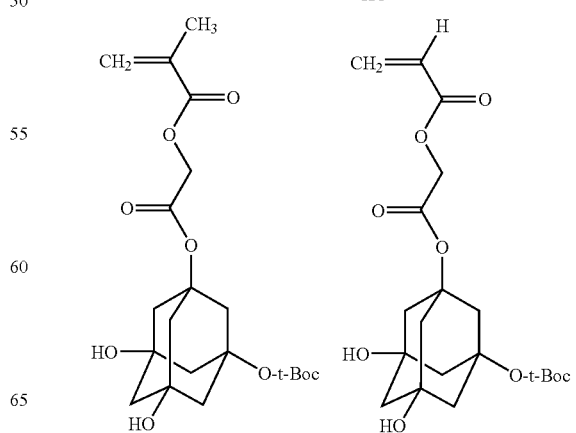

-continued
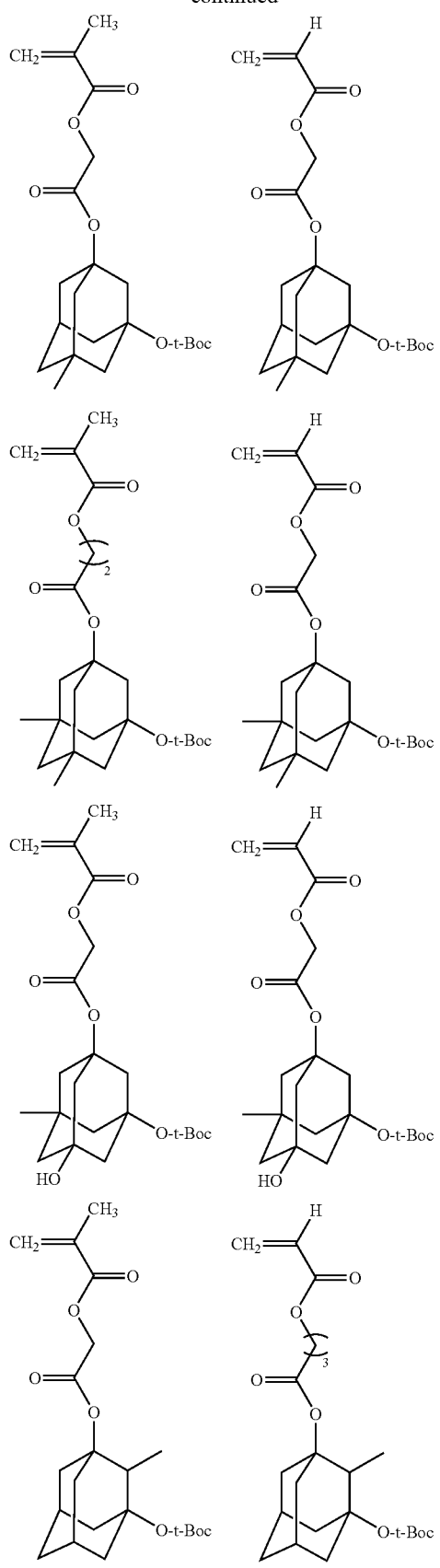
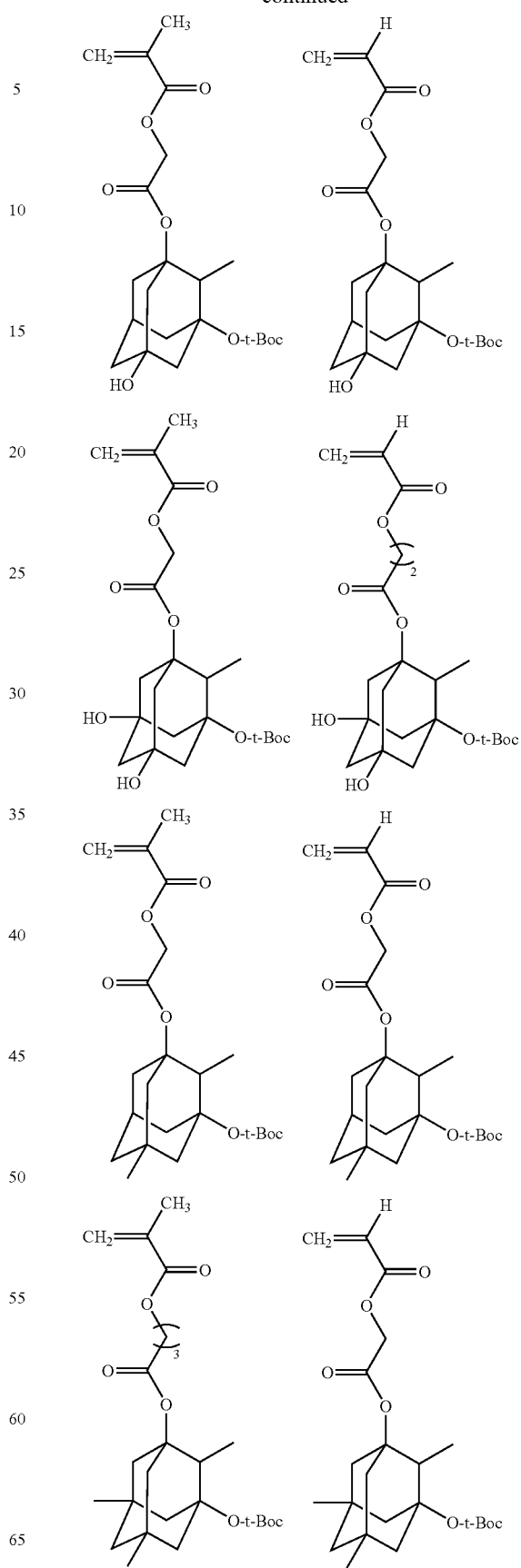

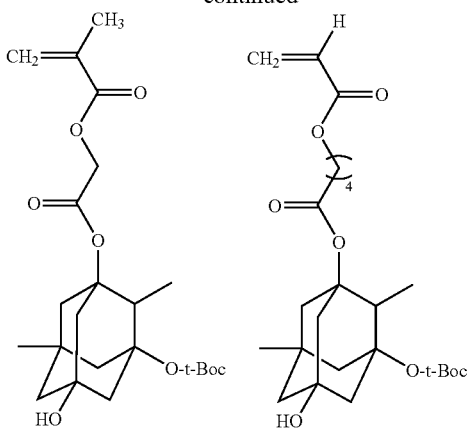

Among them, the structural unit (II) derived from 3-(cyclohexyloxymethoxy)-1-adamantyl acrylate and the structural unit (II) derived from 3-(cyclohexyloxymethoxy)-1-adamantyl methacrylate are preferable. When the structural unit (II) is the structural unit derived from 3-(cyclohexyloxymethoxy)-1-adamantyl acrylate or 3-(cyclohexyloxymethoxy)-1-adamantyl methacrylate, a resist composition having excellent resolution and good line width roughness tends to be obtained.

The monomer represented by the formula (II-1) can usually be produced according to known methods. For example, 3-(cyclohexyloxymethoxy)-1-adamantyl acrylate can be produced by reacting 3-hydroxy-1-adamantyl acrylate with a base to obtain an alkoxide and reacting the obtained alkoxide with chloromethyl cyclohexyl ether.

In the formulae (IIIa), (IIIb), (IIIc), (IIId), (IIIe) and (IIIf), $R^{10}$ represents a hydrogen atom or a methyl group, $R^{11}$ represents a methyl group, $R^{12}$ is independently in each occurrence a carboxyl group, a cyano group or a C1-C4 hydrocarbon group, j represents an integer of 0 to 3, a represents an integer of 0 to 5, b represents an integer of 0 to 3, c represents an integer of 0 to (2j+2), $Z^3$ represents a single bond or a —$(CH_2)_{k''}$—COO— group, and k" represents an integer of 1 to 4.

Examples of the C1-C4 hydrocarbon group include a methyl group, an ethyl group, an n-propyl group, an isopropyl group, an n-butyl group, an isobutyl group and a tert-butyl group.

$Z^3$ preferably represents a single bond or —$CH_2$—COO—, and a and c are preferably 0. $R^{12}$ preferably represents a methyl group, a carboxyl group or a cyano group, and b is preferably 0, 1 or 2.

The polymer of the present invention may contain two or more selected from the group consisting of the structural units (IIIa), (IIIb), (IIIc), (IIId), (IIIe) and (IIIf).

The structural units (IIIa), (IIIb), (IIIc), (IIId), (IIIe) and (IIIf) are respectively derived from the monomers represented by the formulae (IIIa-1), (IIIb-1), (IIIc-1), (III-1), (IIIe-1) and (IIIf-1).

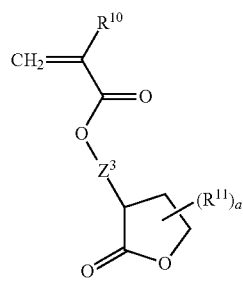 (IIIa-1)

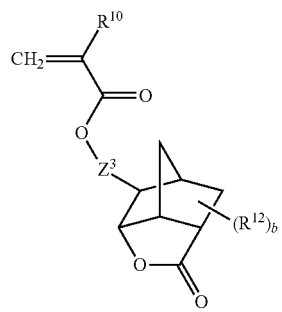 (IIIb-1)

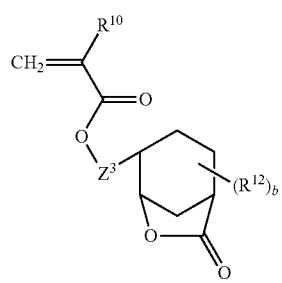 (IIIc-1)

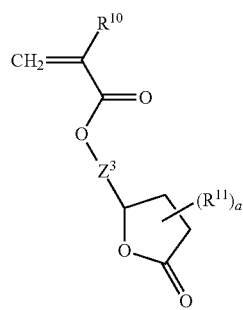 (IIId-1)

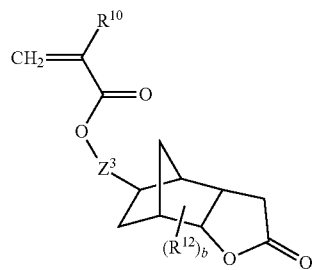 (IIIe-1)

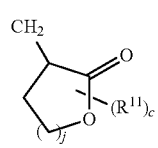 (IIIf-1)

Specific examples of the monomer represented by the formula (IIIa-1) include the followings.
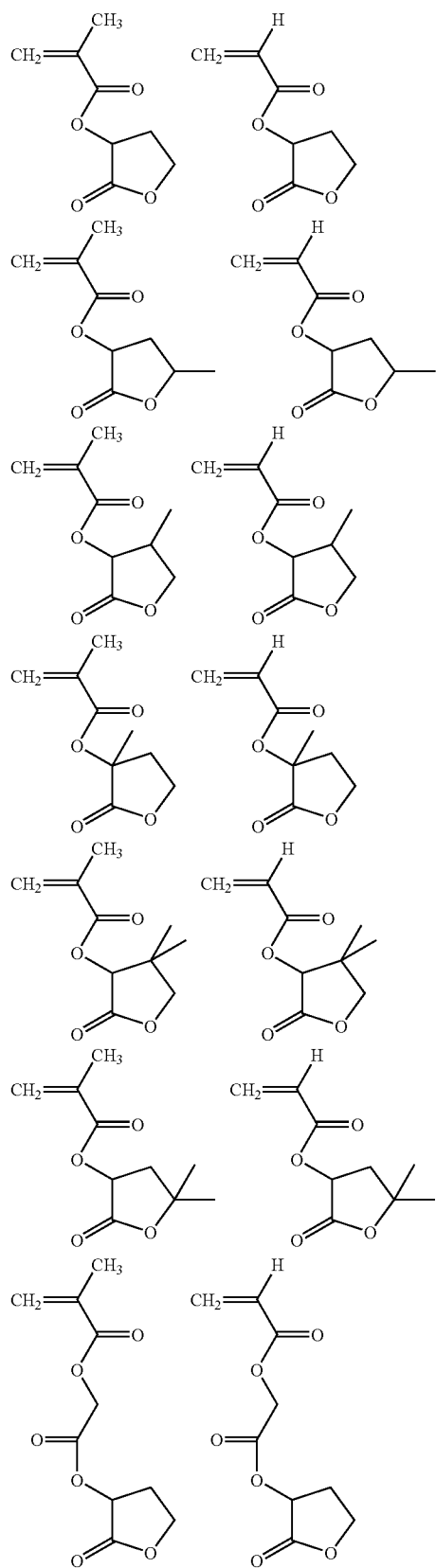
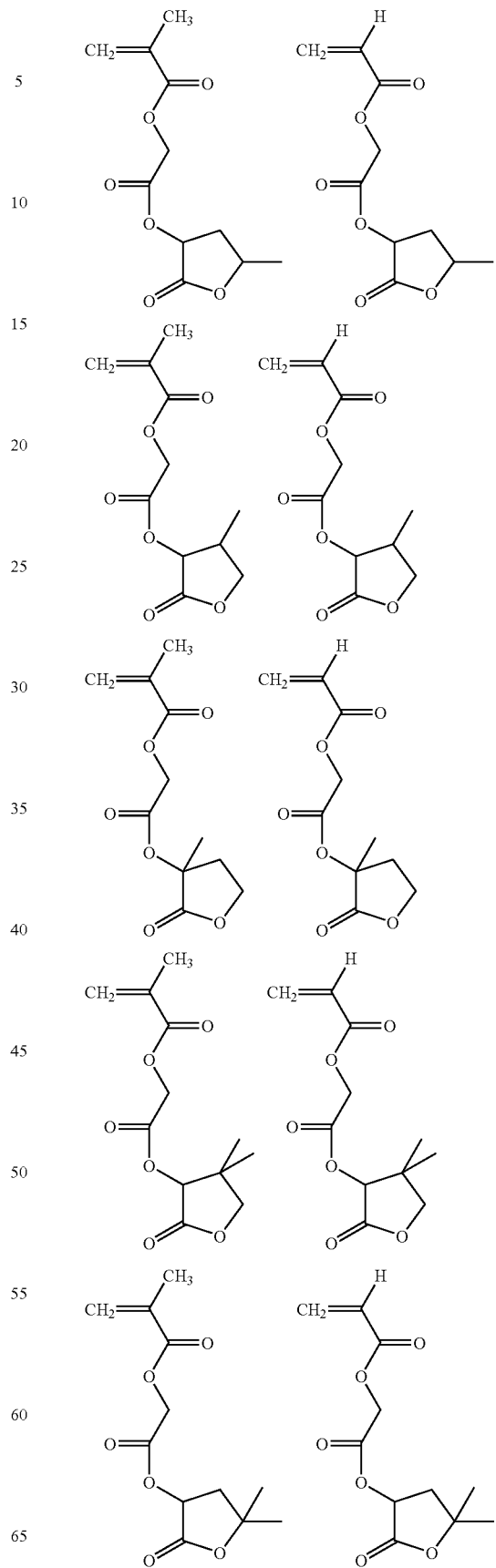

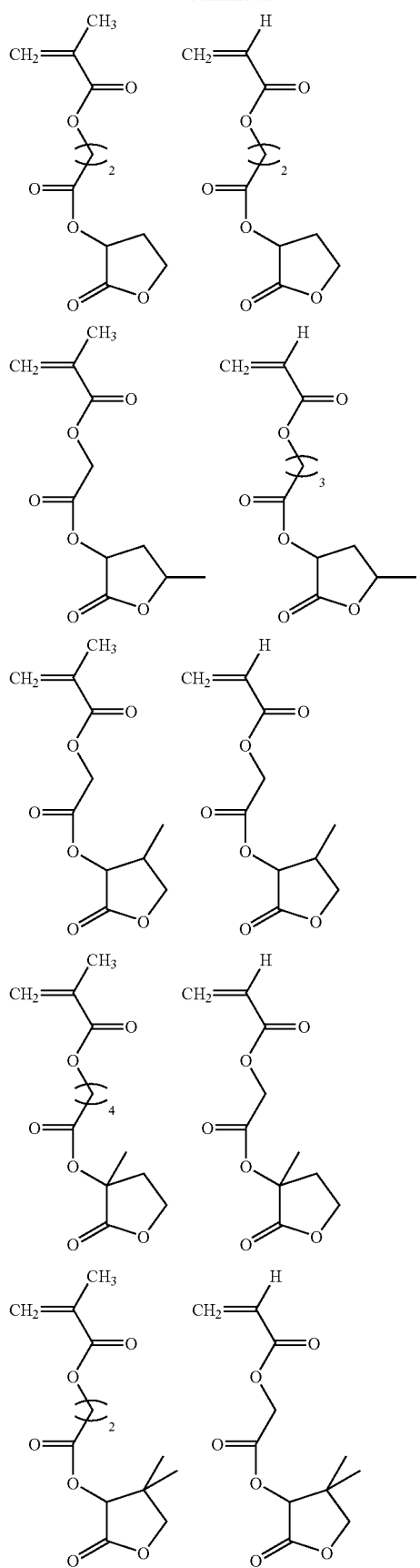
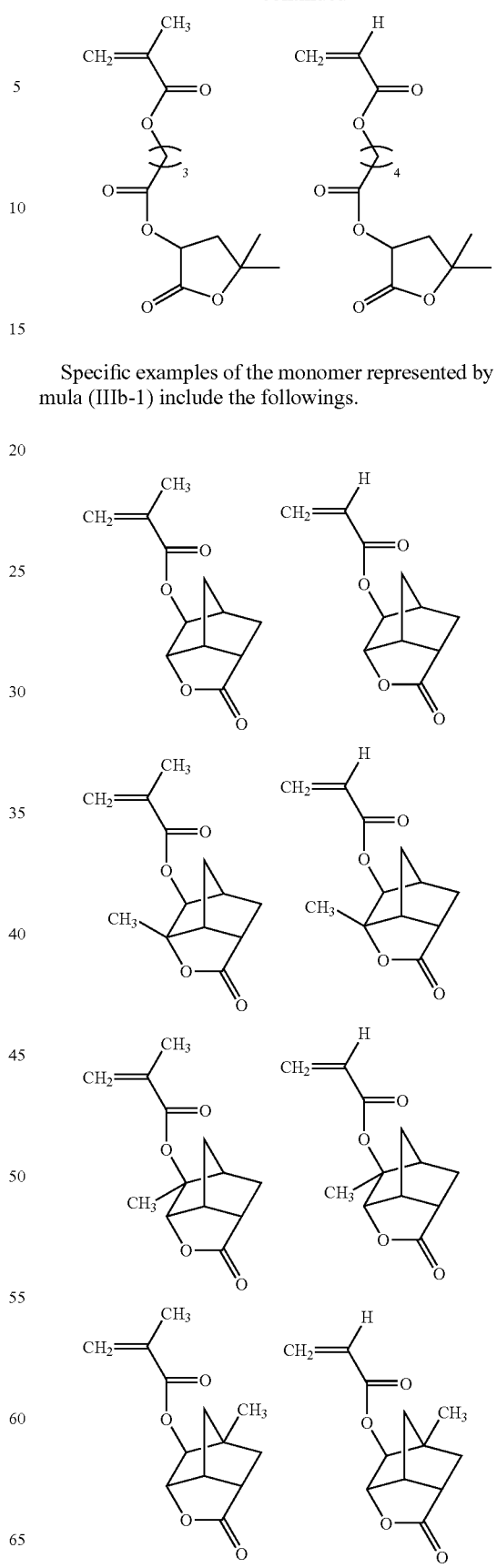
Specific examples of the monomer represented by the formula (IIIb-1) include the followings.

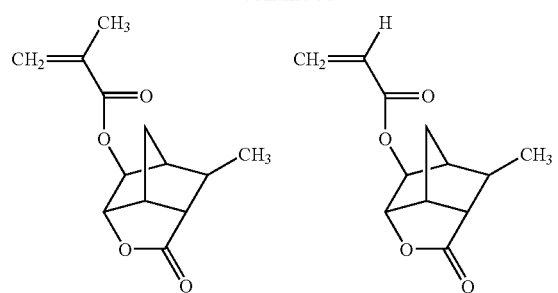
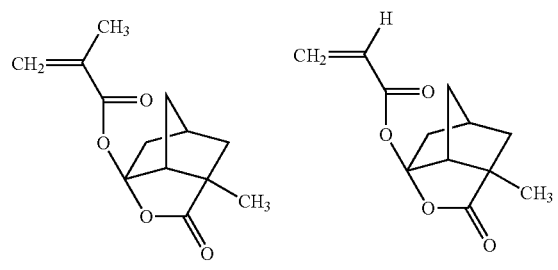
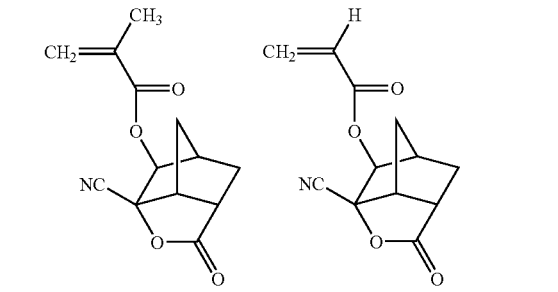
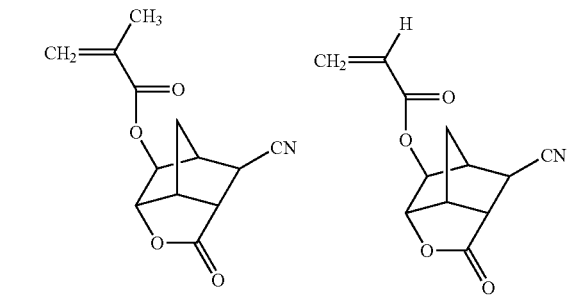
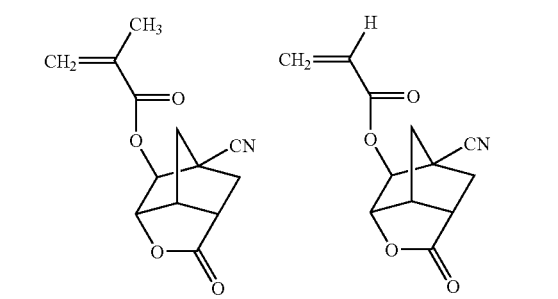
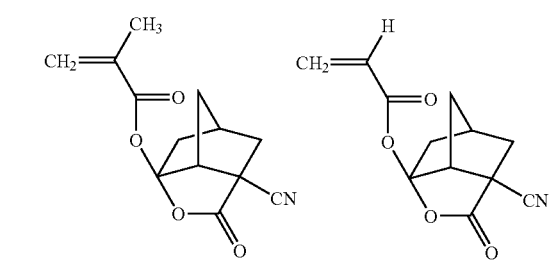
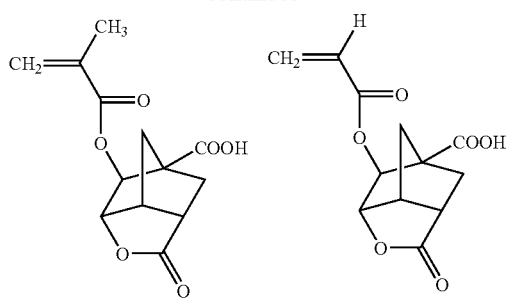
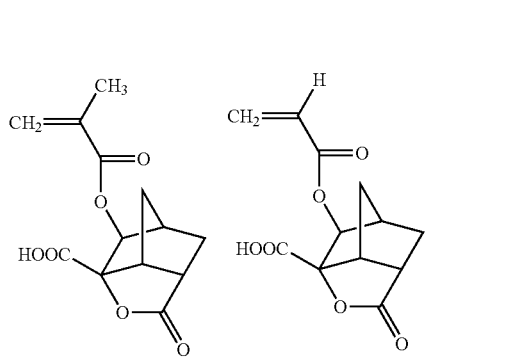
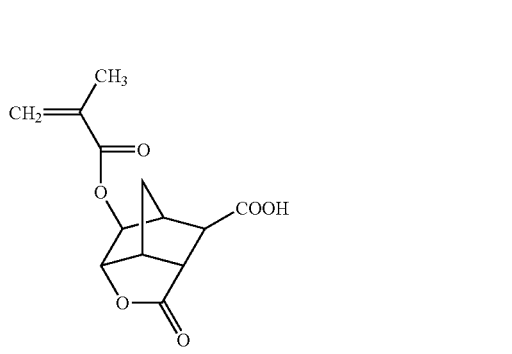
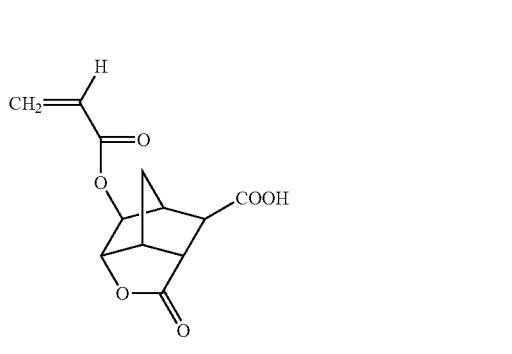
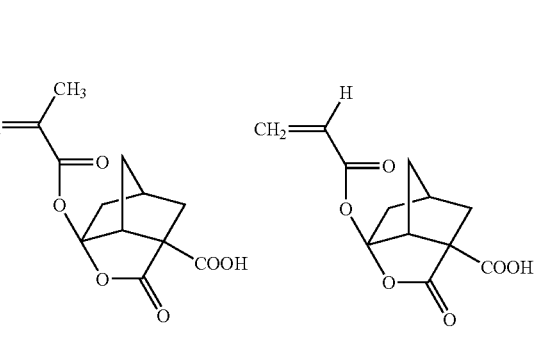

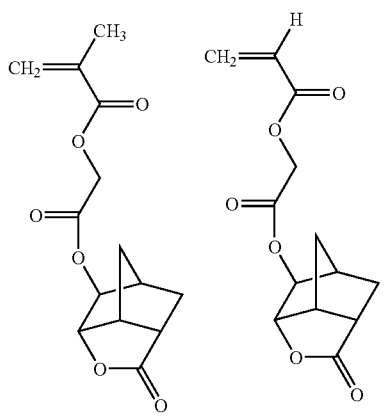
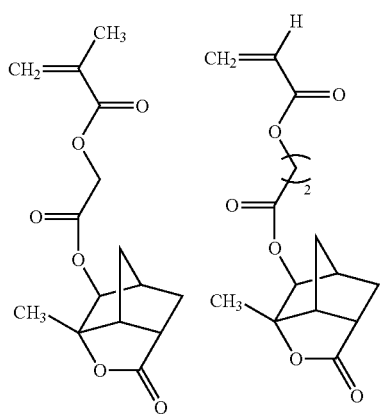
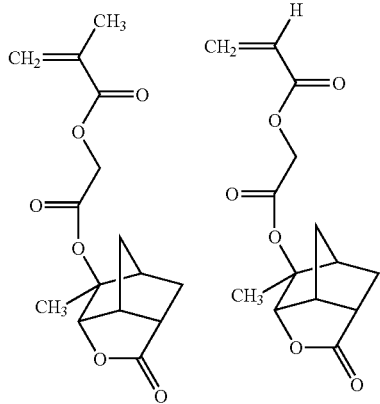
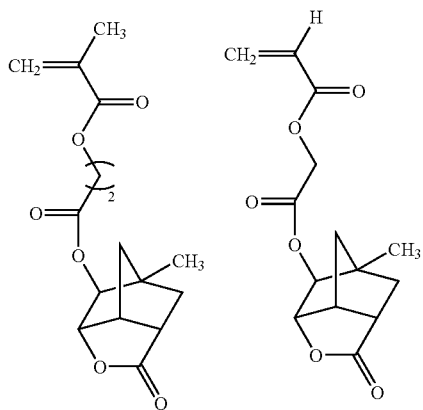
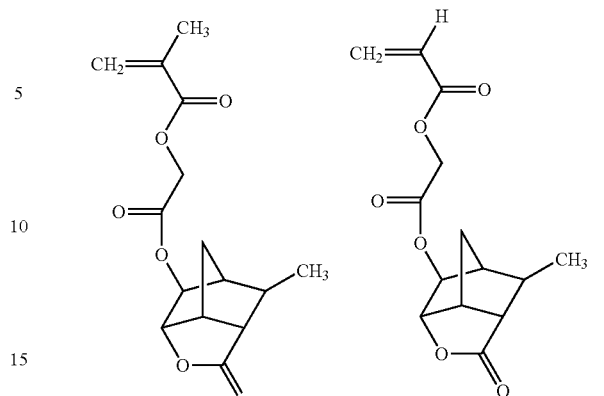
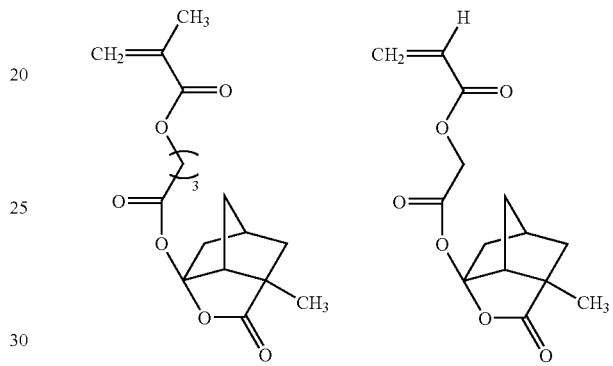
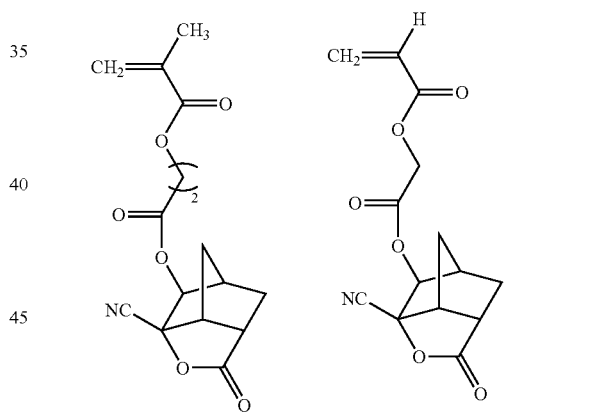
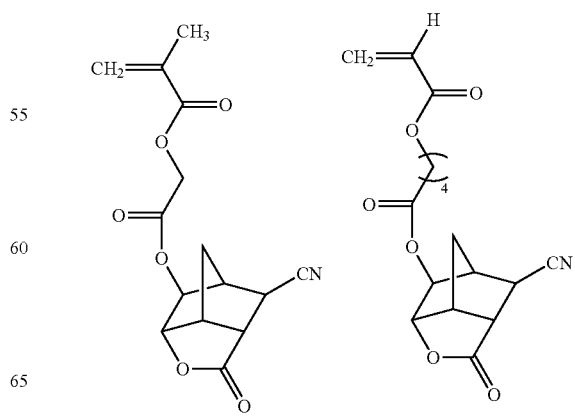

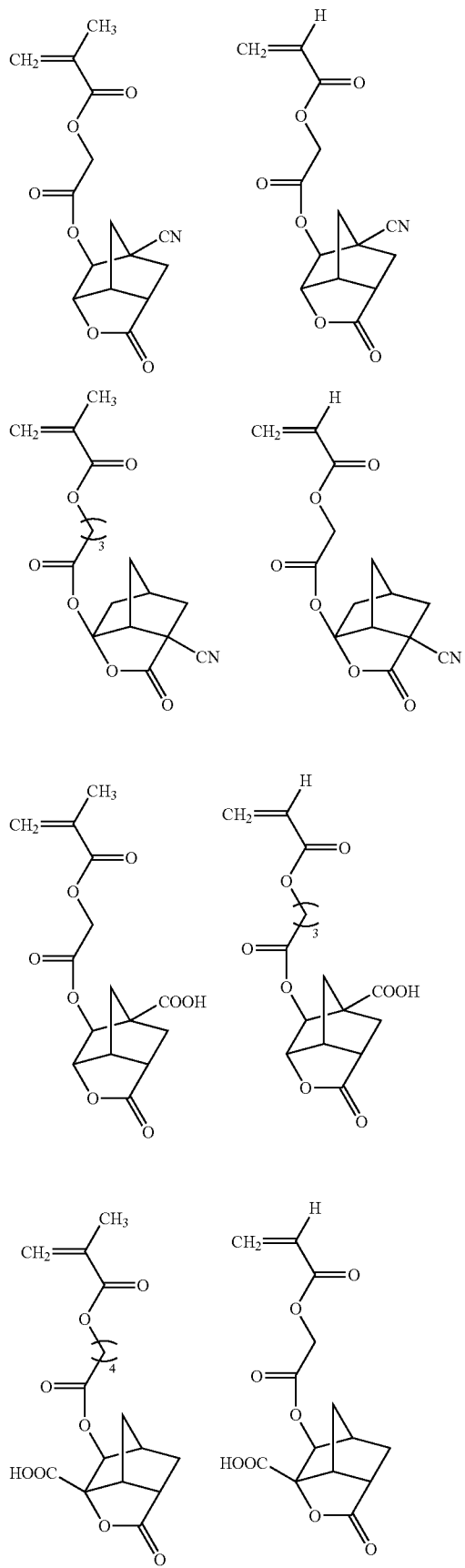
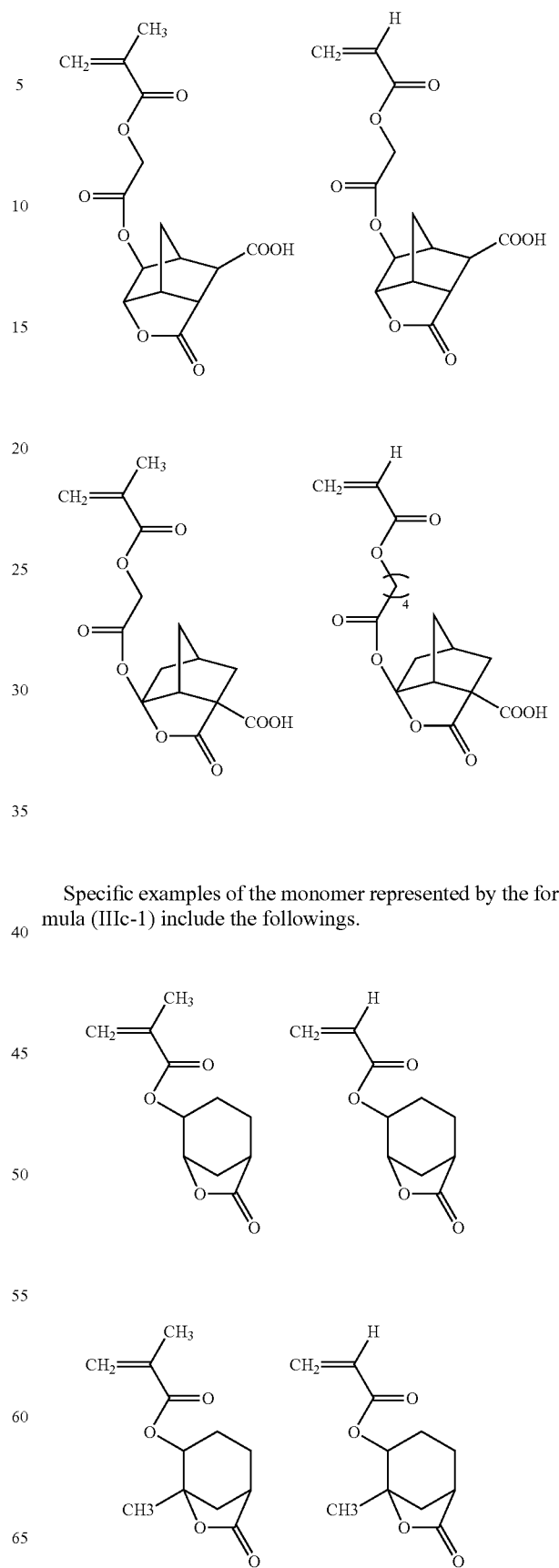
Specific examples of the monomer represented by the formula (IIIc-1) include the followings.

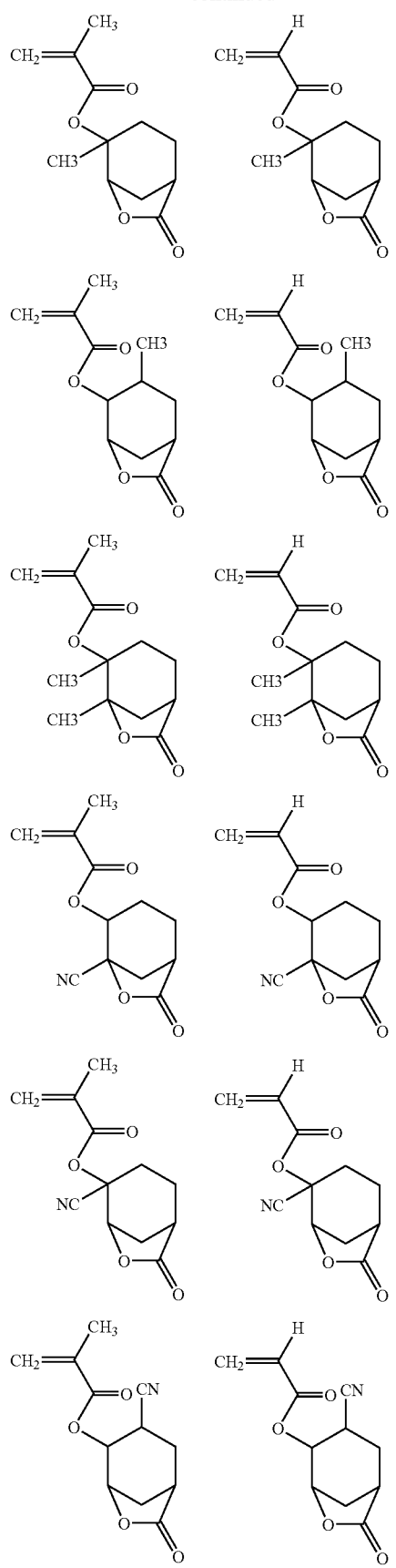
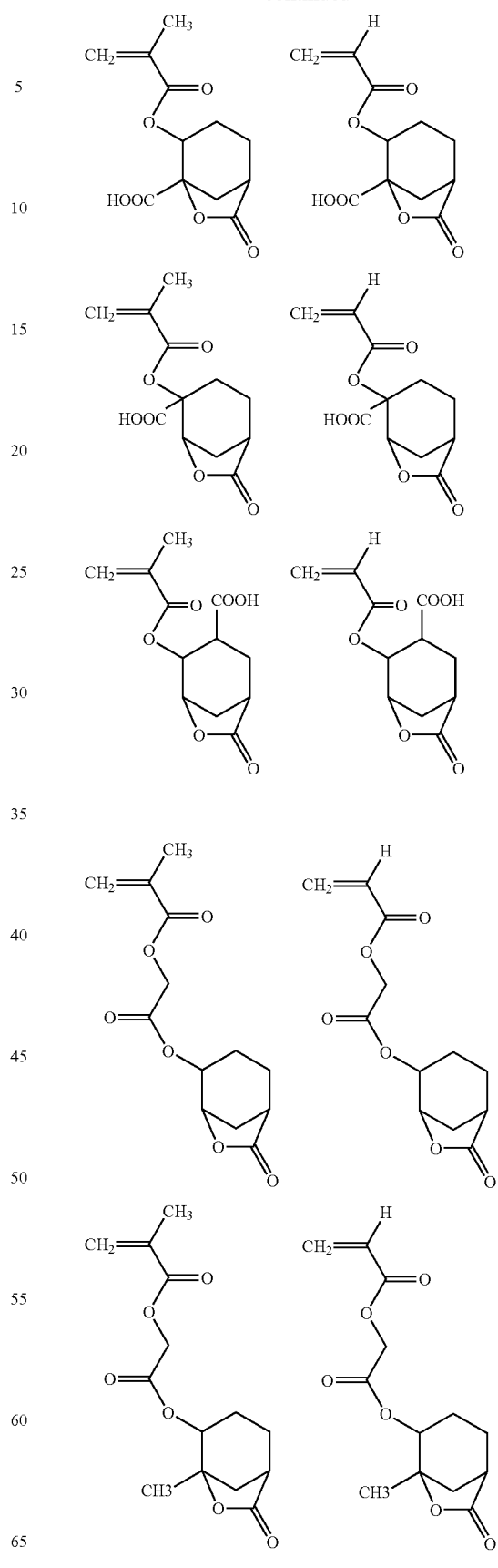

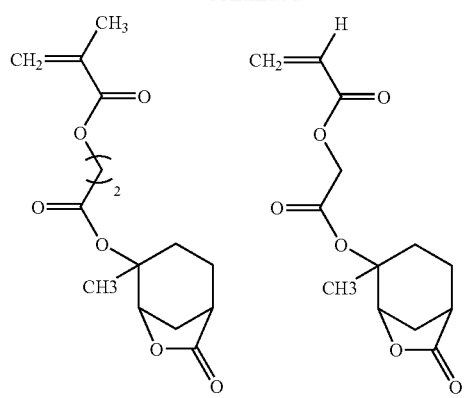
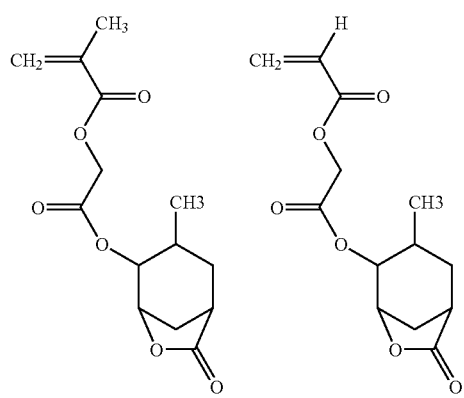
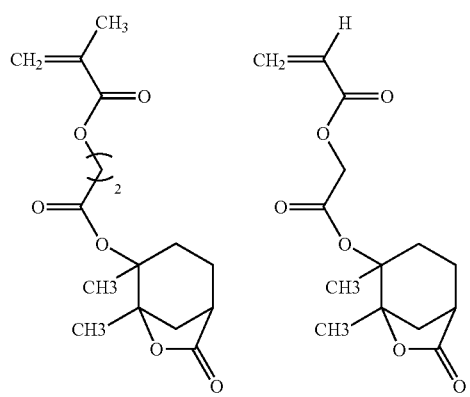
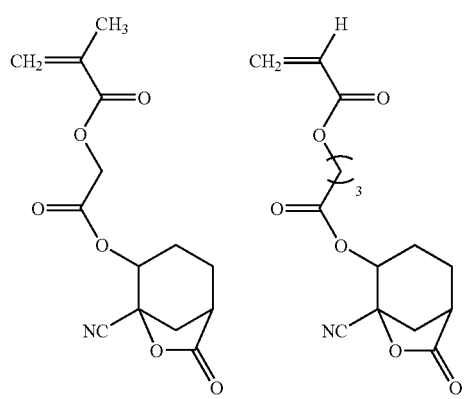
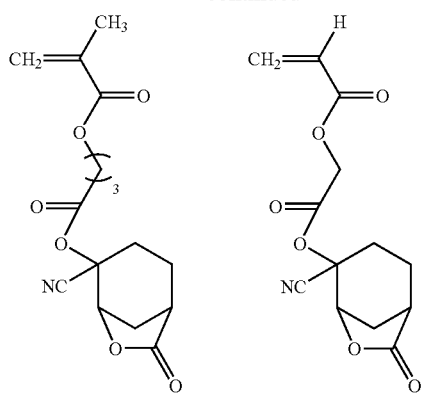
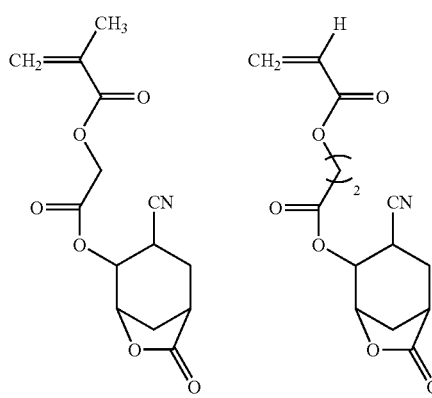
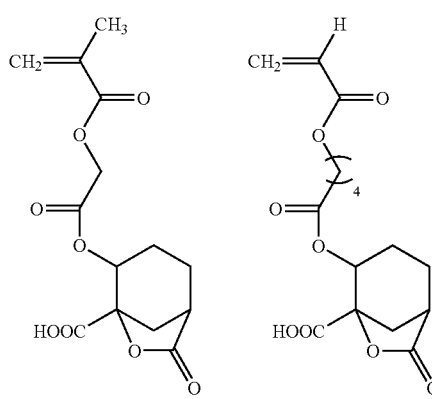
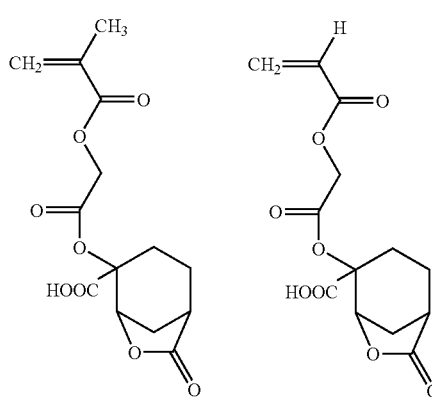

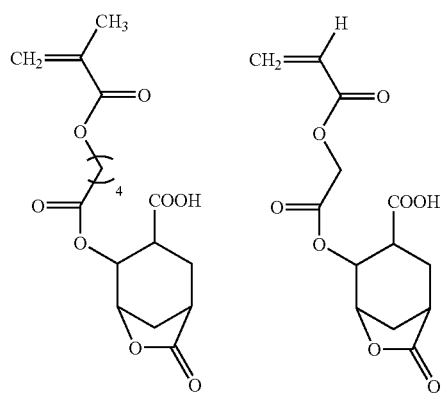
Specific examples of the monomer represented by the formula (IIId-1) include the followings.
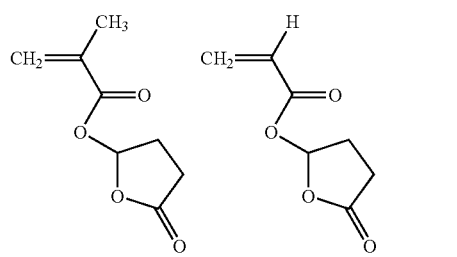
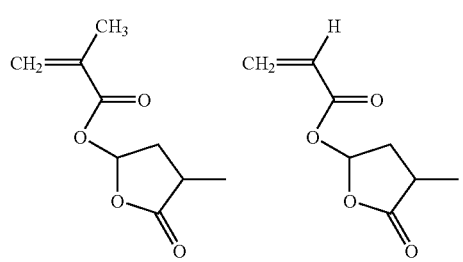
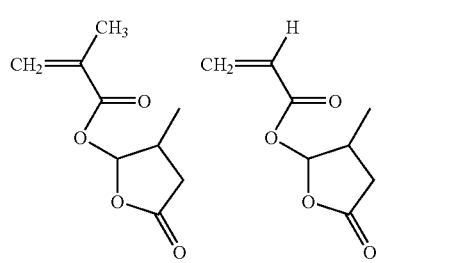
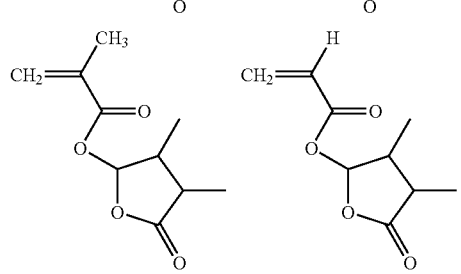
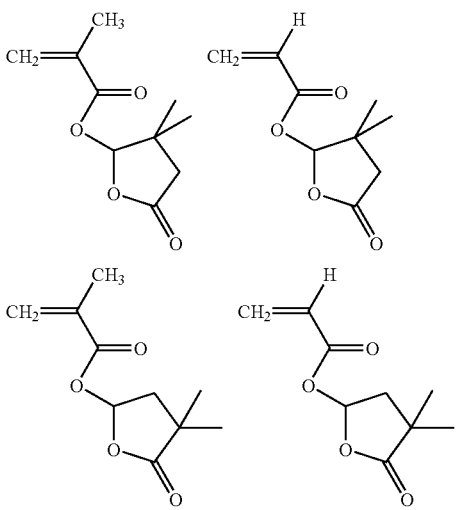
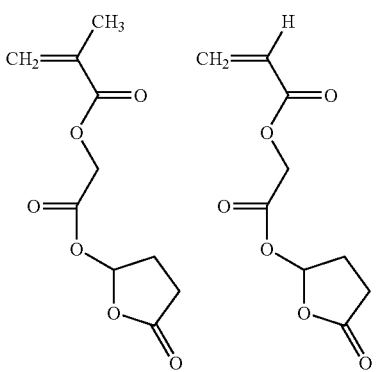
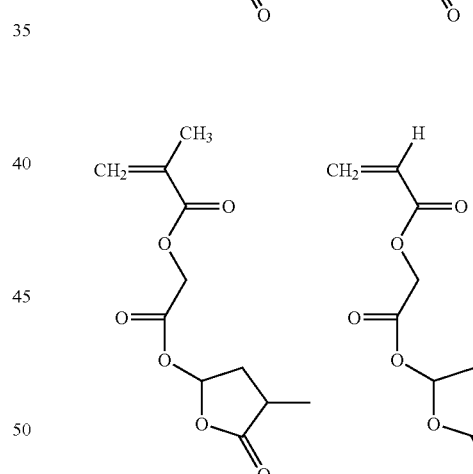
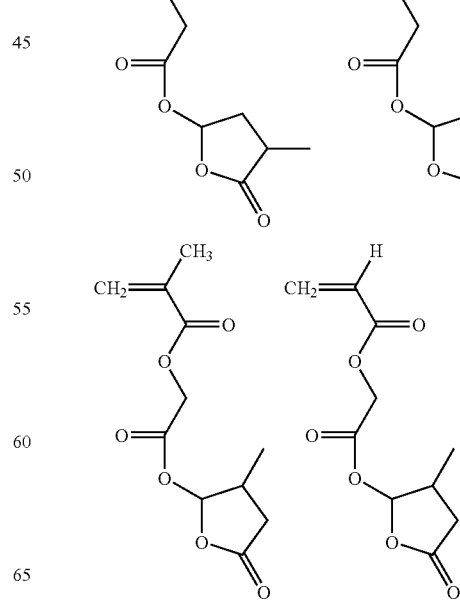

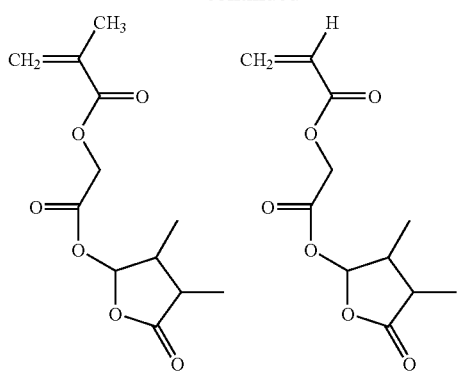
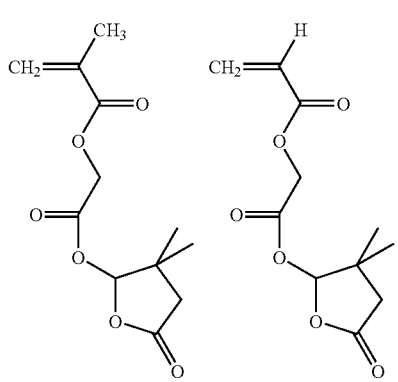
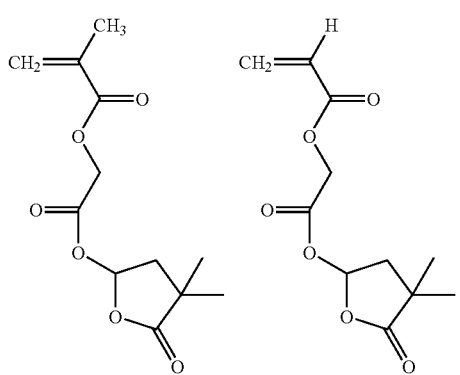
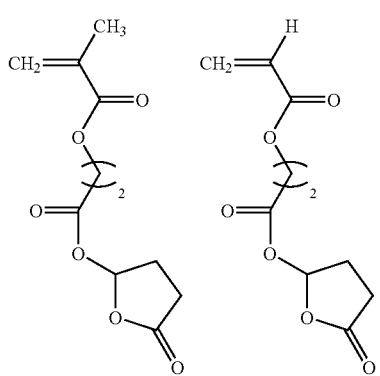
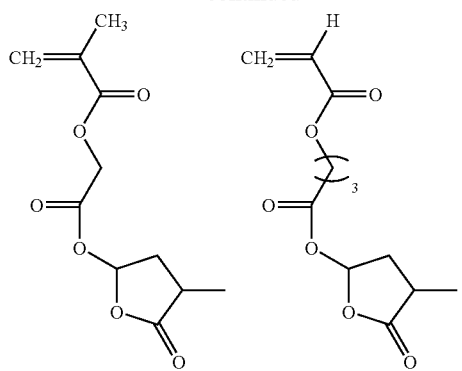
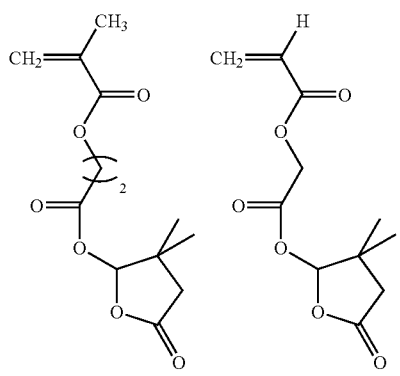

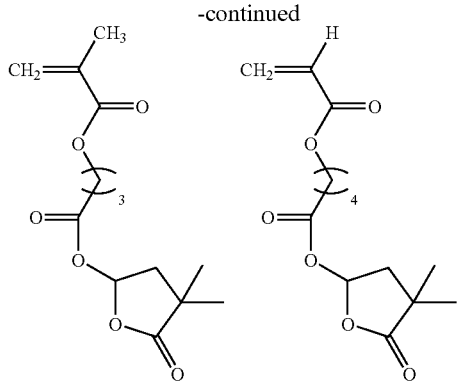
Specific examples of the monomer represented by the formula (IIIe-1) include the followings.
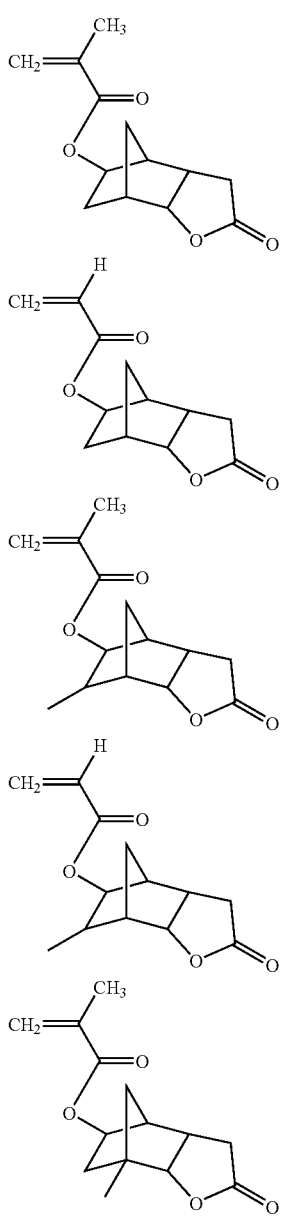
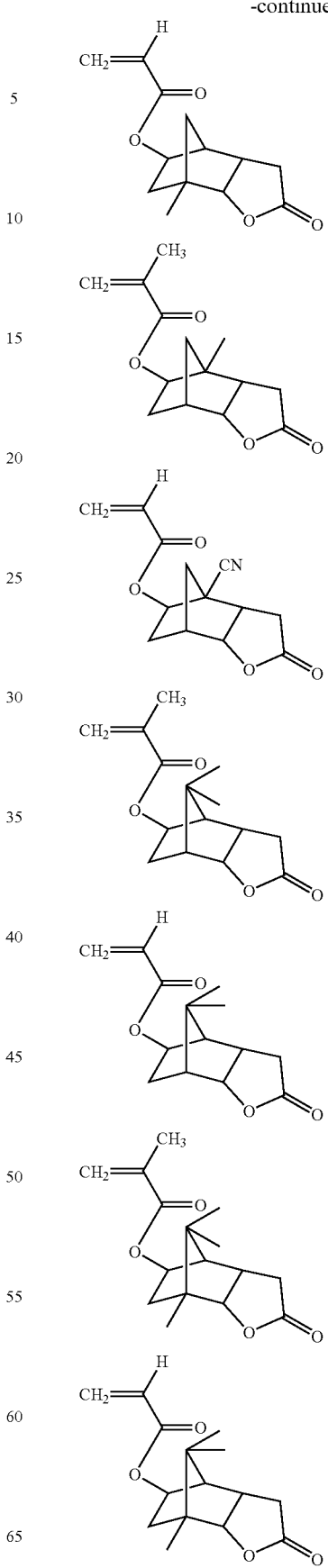

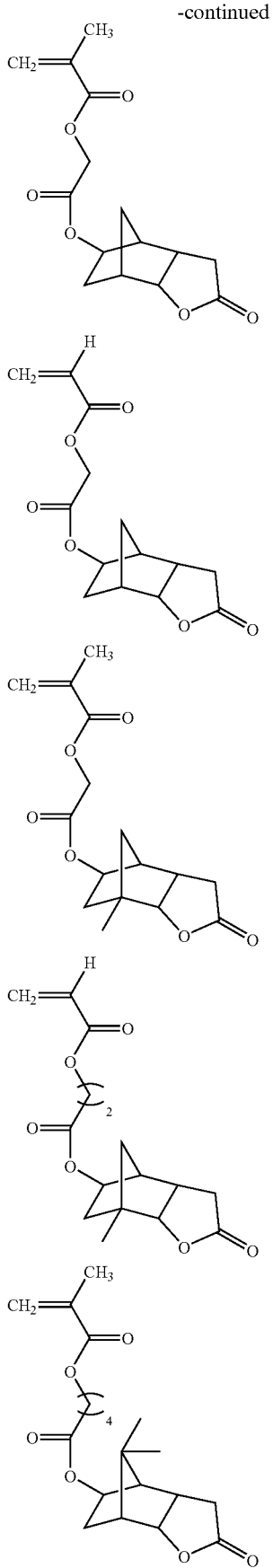
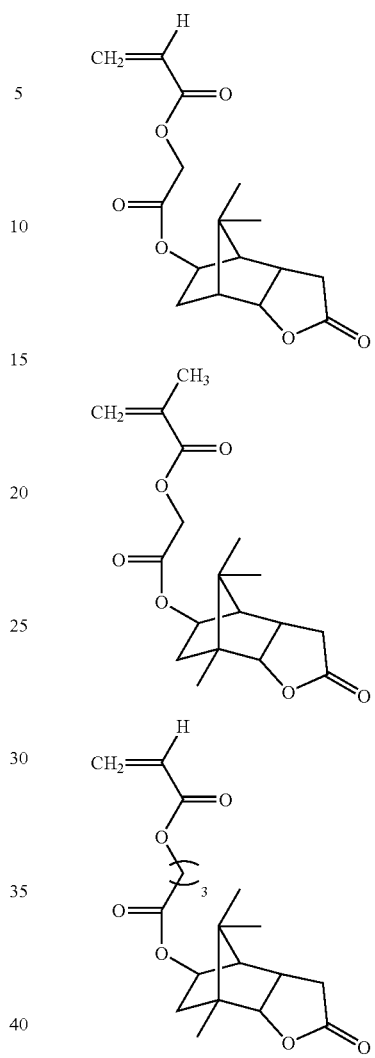
Specific examples of the monomer represented by the formula (IIIf-1) include the followings.
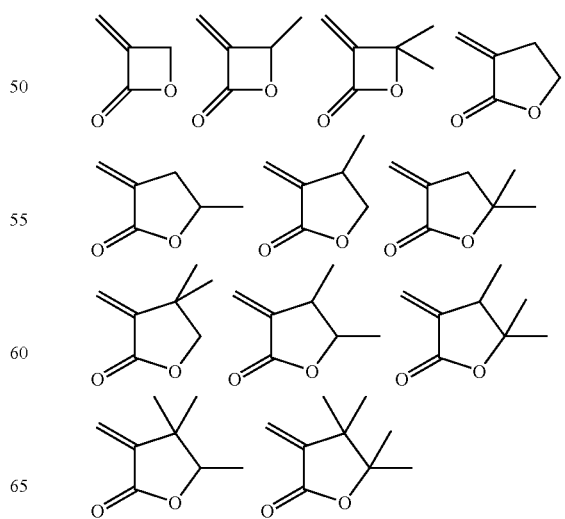

-continued

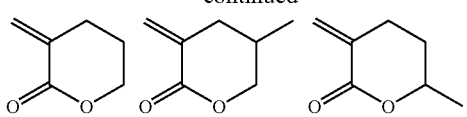

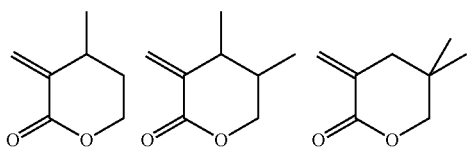

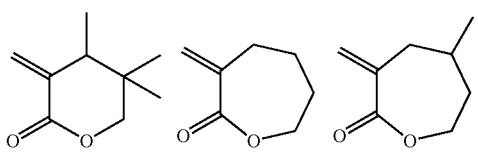

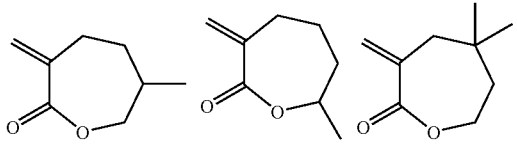

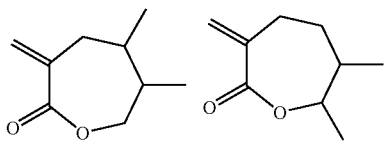

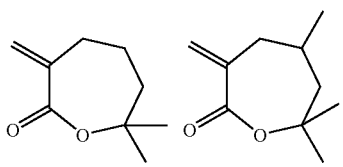

The present polymer preferably contains the structural unit (IIIb), and more preferably contains the structural unit (IIIb) and any one of the structural units (IIIa), (IIIc), (IIId), (IIIe) and (IIIf). The present polymer especially preferably contains the structural units (IIIa) and (IIIb).

The ratio of the structural unit (IIIb) is usually 10 to 100 mol % and preferably 30 to 60 mol % based on the total molar of the structural units (IIIa), (IIIb), (IIIc), (IIId), (IIIe) and (IIIf).

The monomers represented by the formulae (IIIa-1), (IIIb-1), (IIIc-1), (IIId-1), (IIIe-1) and (IIIf-1) can usually be produced by a reaction of the corresponding hydroxyl-containing lactone compound with an acrylic halide or methacrylic halide.

The polymer of the present invention may further contain a structural unit represented by the formula (IV):

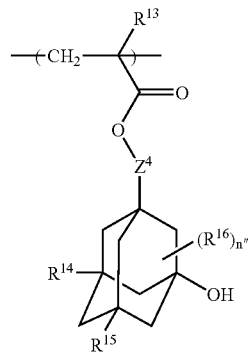

(IV)

(hereinafter, simply referred to as the structural unit (IV)).

In the formula (IV), $R^{13}$ represents a hydrogen atom or a methyl group, $R^{14}$ and $R^{15}$ each independently represents a hydrogen atom, a methyl group or a hydroxyl group, $R^{16}$ represents a methyl group, n" represents an integer of 0 to 12, $Z^4$ represents a single bond or a —$(CH_2)_q$—COO— group, and q represents an integer of 1 to 4. $R^{14}$ and $R^{15}$ preferably each independently represent a hydrogen atom or a hydroxyl group. $Z^4$ is preferably a single bond or —$CH_2$—COO—, and n" is preferably 0 or 1 and n" is more preferably 0.

The polymer may contain two or more kinds of the structural unit (IV). The present polymer preferably contains the structural unit (IV). When the present polymer preferably contains the structural unit (IV), an adhesiveness of the resist film tends to be improved and a resist composition having good line width roughness tends to be obtained.

The structural unit (IV) is derived from the monomer represented by the formula (IV-1):

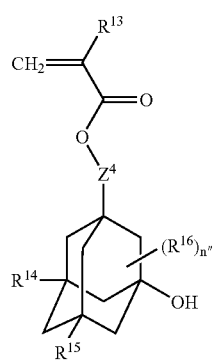

(IV-1)

wherein $R^{13}$, $R^{14}$, $R^{15}$, $R^{16}$, $Z^4$ and n" are the same as defined above.

Specific examples of the monomer represented by the formula (IV-1) include the followings.

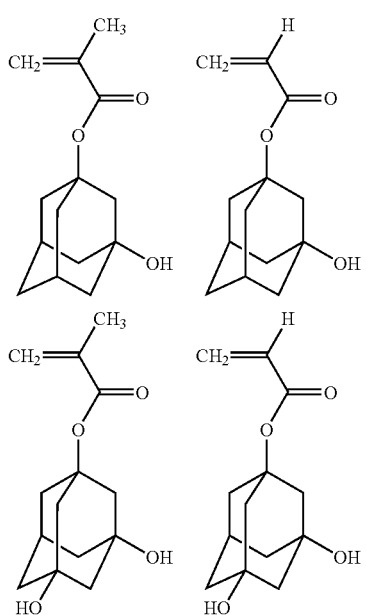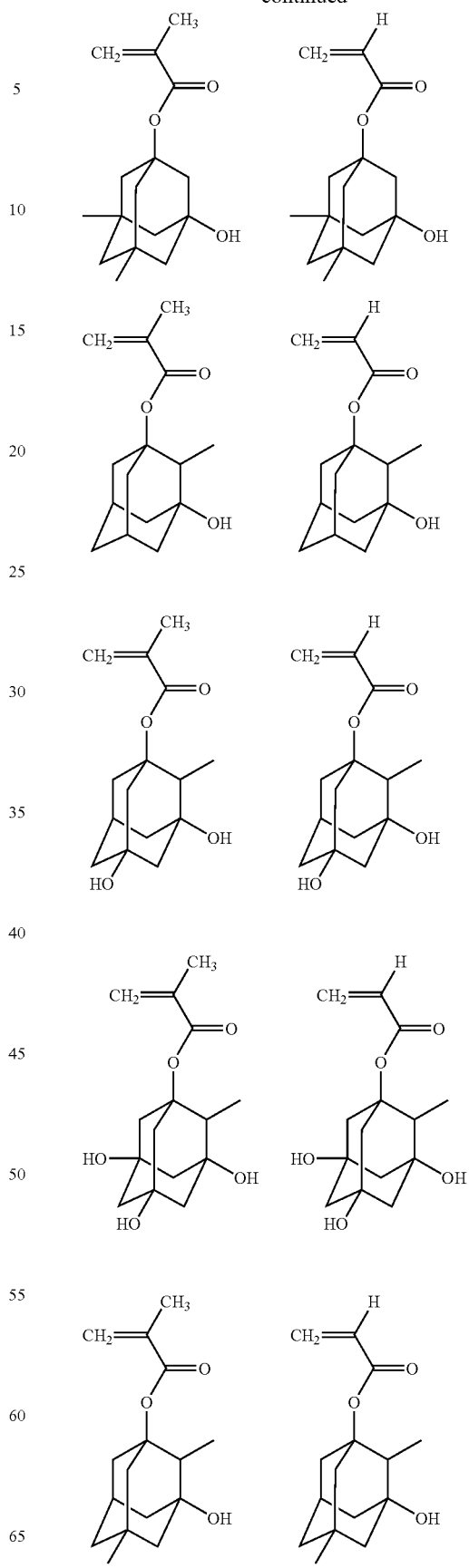

-continued
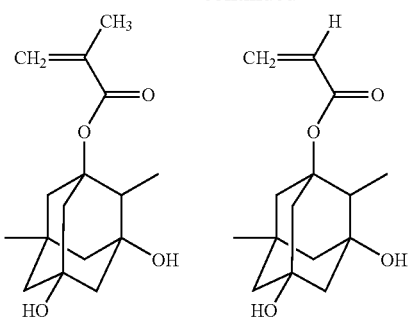
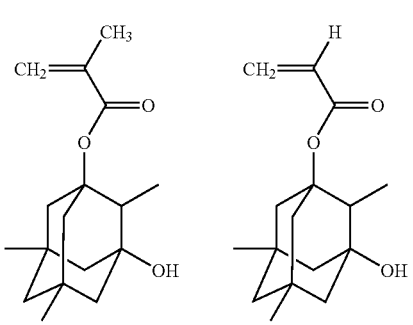
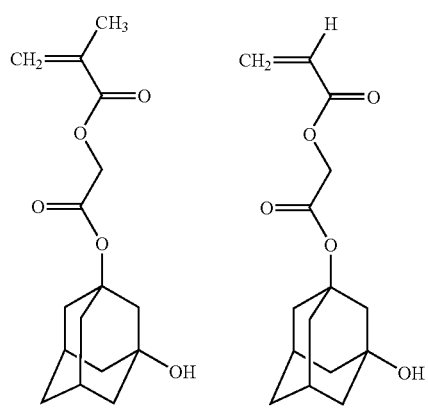
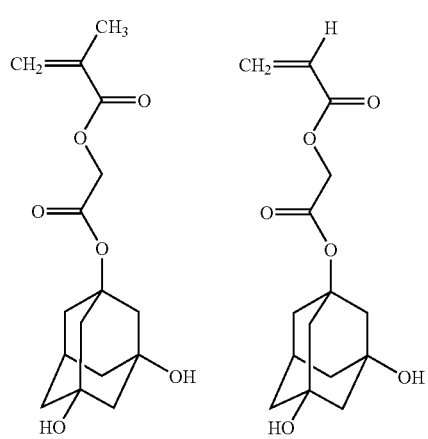
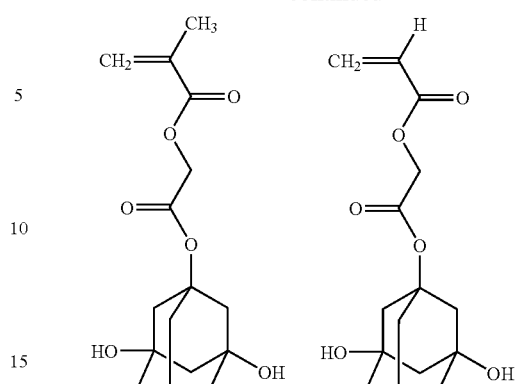
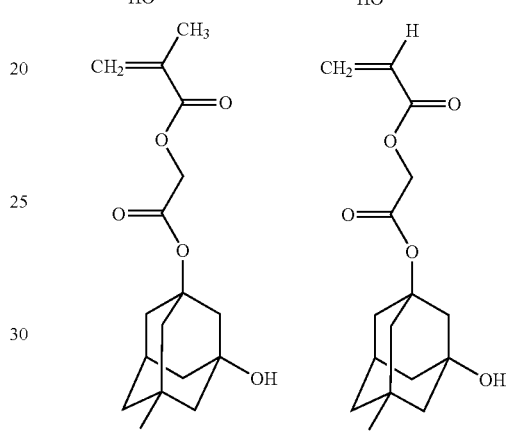
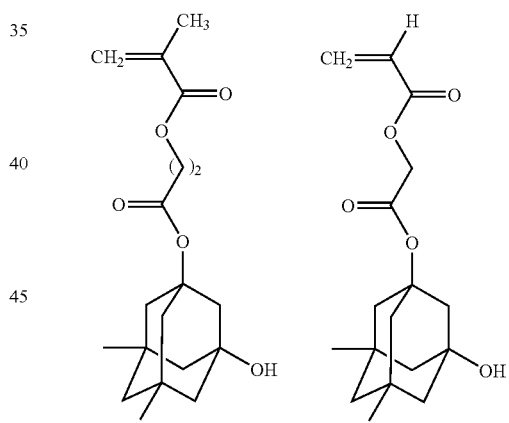
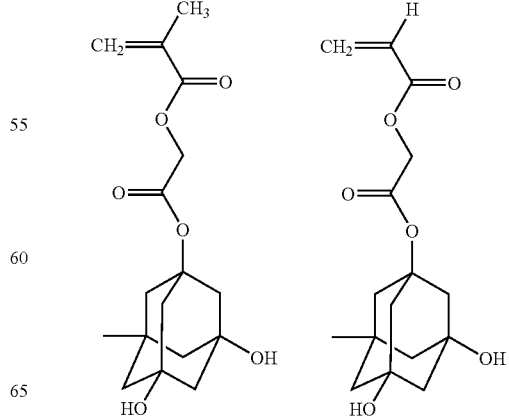

-continued
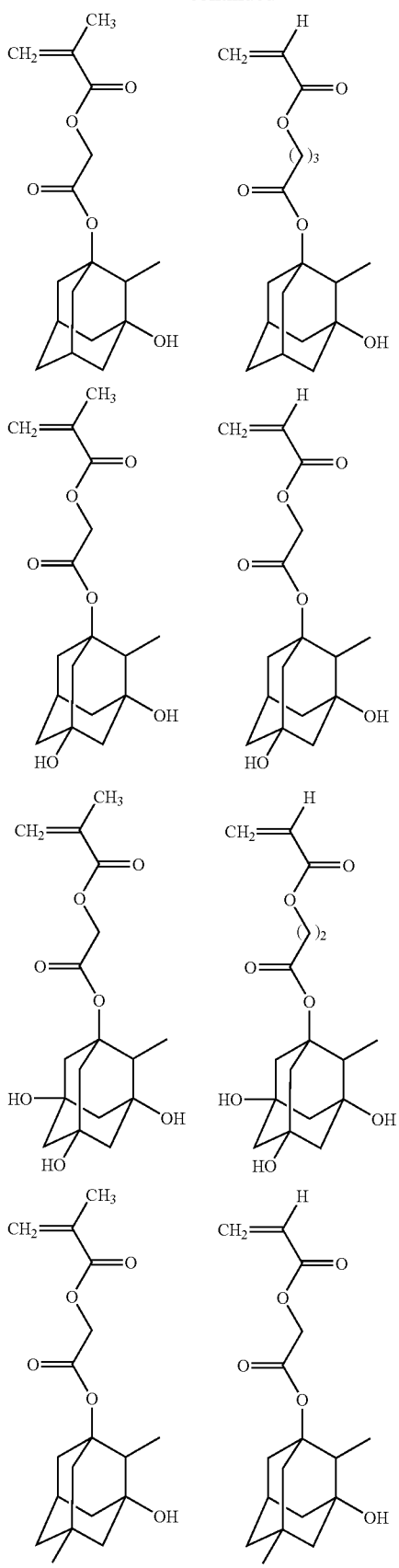
-continued
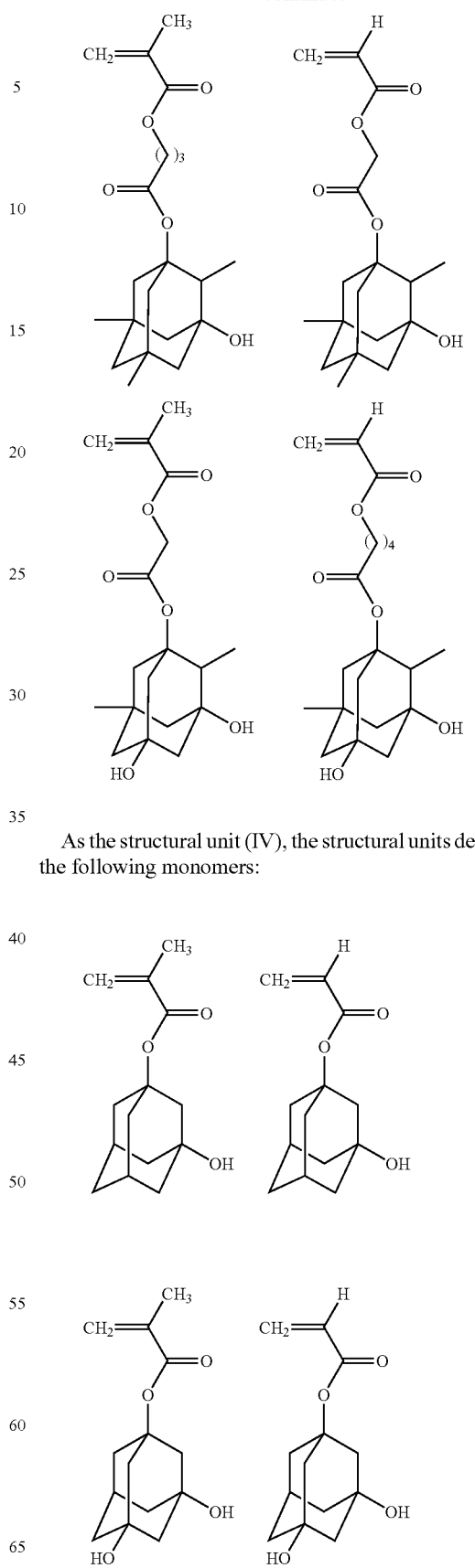
As the structural unit (IV), the structural units derived from the following monomers:

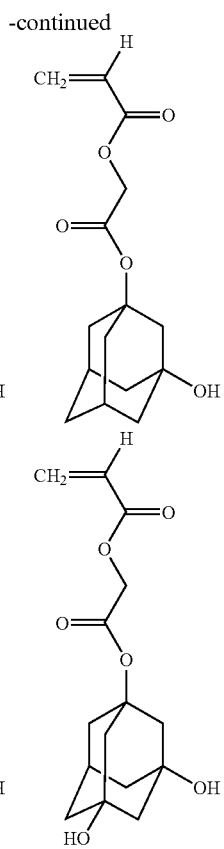

are preferable in viewpoint of the resolution of the resist composition.

The monomer represented by the formula (IV-1) can usually be produced by a reaction of the corresponding hydroxyl-containing adamantane compound with an acrylic halide or a methacrylic halide.

The weight-average molecular weight of the present polymer is usually 1,000 to 500,000 and preferably 4,000 to 50,000.

The content of the structural unit (Ia) or (Ib), the content of the structural unit (II) and the content of the structural unit having a lactone structure are usually 10 to 79 mol %, 1 to 30 mol % and 20 to 80 mol %, respectively, with the proviso that the total of the contents of the structural units (Ia), (Ib) and (II) and the structural unit having a lactone structure does not exceed 100 mol %.

The content of the structural unit (Ia) or (Ib), the content of the structural unit (II) and the content of the structural unit having a lactone structure are preferably 20 to 60 mol %, 3 to 20 mol % and 30 to 70 mol %, respectively, with the proviso that the total of the contents of the structural units (Ia), (Ib) and (II) and the structural unit having a lactone structure does not exceed 100 mol %.

Herein, "the structural unit having a lactone structure" means the structural units (IIIa), (IIIb), (IIIc), (IIId), (IIIe) and (IIIf).

When the present polymer further contains the structural unit (IV), the content of the structural unit (IV) is usually 1 to 30 mol % and preferably 3 to 20 mol %, with the proviso that the total of the contents of all the structural units is 100 mol %.

The polymer of which Log P value is 2.10 or more is preferable. Herein, the hydrophilicity/hydrophobicity parameter Log P of the resin means a common logarithm of a partition coefficient P of the resin and is a value representing how the resin is distributed at equilibrium in a two-phase system containing an oil (typically, 1-octanol) and water, which can be calculated by the following equation:

$$\text{Log } P = \text{Log}(C_{oil}/C_{water})$$

wherein $C_{oil}$ represents a mol concentration of the resin in oil phase and $C_{water}$ represents a mol concentration of the resin in water phase. Log P values may be empirically measured in a distribution experiment and calculated by using calculating software for estimating Log P value form structural formulae. In the present invention, Log P value of the monomer used to give the corresponding structural unit is calculated by using a Log P value estimating program incorporated into Chem Draw Ultra version 9.0.1 provided by CambridgeSoft Corporation and Log P value of the resin is calculated by the following equation:

Log P value of the resin=Σ (each calculated Log P value of the monomer used to give the corresponding structural unit in the resin X each content ratio of the corresponding structural unit in the resin).

The polymer of the present invention itself is insoluble or poorly soluble in an alkali aqueous solution but becomes soluble in an alkali aqueous solution by the action of an acid. The polymer may have other structural unit or units.

Examples of the other structural unit include a structural unit derived from an alicyclic compound having an olefinic double bond such as a structural unit represented by the formula (1):

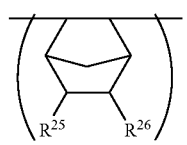

(1)

wherein $R^{25}$ and $R^{26}$ each independently represents a hydrogen atom, a C1-C3 alkyl group, a C1-C3 hydroxyalkyl group, a carboxyl group, a cyano group, a hydroxyl group or a —COOU group in which U represents an alcohol residue, or $R^{25}$ and $R^{26}$ can be bonded together to form a carboxylic anhydride residue represented by —C(=O)OC(=O)—;

a structural unit derived from an aliphatic unsaturated dicarboxylic anhydride such as a structural unit represented by the formula (2):

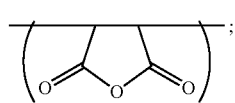

(2)

and
a structural unit represented by the formula (3):

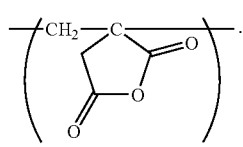

(3)

The polymer containing a structural unit derived from 2-norbornene shows strong structure because the alicyclic group is directly present on its main chain and shows a property that dry etching resistance is more excellent. The structural unit derived from 2-norbornene can be introduced into the main chain by radical polymerization using, for example, an aliphatic unsaturated dicarboxylic anhydride such as maleic anhydride and itaconic anhydride together in addition to corresponding 2-norbornene. The structural unit derived from 2-norbornene is formed by opening of its double bond, and can be represented by the above-mentioned formula (1). The structural units derived from maleic anhydride and from itaconic anhydride, which are the structural units derived from aliphatic unsaturated dicarboxylic anhydrides, are formed by opening of their double bonds, and can be represented by the above-mentioned formula (2) and the formula (3), respectively.

In $R^{25}$ and $R^{26}$, examples of the C1-C3 alkyl group include a methyl group, an ethyl group, and an n-propyl group, and examples of the C1-C3 hydroxyalkyl group include a hydroxymethyl group and a 2-hydroxyethyl group.

In $R^{25}$ and $R^{26}$, the —COOU group is an ester formed from the carboxyl group, and as the alcohol residue corresponding to U, for example, an optionally substituted C1-C8 alkyl group, 2-oxooxolan-3-yl group, 2-oxooxolan-4-yl and the like are listed, and as the substituent on the C1-C8 alkyl group, a hydroxyl group, an alicyclic hydrocarbon residue and the like are listed.

Specific examples of the monomer used to give the structural unit represented by the above-mentioned formula (1) include 2-norbornene, 2-hydroxy-5-norbornene, 5-norbornene-2-carboxylic acid, methyl 5-norbornene-2-carboxylate, 2-hydroxyethyl 5-norbornene-2-carboxylate, 5-norbornene-2-methanol and 5-norbornene-2,3-dicarboxylic anhydride.

When U in the —COOU group is the acid-labile group, the structural unit represented by the formula (1) is a structural unit having the acid-labile group even if it has the norbornane structure. Examples of monomers giving structural unit having the acid-labile group include tert-butyl 5-norbornene-2-carboxylate, 1-cyclohexyl-1-methylethyl 5-norbornene-2-carboxylate, 1-methylcyclohexyl 5-norbornene-2-carboxylate, 2-methyl-2-adamantyl 5-norbornene-2-carboxylate, 2-ethyl-2-adamantyl 5-norbornene-2-carboxylate, 1-(4-methylcyclohexyl)-1-methylethyl 5-norbornene-2-carboxylate, 1-(4-hydroxylcyclohexyl)-1-methylethyl 5-norbornene-2-carboxylate, 1-methyl-1-(4-oxocyclohexyl)ethyl 5-norbornene-2-carboxylate, and 1-(1-adamantyl)-1-methylethyl 5-norbornene-2-carboxylate.

The ratio of the other structural unit or units is usually 0 to 50% by mole based on all structural units of the polymer of the present invention.

The polymer of the present invention can be produced by conducting the polymerization reaction of the corresponding monomer or monomers. The polymer of the present invention can be also produced by conducting the oligomerization reaction of the corresponding monomer or monomers followed by polymerizing the oligomer obtained.

The polymerization reaction is usually carried out in the presence of a radical initiator.

The radical initiator is not limited and examples thereof include an azo compound such as 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl-2,2'-azobis(2-methylpropionate) and 2,2'-azobis(2-hydroxymethylpropionitrile); an organic hydroperoxide such as lauroyl peroxide, tert-butyl hydroperoxide, benzoyl peroxide, tert-butyl peroxybenzoate, cumene hydroperoxide, diisopropyl peroxydicarbonate, di-n-propyl peroxydicarbonate, tert-butyl peroxyneodecanoate, tert-butyl peroxypivalate and 3,5,5-trimethylhexanoyl peroxide; and an inorganic peroxide such as potassium peroxodisulfate, ammonium peroxodisulfate and hydrogen peroxide. Among them, the azo compound is preferable and 2,2'-azobisisobutyronitrile, 2,2'-azobis(2-methylbutyronitrile), 1,1'-azobis(cyclohexane-1-carbonitrile), 2,2'-azobis(2,4-dimethylvaleronitrile) and dimethyl-2,2'-azobis(2-methylpropionate) are more preferable, and 2,2'-azobisisobutyronitrile and 2,2'-azobis(2,4-dimethylvaleronitrile) are especially preferable.

These radical initiators may be used alone or in a form of a mixture of two or more kinds thereof. When the mixture of two or more kinds thereof is used, the mixed ratio is not particularly limited.

When the mixture of two kinds thereof is used, the combination of 2,2'-azobis(2,4-dimethylvaleronitrile) and 2,2'-azobisisobutyronitrile, the combination of 2,2'-azobis(2,4-dimethylvaleronitrile) and 2,2'-azobis(2-methylbutyronitrile), the combination of 2,2'-azobis(2,4-dimethylvaleronitrile) and 1,1'-azobis(cyclohexane-1-carbonitrile), and the combination of 2,2'-azobis(2,4-dimethylvaleronitrile) and dimethyl-2,2'-azobis(2-methylpropionate) are preferable, and the mixed ratio thereof is preferably 1/1 to 1/10.

The amount of the radical initiator is preferably 1 to 20% by mole based on all monomer or oligomer molar amounts.

The polymerization temperature is usually 0 to 150° C., and preferably 40 to 100° C.

The polymerization reaction is usually carried out in the presence of a solvent and it is preferred to use a solvent which is sufficient to dissolve the monomer, the radical initiator and the resin obtained. Examples thereof include a hydrocarbon solvent such as toluene; an ether solvent such as 1,4-dioxane and tetrahydrofuran; a ketone solvent such as methyl isobutyl ketone; an alcohol solvent such as isopropyl alcohol; a cyclic ester solvent such as γ-butyrolactone; a glycol ether ester solvent such as propylene glycol monomethyl ether acetate; and an acyclic ester solvent such as ethyl lactate. These solvents may be used alone and a mixture thereof may be used.

The amount of the solvent is not limited, and practically, it is preferably to 5 parts by weight per 1 part of all monomers or oligomers.

When an alicyclic compound having an olefinic double bond and an aliphatic unsaturated dicarboxylic anhydride are used as monomers, it is preferable to use them in excess amount in view of a tendency that these are not easily polymerized.

After completion of the polymerization reaction, the polymer produced can be isolated, for example, by adding a solvent in which the present polymer is insoluble or poorly soluble to the reaction mixture obtained and filtering the precipitated resin. If necessary, the isolated polymer may be purified, for example, by washing with a suitable solvent.

The present chemically amplified resist composition comprises the polymer of the present invention and at least one acid generator.

The acid generator is a substance which is decomposed to generate an acid by applying a radiation such as a light, an electron beam or the like on the substance itself or on a resist composition containing the substance. The acid generated from the acid generator acts on the polymer resulting in cleavage of the acid-labile group existing in the resin.

Examples of the acid generator include an onium salt compound, an organo-halogen compound, a sulfone compound, a sulfonate compound, and the like. The onium salt compound is preferable.

Other examples of the acid generator include acid generators described in JP 2003-5374 A1.

Other examples of the acid generator include a salt represented by the formula (V):

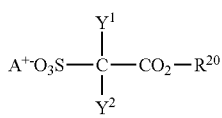

wherein $Y^1$ and $Y^2$ each independently represent a fluorine atom or a C1-C6 perfluoroalkyl group, $R^{20}$ represents a C1-C6 linear or branched chain hydrocarbon group or a C3-C30 monocyclic or polycyclic hydrocarbon group which may be substituted with at least one selected from the group consisting of a C1-C6 alkyl group, a C1-C6 alkoxy group, a C1-C4 perfluoroalkyl group, a hydroxyl group and a cyano group, and at least one —$CH_2$— in the hydrocarbon group may be substituted with —CO— or —O— or at least one hydrogen atom in the hydrocarbon group may be substituted with a hydroxyl group, and $A^+$ represents an organic counterion (hereinafter, simply referred to as Salt (V)).

Examples of the C1-C6 perfluoroalkyl group represented by $Y^1$ and $Y^2$ include a trifluoromethyl group, a pentafluoroethyl group, a heptafluoropropyl group, a nonafluorobutyl group, an undecafluoropentyl group and a tridecafluorohexyl group, and a trifluoromethyl group is preferable. $Y^1$ and $Y^2$ each independently is preferably a fluorine atom or a trifluoromethyl group, and $Y^1$ and $Y^2$ are more preferably fluorine atoms.

The C3-C30 monocyclic or polycyclic hydrocarbon group of $R^{20}$ may have an alicyclic structure or structures and may have an aromatic group or groups. The C3-C30 monocyclic or polycyclic hydrocarbon group may have a carbon-carbon double bond or bonds.

Examples of the C1-C6 linear or branched chain hydrocarbon group include a methyl group, an ethyl group, an n-propyl group, an isopropyl group, an n-butyl group, an isobutyl group, a sec-butyl group, a tert-butyl group, an n-pentyl group and an n-hexyl group.

Examples of the C3-C30 monocyclic or polycyclic hydrocarbon group include a hydrocarbon group having a cyclobutane ring, a hydrocarbon group having a cyclopentane ring, a hydrocarbon group having a cyclohexane ring, a hydrocarbon group having a cyclooctane ring, a hydrocarbon group having an adamantane ring, a hydrocarbon group having a benzene ring and a hydrocarbon group having a norbornane ring.

Examples of the C1-C6 alkyl group include a methyl group, an ethyl group, an n-propyl group, an isopropyl group, an n-butyl group, an isobutyl group, a sec-butyl group, a tert-butyl group, an n-pentyl group and n-hexyl group. Examples of the C1-C6 alkoxy group include a methoxy group, an ethoxy group, an n-propoxy group, an isopropoxy group, an n-butoxy group, an isobutoxy group, a sec-butoxy group, a tert-butoxy group, an n-pentyloxy group and an n-hexyloxy group. Examples of the C1-C4 perfluoroalkyl group include a trifluoromethyl group, a pentafluoroethyl group, a heptafluoropropyl group and a nonafluorobutyl group.

Specific examples of the anion part of Salt (V) include the followings.

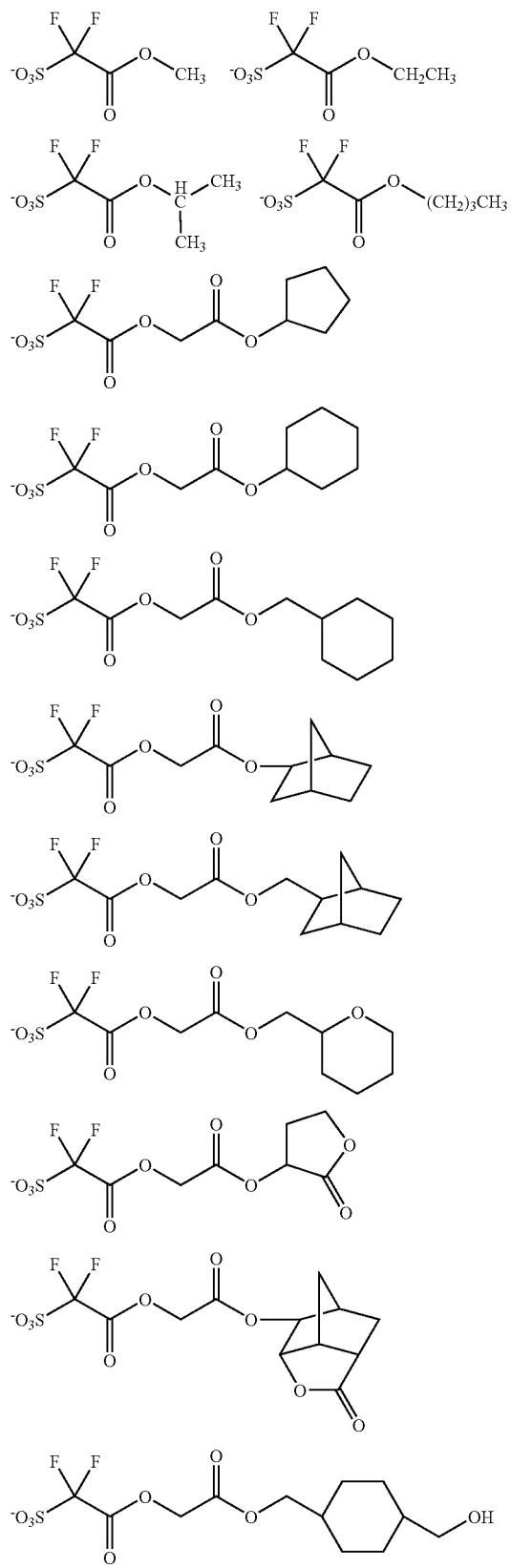

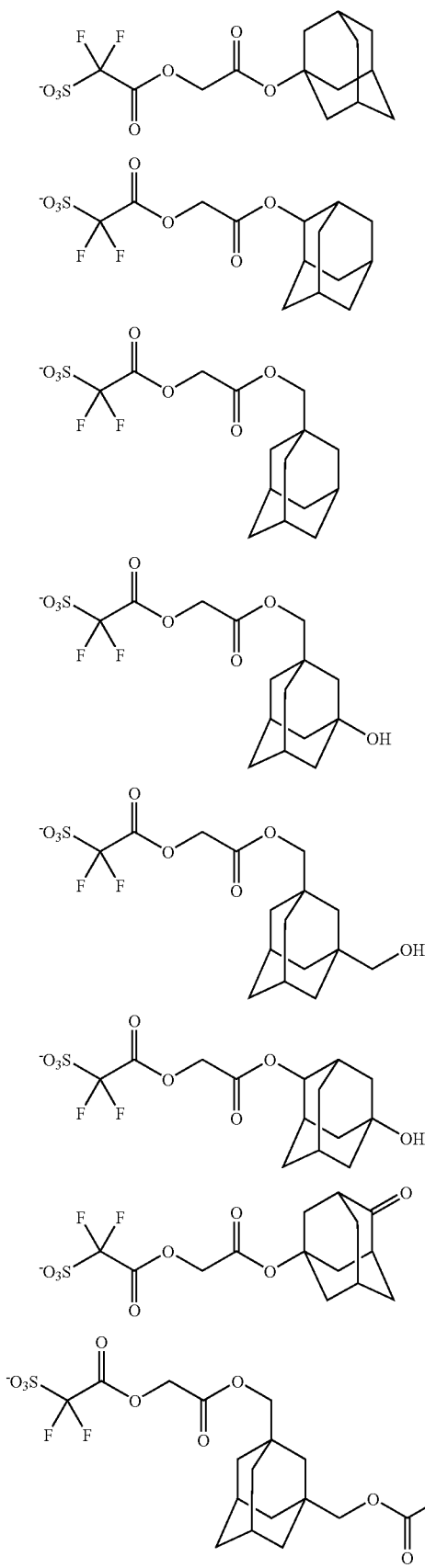
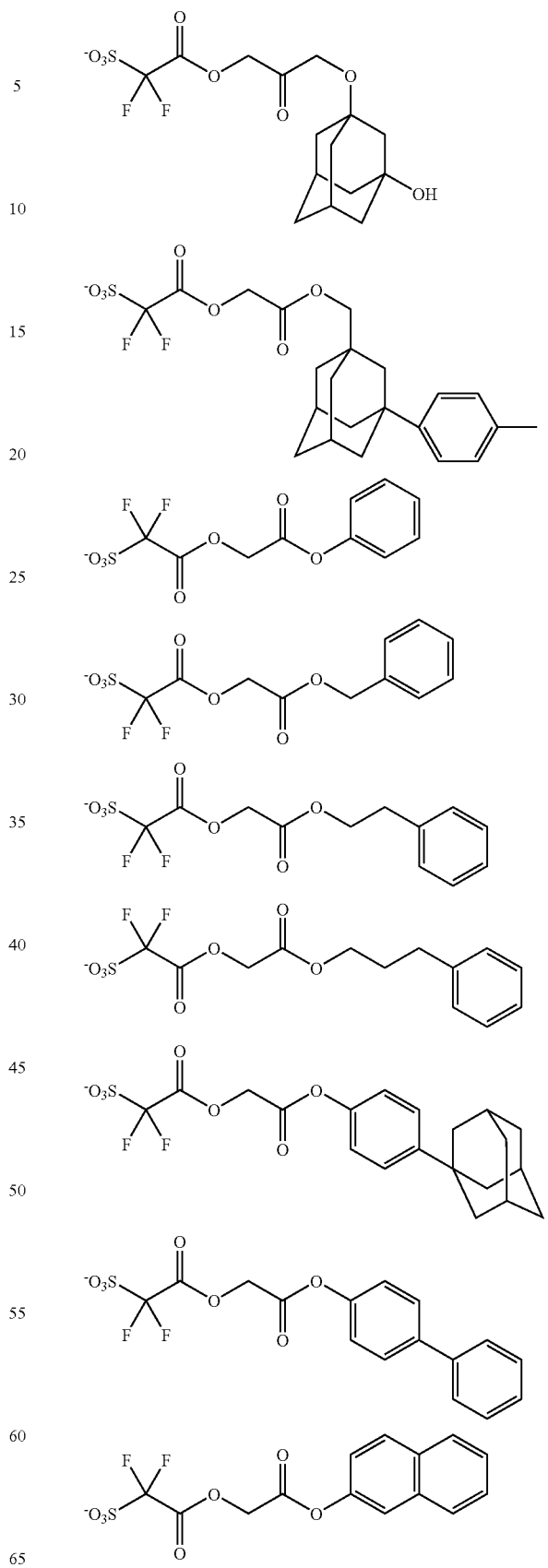

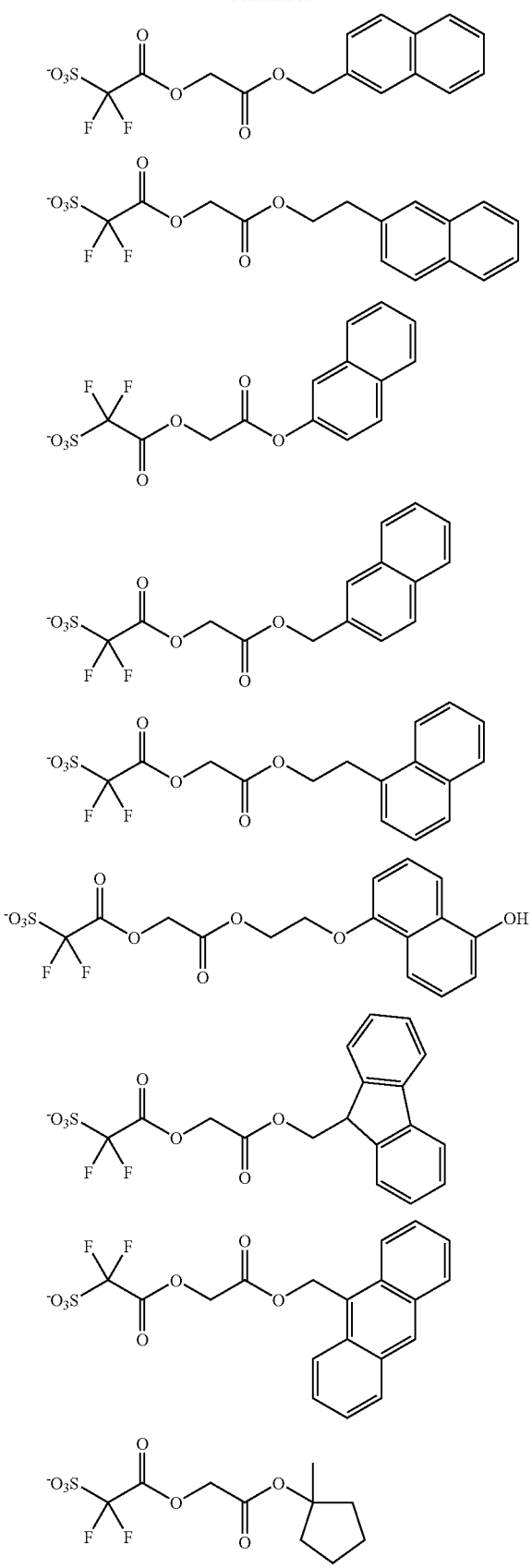
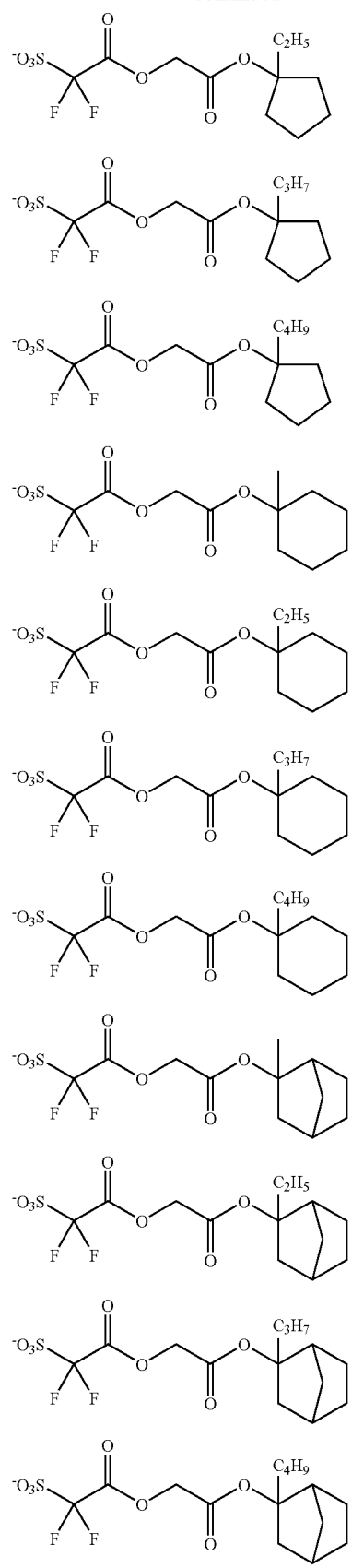

85
-continued
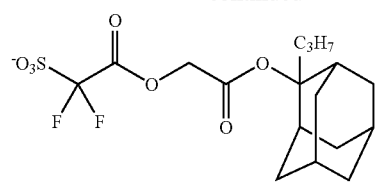
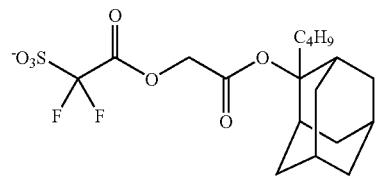
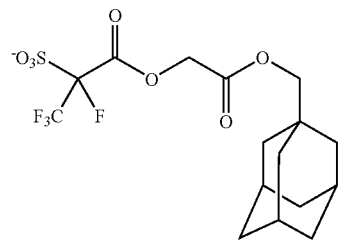
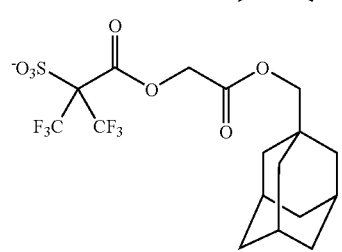
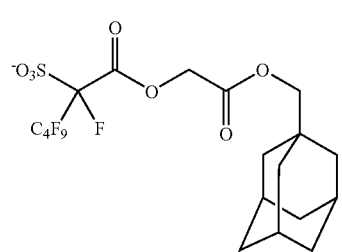
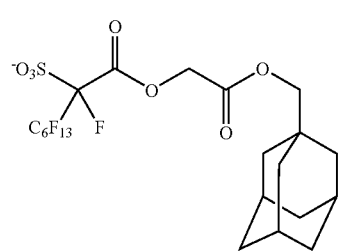
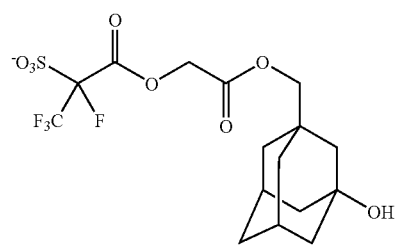
86
-continued
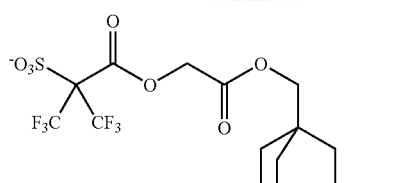
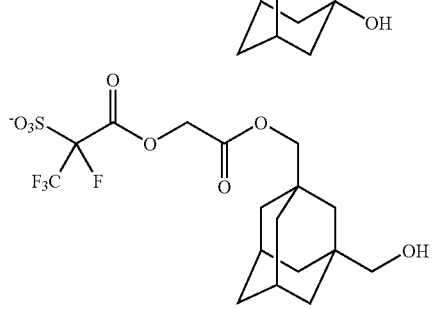
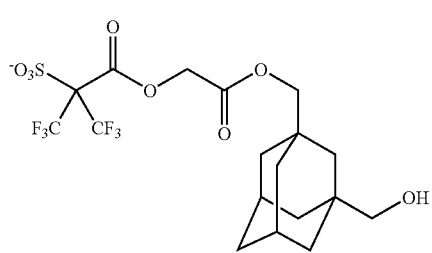
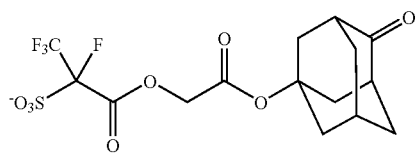
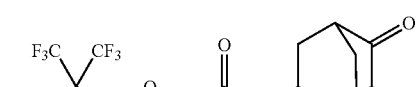
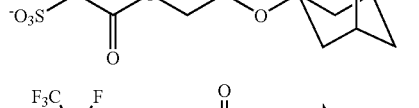
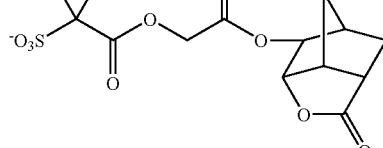
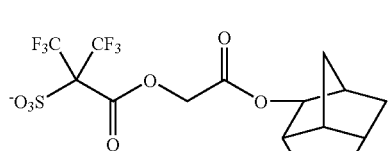
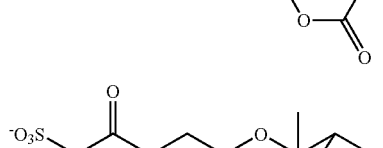
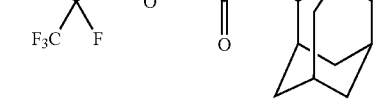

87
-continued
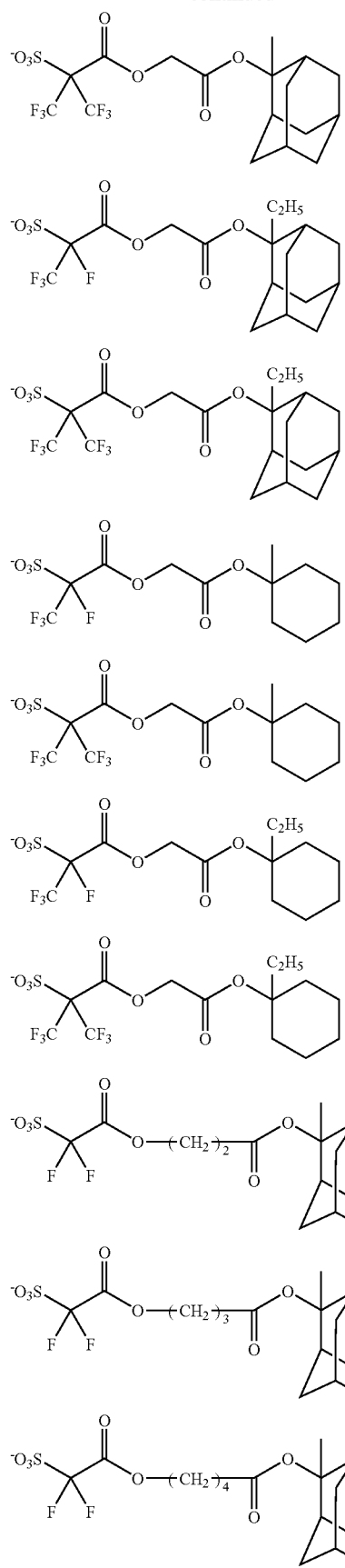
88
-continued
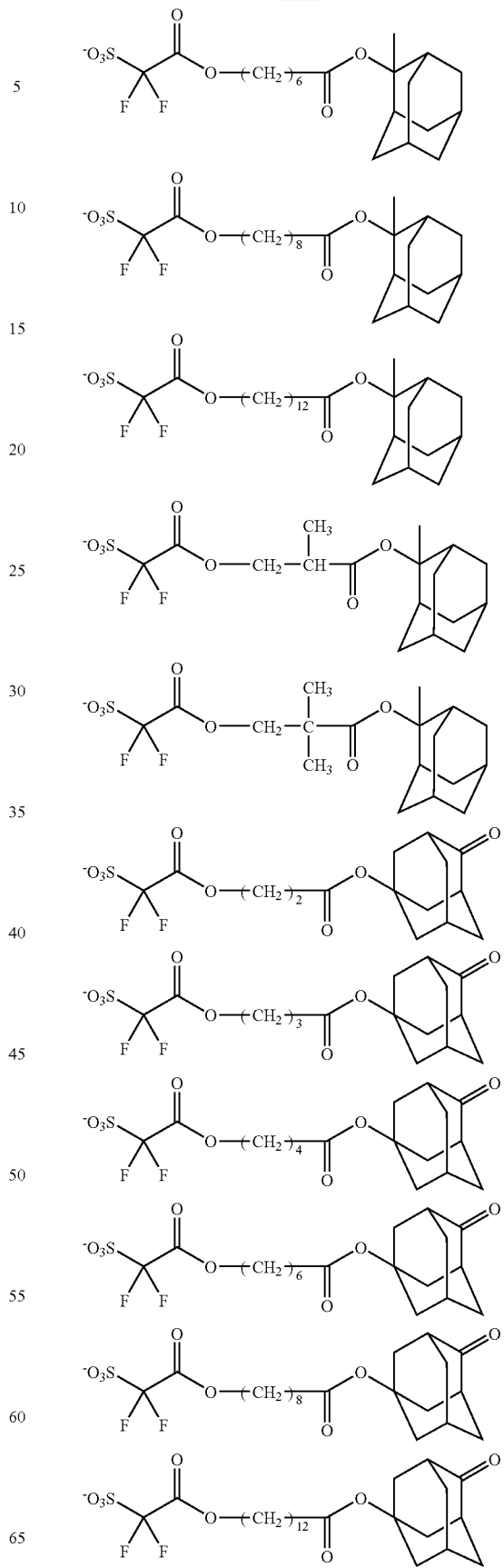

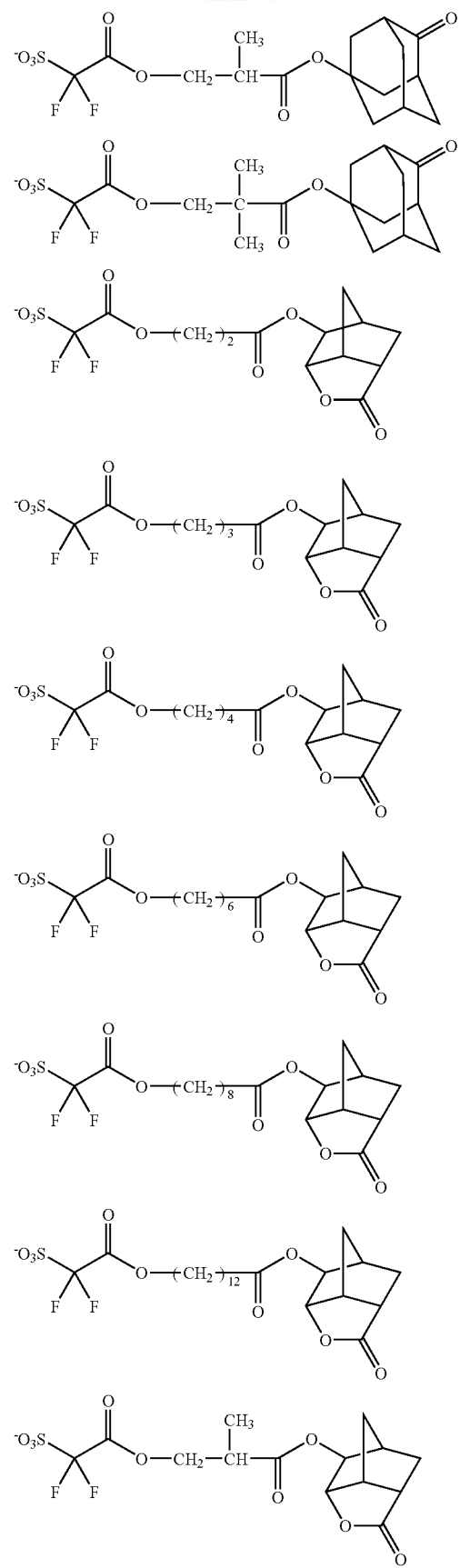
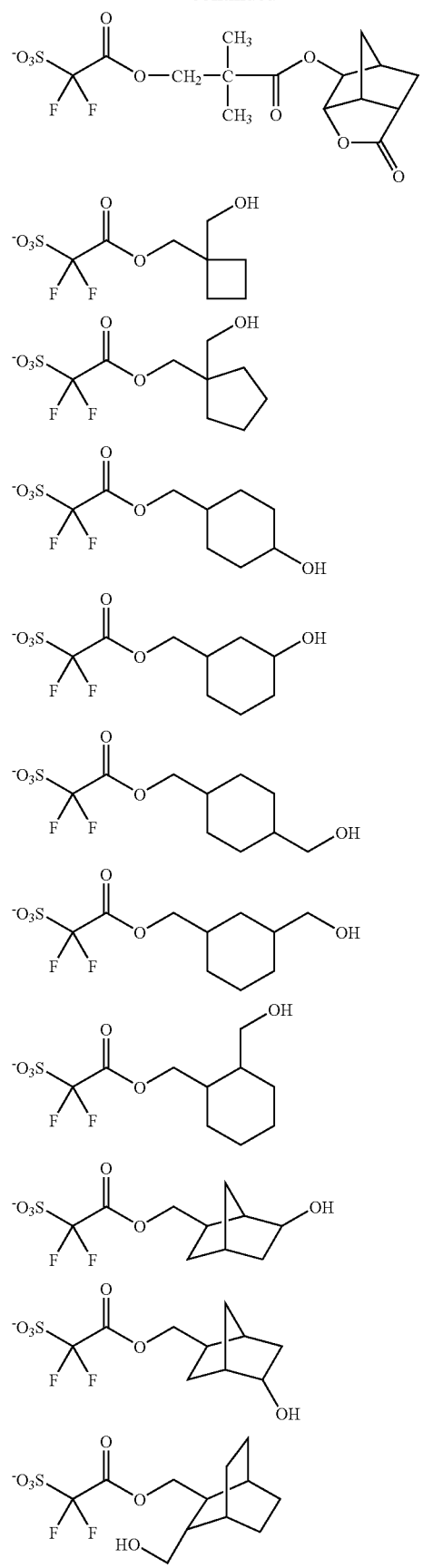

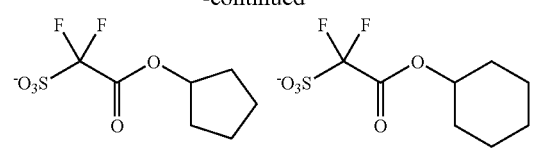
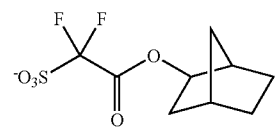
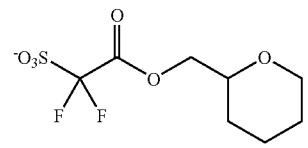
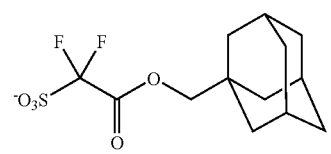
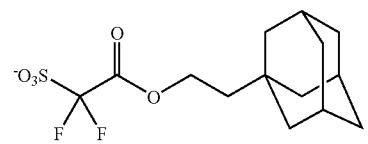
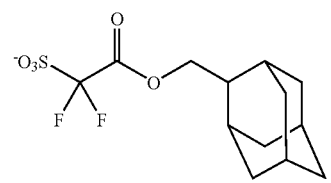
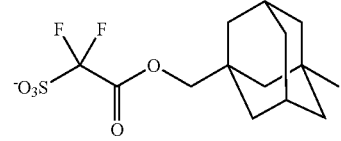
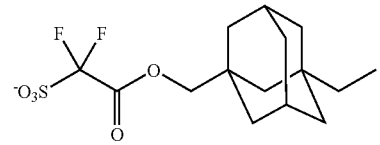
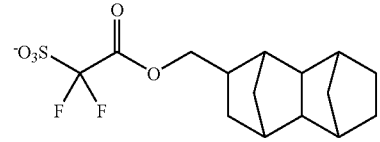
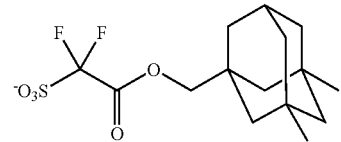
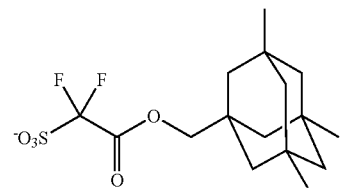
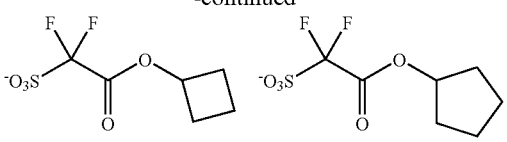
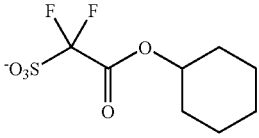
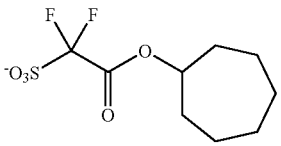
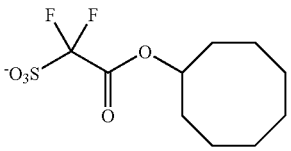
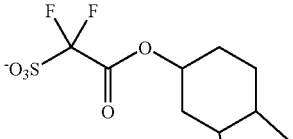
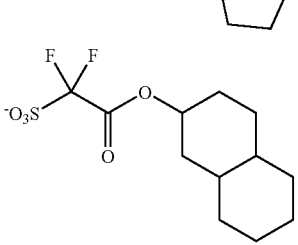
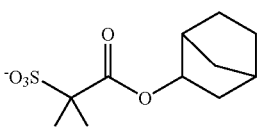
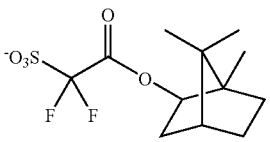
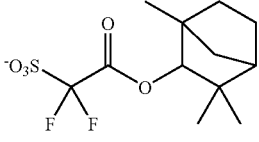
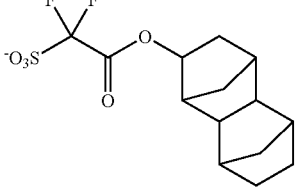

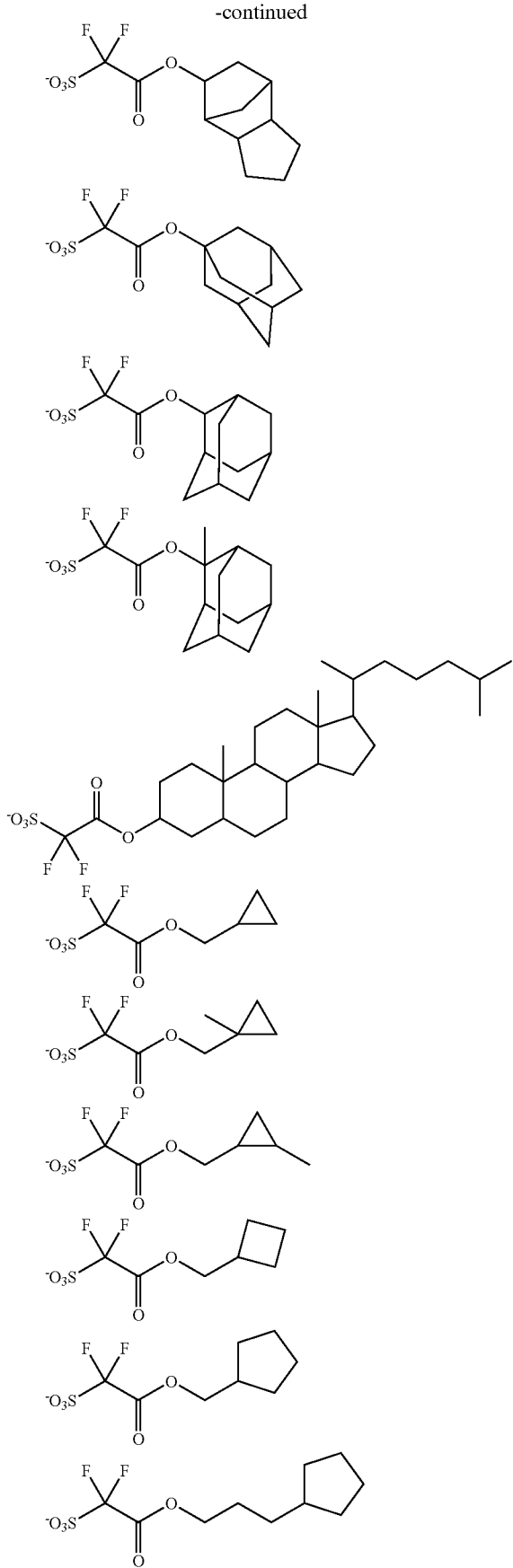
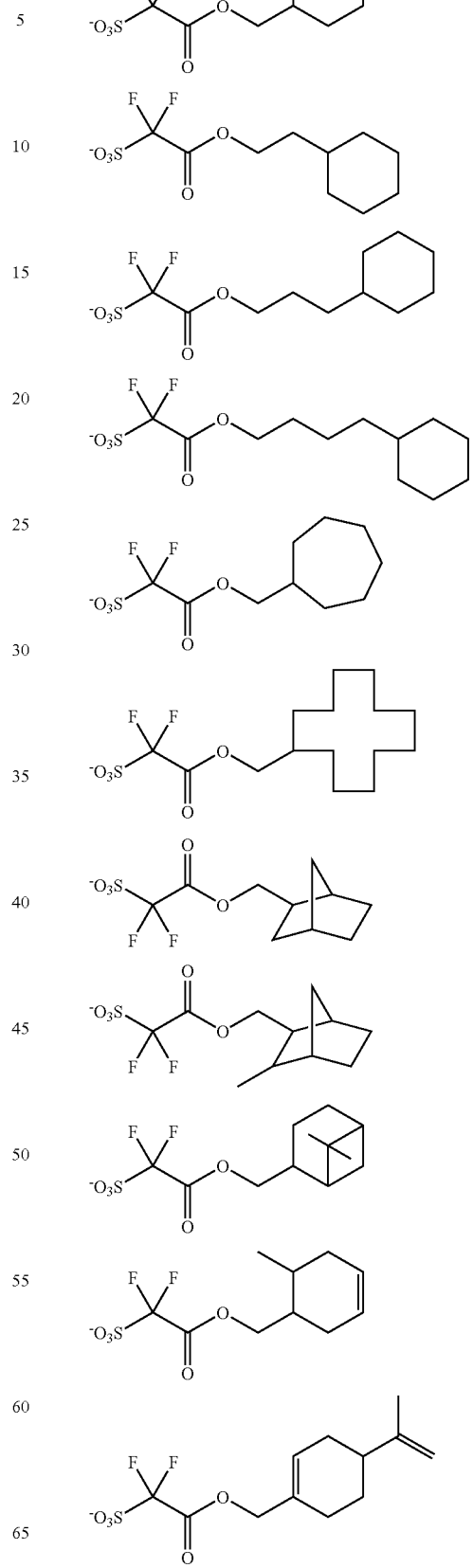

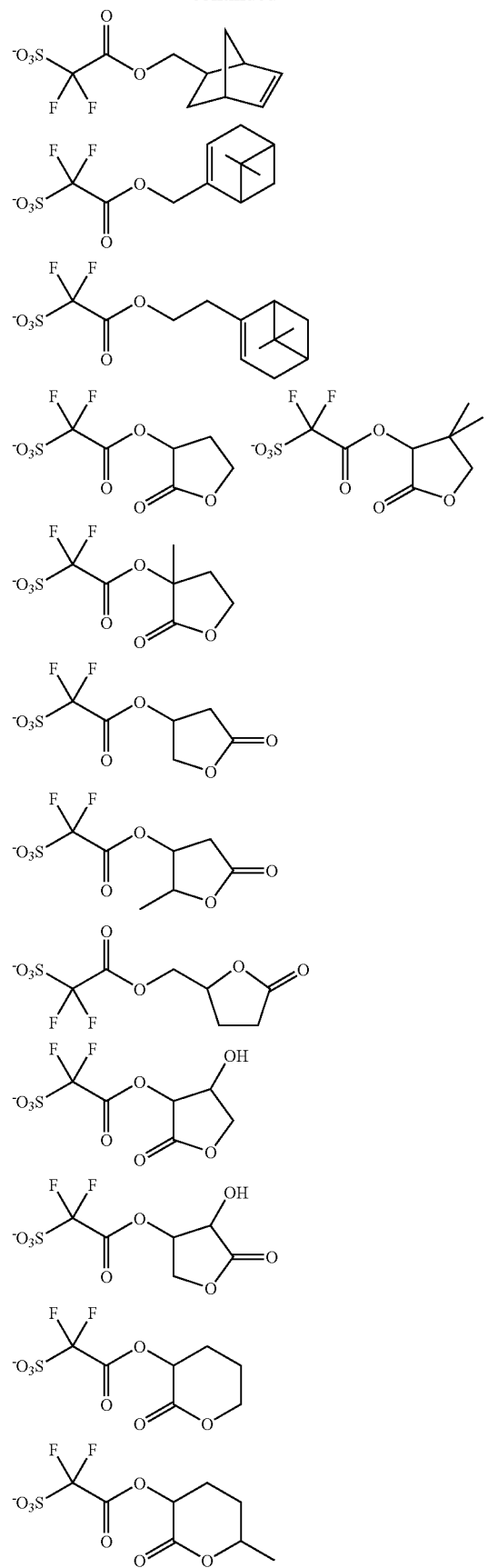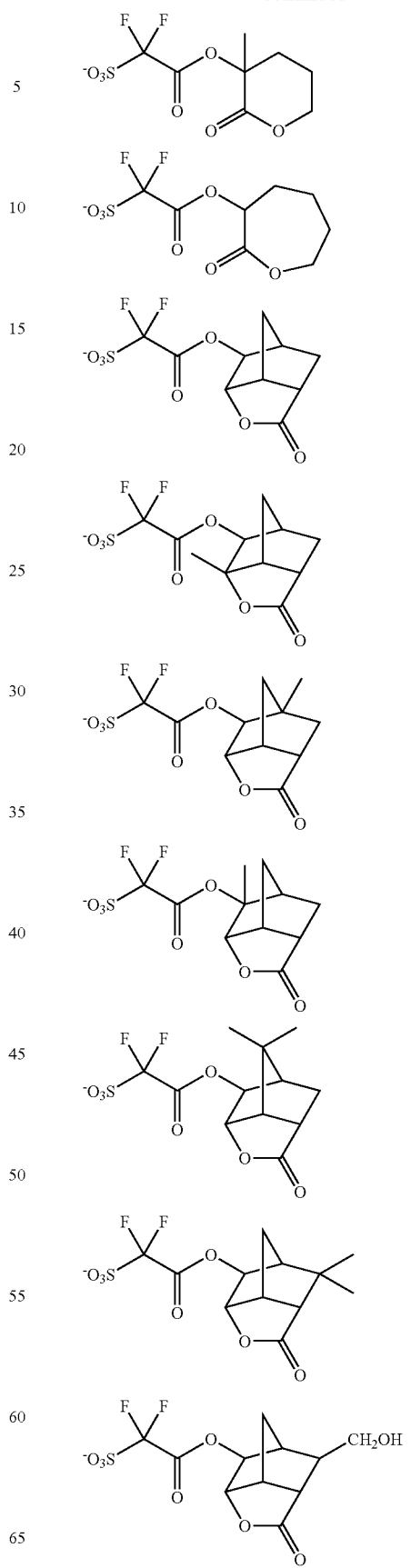

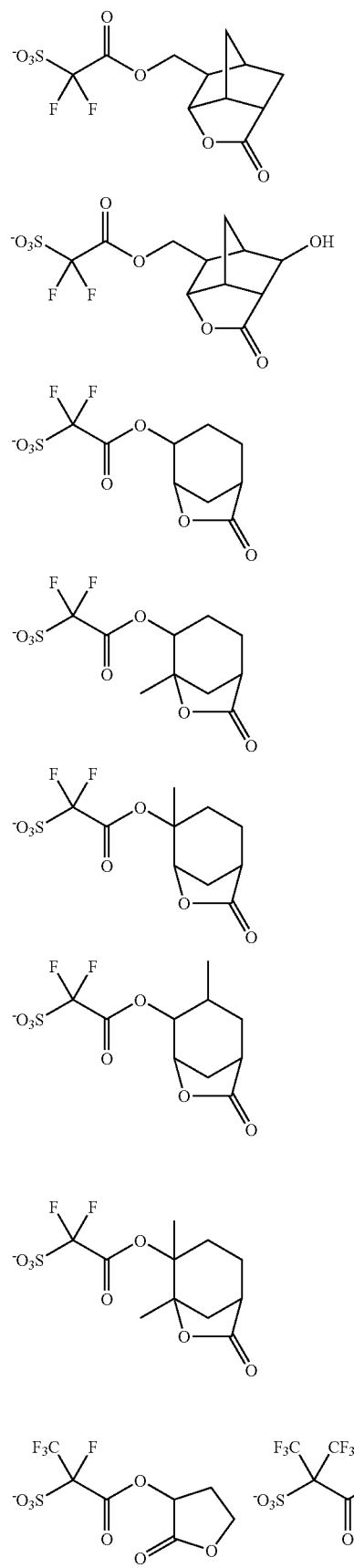
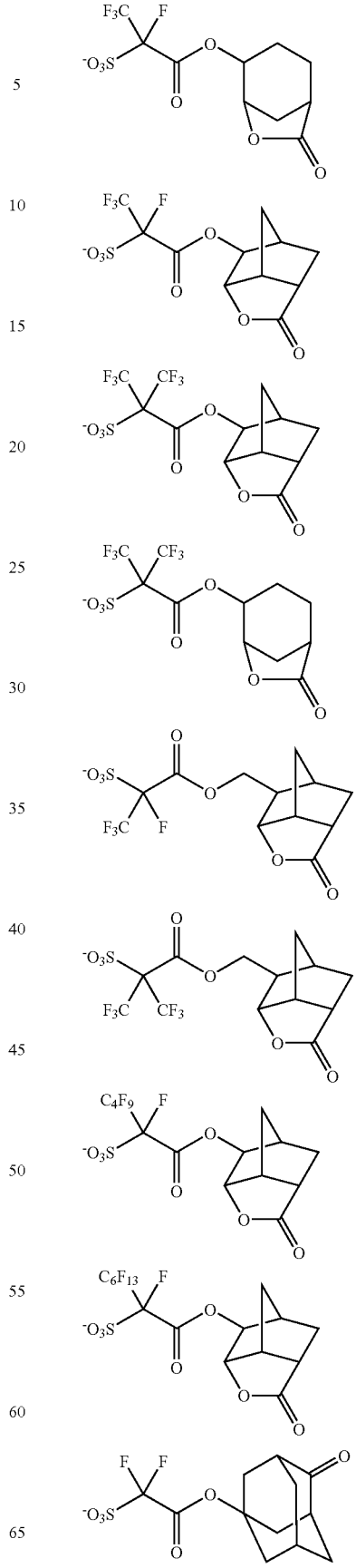

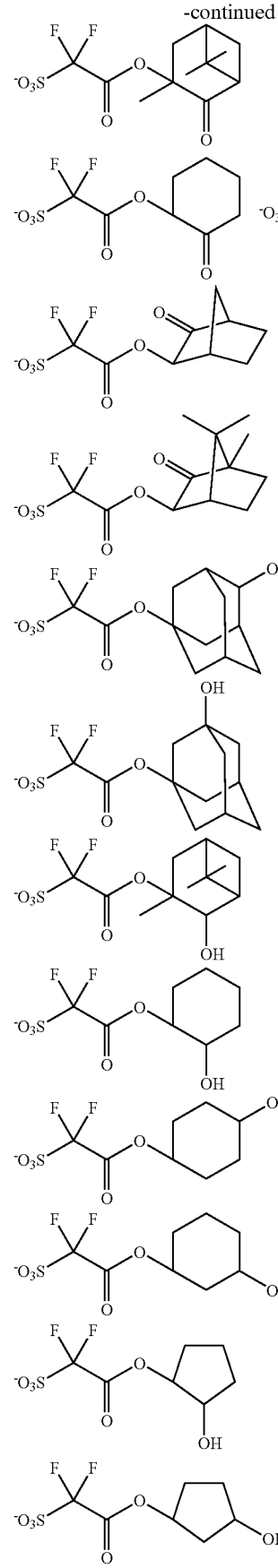
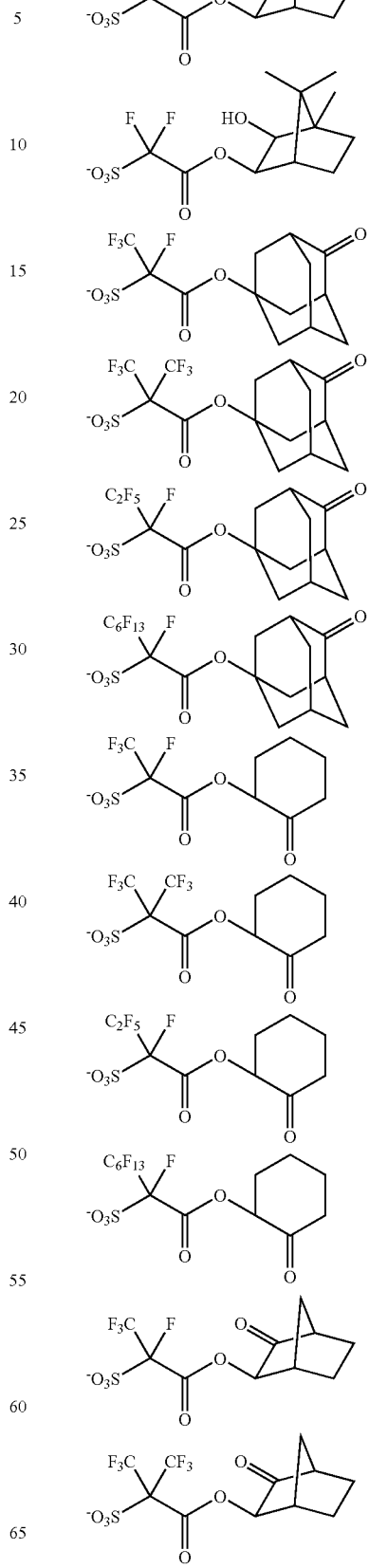

101
-continued
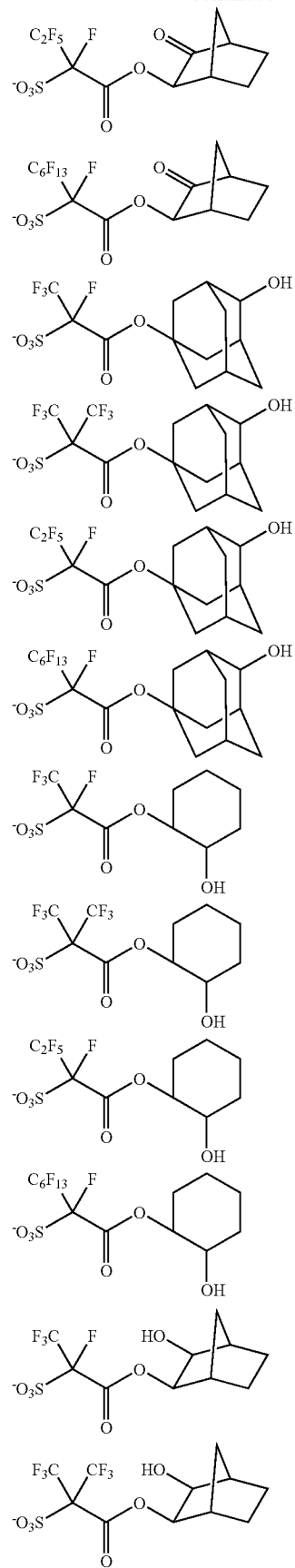
102
-continued
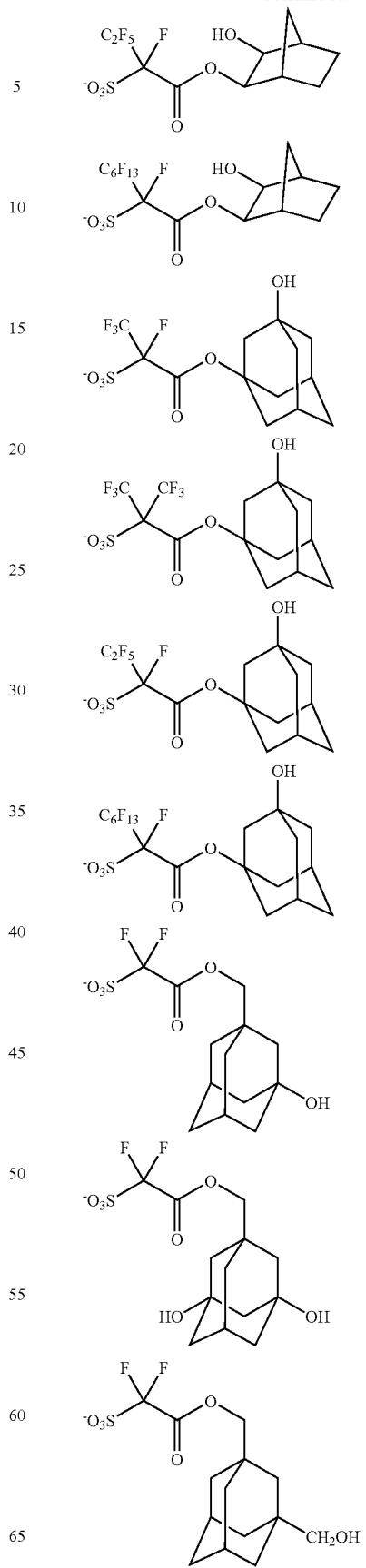

103
-continued
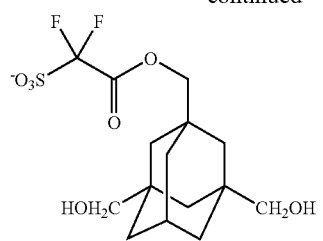
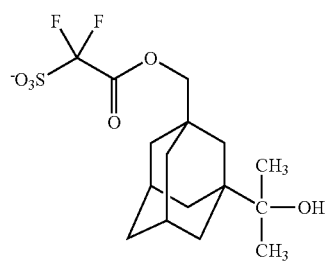
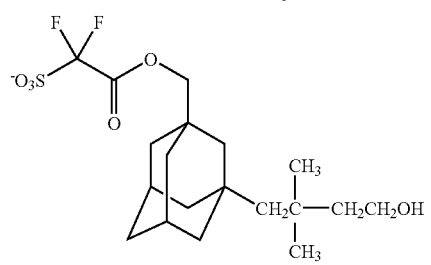
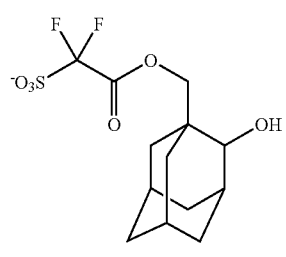
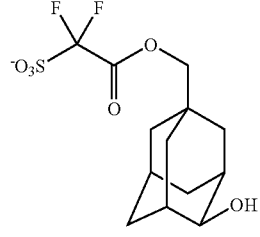
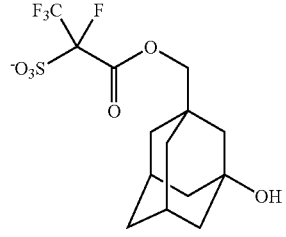
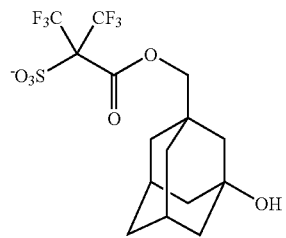
104
-continued
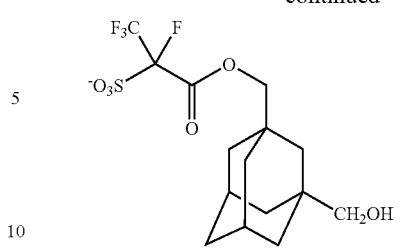
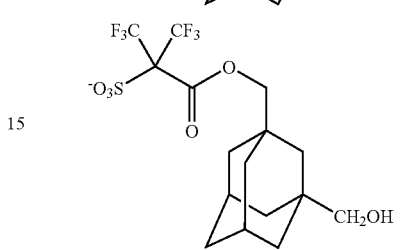
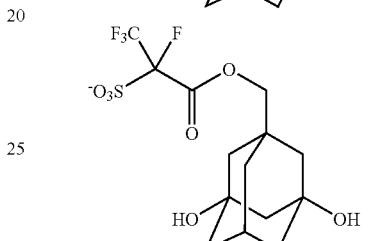
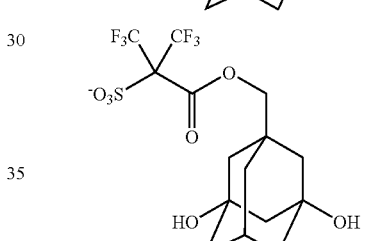
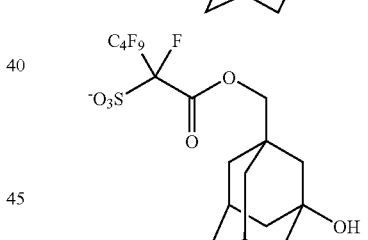
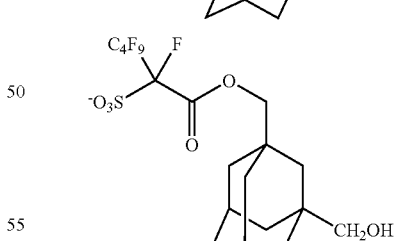
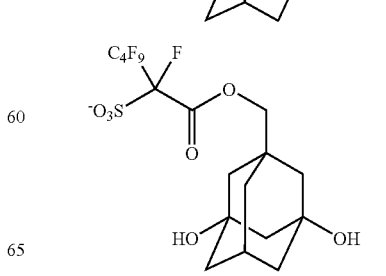

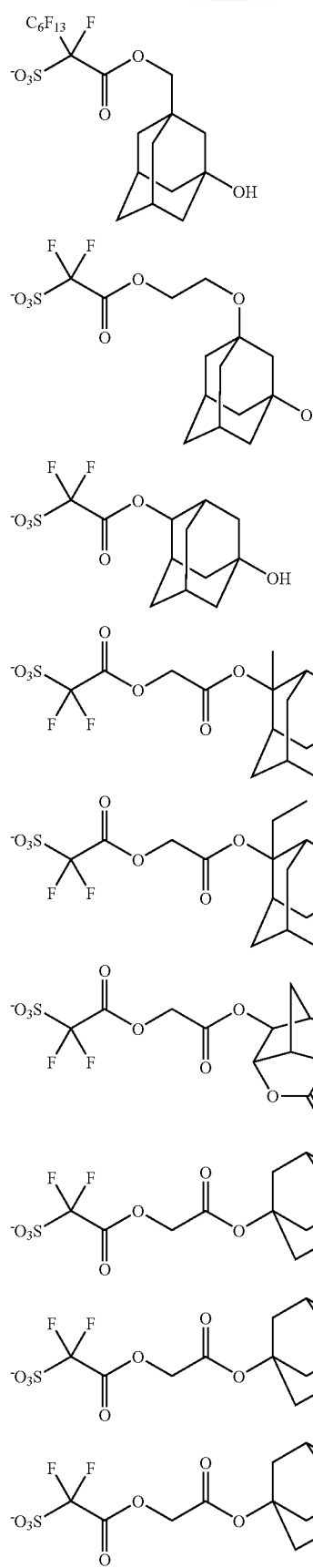
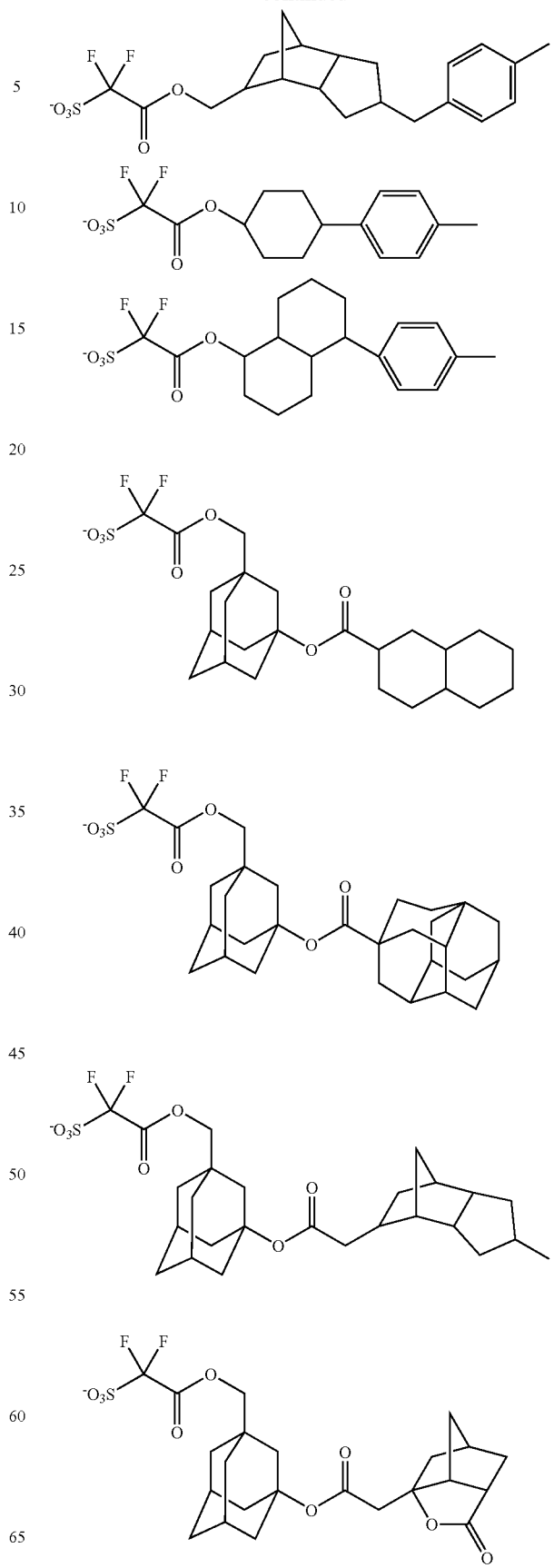

107
-continued
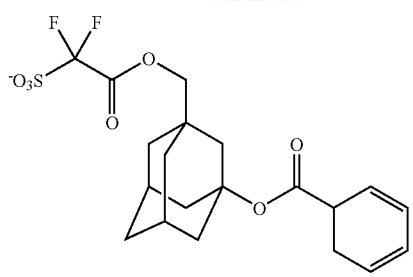
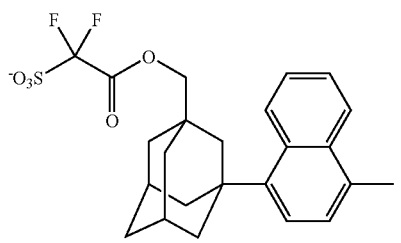
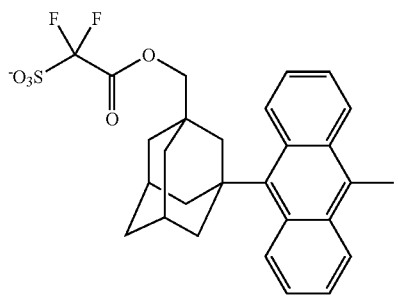
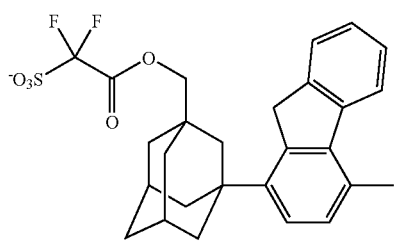
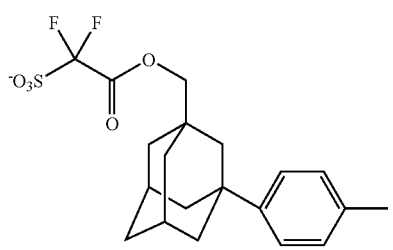
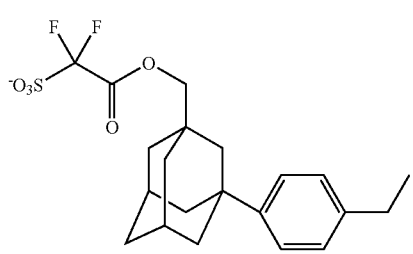
108
-continued
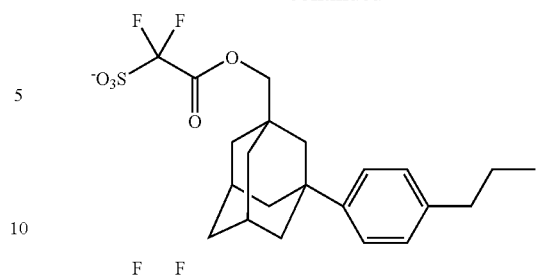
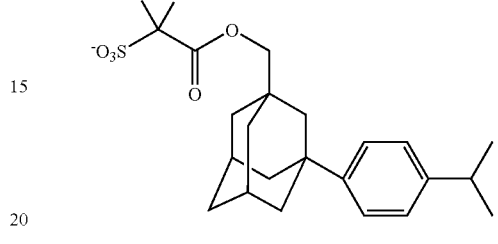
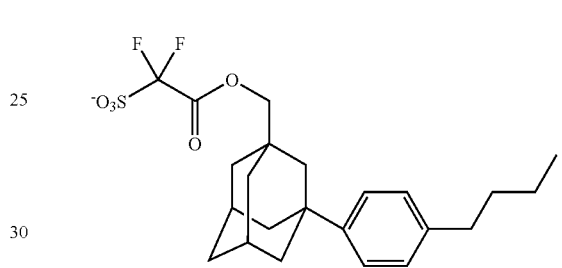
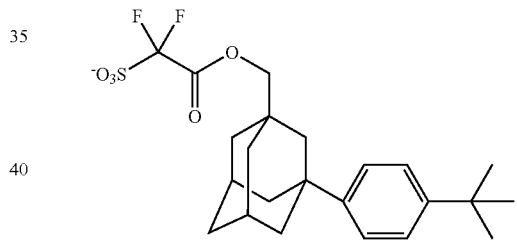
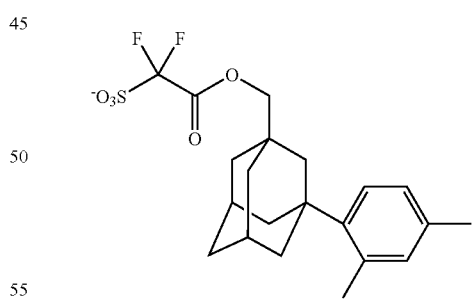
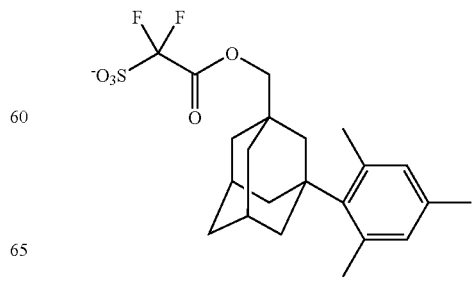

109
-continued
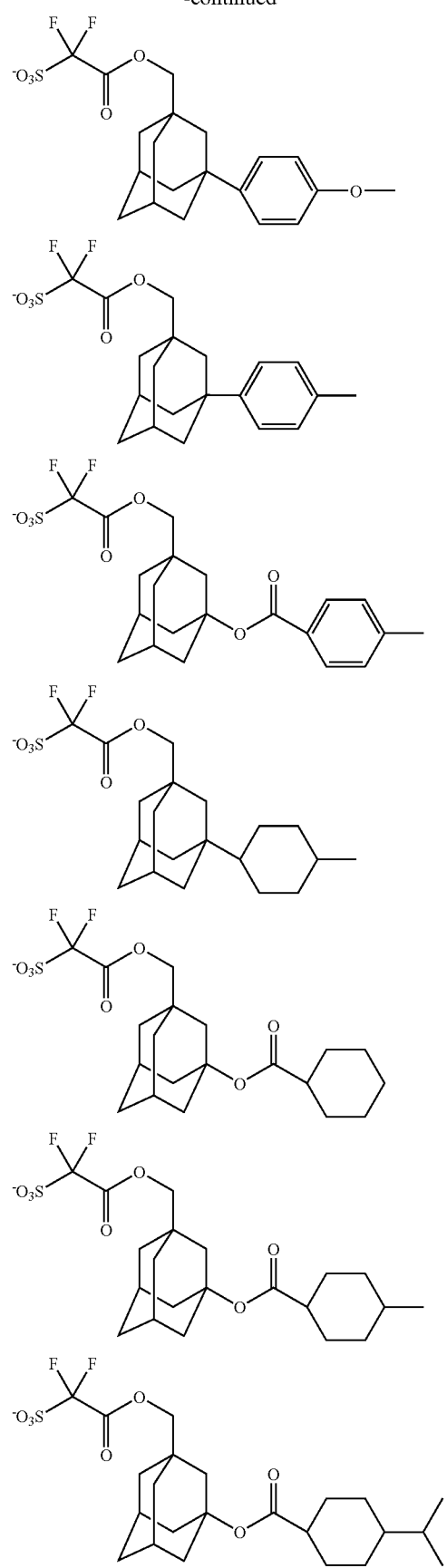
110
-continued
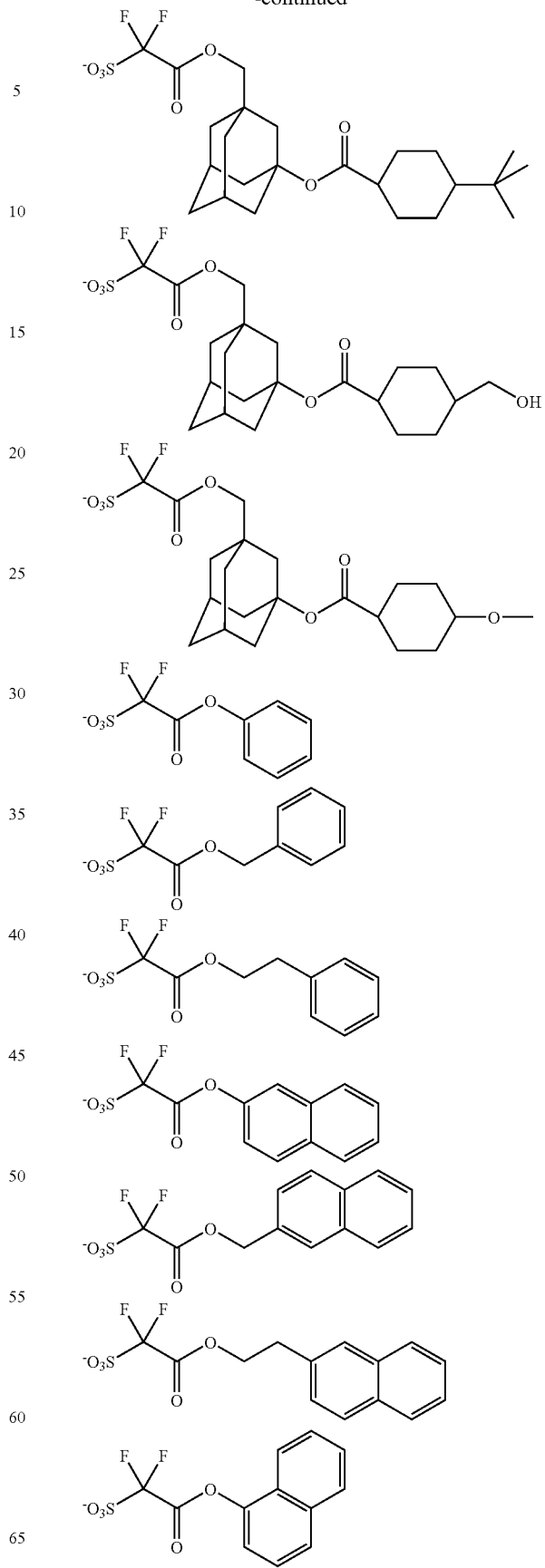

111
-continued
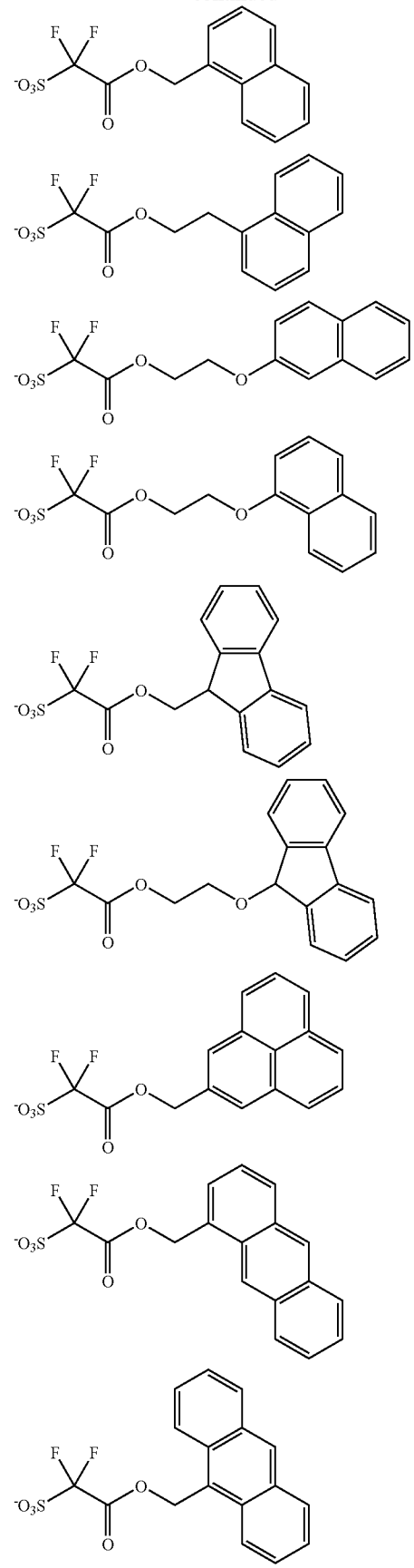
112
-continued
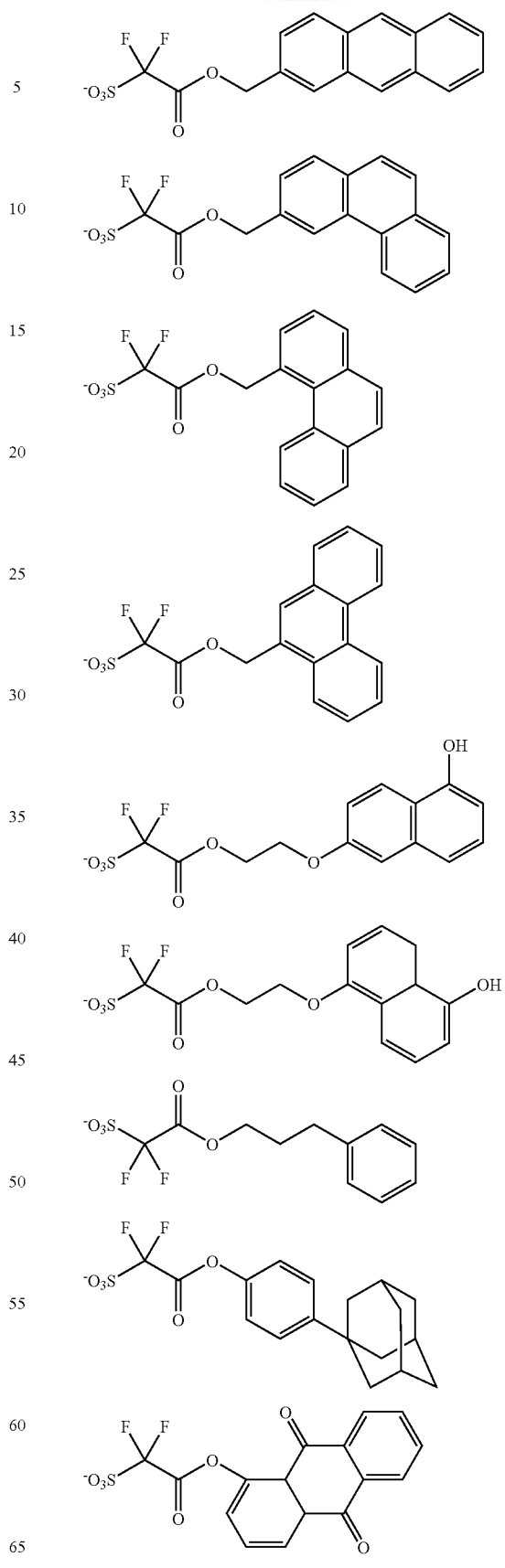

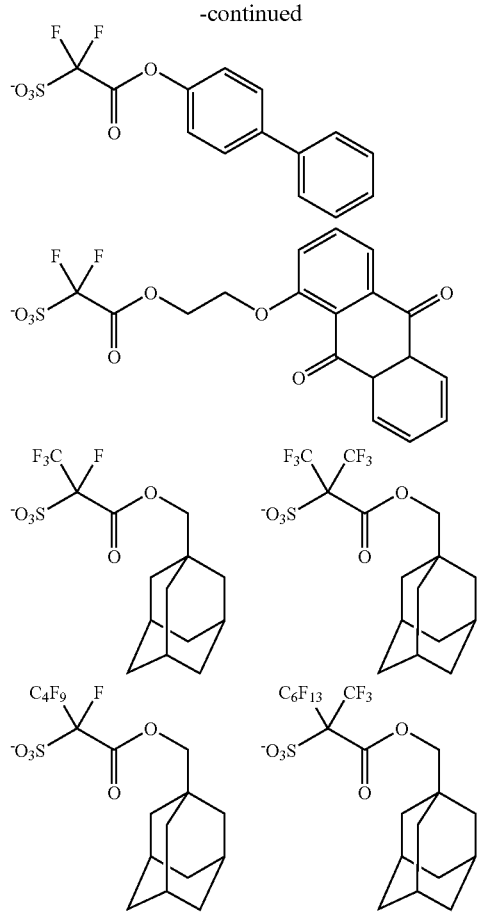

Among Salt (V), a salt represented by the formula (VI):

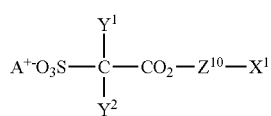   (VI)

(hereinafter, simply referred to as Salt (VI)) is preferable.

In Salt (VI), $X^1$ represents a C3-C30 monocyclic or polycyclic hydrocarbon group having a hydroxyl group or a carbonyl group, and at least one hydrogen atom in the monocyclic or polycyclic hydrocarbon group may be replaced with a C1-C6 alkyl group, a C1-C6 alkoxy group, a C1-C4 perfluoroalkyl group, a C1-C6 hydroxyalkyl group, a hydroxyl group or a cyano group and $Z^{10}$ represents a single bond or a C1-C4 alkylene group.

Examples of the C1-C6 alkyl group, the C1-C6 alkoxy group and the C1-C4 perfluoroalkyl group include the same groups as described above, respectively. Examples of the C1-C6 hydroxyalkyl group include a hydroxymethyl group, a 2-hydroxyethyl group, a 3-hydroxypropyl group, a 4-hydroxybutyl group and a 6-hydroxyhexyl group.

Examples of the C1-C4 alkylene group include a methylene group, an ethylene group, a trimethylene group and a tetramethylene group. $Z^{10}$ is preferably a single bond, a methylene group or an ethylene group, and is more preferably a single bond or a methylene group.

Examples of $X^1$ include a C4-C8 cycloalkyl group such as a cyclobutyl group, a cyclopentyl group, a cyclohexyl group and a cyclooctyl group, an adamantyl group, and a norbornyl group, in which at least one hydrogen atom may be replaced with a C1-C6 alkyl group, a C1-C6 alkoxy group, a C1-C4 perfluoroalkyl group, a C1-C6 hydroxyalkyl group, a hydroxyl group or a cyano group.

Specific examples of $X^1$ include a 2-oxocyclopentyl group, a 2-oxocyclohexyl group, a 3-oxocyclopentyl group, a 3-oxocyclohexyl group, a 4-oxocyclohexyl group, a 2-hydroxycyclopentyl group, a 2-hydroxycyclohexyl group, a 3-hydroxycyclopentyl group, a 3-hydroxycyclohexyl group, a 4-hydroxycyclohexyl group, a 4-oxo-2-adamantyl group, a 3-hydroxy-1-adamantyl group, a 4-hydroxy-1-adamantyl group, a 5-oxonorbornan-2-yl group, a 1,7,7-trimethyl-2-oxonorbornan-2-yl group, a 3,6,6-trimethyl-2-oxo-bicyclo[3.1.1]heptan-3-yl group, a 2-hydroxy-norbornan-3-yl group, a 1,7,7-trimethyl-2-hydroxynorbornan-3-yl group, a 3,6,6-trimethyl-2-hydroxybicyclo[3.1.1]heptan-3-yl group, and the following groups (in the following formulae, straight line with an open end shows a bond which is extended from an adjacent group).

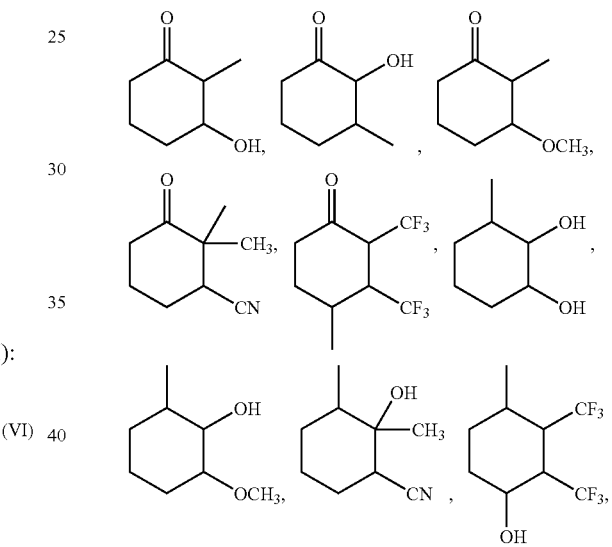

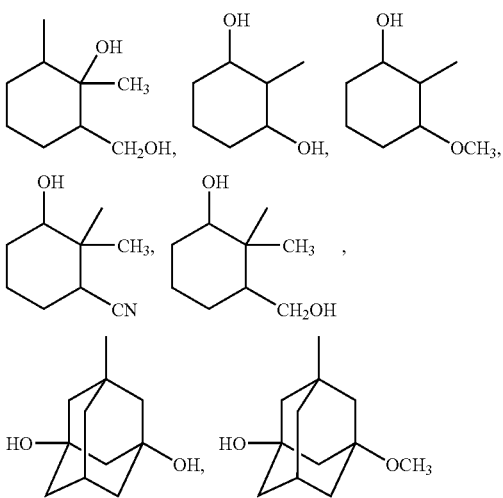

Specific examples of the anion part of Salt (VI) include the followings.
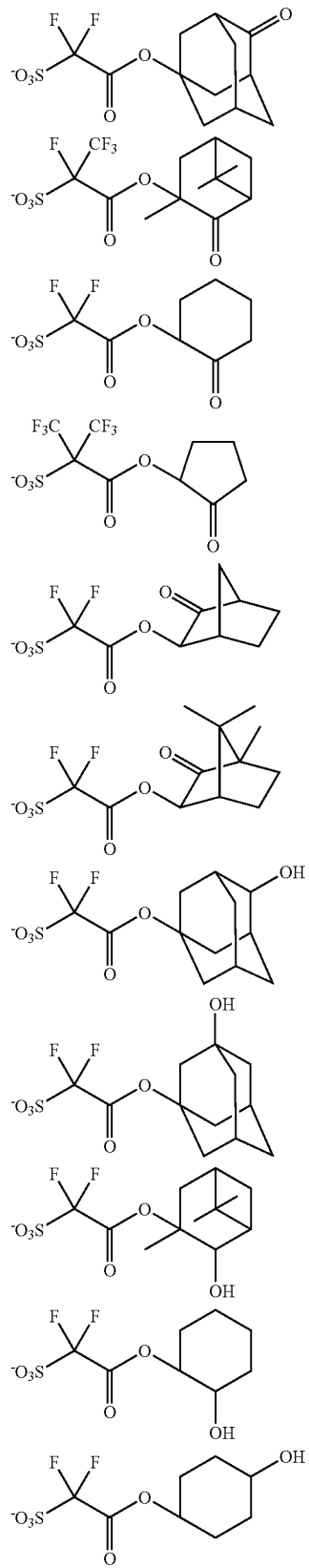
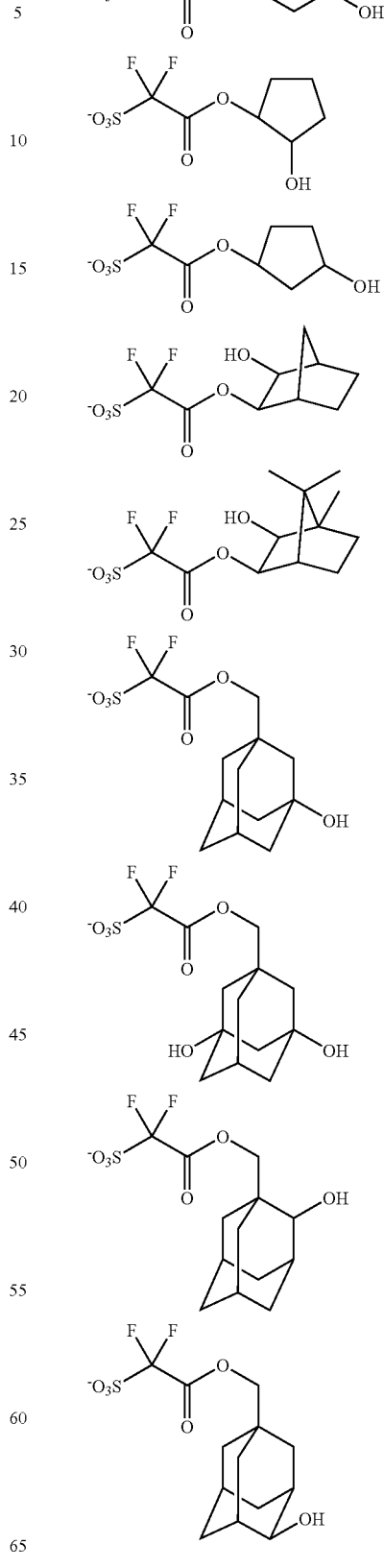

Other examples of the acid generator include a salt represented by the formula (VIII):

$$A^+ {}^-O_3S-R^{30} \tag{VIII}$$

(hereinafter, simply referred to as Salt (VIII)).

In Salt (VIII), $R^{30}$ represents a C1-C6 linear or branched chain perfluoroalkyl group and $A^+$ is the same as defined above.

Examples of the C1-C6 linear or branched chain perfluoroalkyl group include a trifluoromethyl group, a pentafluoroethyl group, a heptafluoropropyl group, a nonafluorobutyl group and a tridecafluorohexyl group.

Specific examples of the anion part of Salt (VIII) include the followings.

$$CF_3-SO_3^-$$

$$CF_3CF_2CF_2-SO_3^-$$

$$CF_3CF_2CF_2CF_2-SO_3^-$$

$$CF_3CF_2CF_2CF_2CF_2CF_2-SO_3^-$$

In Salt (V), Salt (VI) and Salt (VIII), $A^+$ represents an organic counter ion. Examples of the organic counter ion include a cation represented by the formula (IXz):

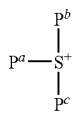
(IXz)

wherein $P^a$, $P^b$ and $P^c$ each independently represent a C1-C30 linear or branched chain alkyl group which may be substituted with at least one selected from the group consisting of a hydroxyl group, a C3-C12 cyclic hydrocarbon group and a C1-C12 alkoxy group, or a C3-C30 cyclic hydrocarbon group which may be substituted with at least one selected from the group consisting of a hydroxyl group and a C1-C12 alkoxy group (hereinafter, simply referred to as the cation (IXz)), a cation represented by the formula (IXb):

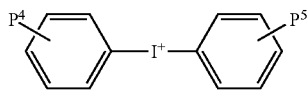
(IXb)

wherein $P^4$ and $P^5$ each independently represent a hydrogen atom, a hydroxyl group, a C1-C12 alkyl group or a C1-C12 alkoxy group (hereinafter, simply referred to as the cation (IXb)), a cation represented by the formula (IXc):

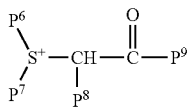
(IXc)

wherein $P^6$ and $P^7$ each independently represent a C1-C12 alkyl group or a C3-C12 cycloalkyl group, or $P^6$ and $P^7$ are bonded to form a C3-C12 divalent acyclic hydrocarbon group which forms a ring together with the adjacent $S^+$, and at least one —$CH_2$— in the divalent acyclic hydrocarbon group may be substituted with —CO—, —O— or —S—, $P^8$ represents a hydrogen atom, $P^9$ represents a C1-C12 alkyl group, a C3-C12 cycloalkyl group or an aromatic group which may be substituted, or $P^8$ and $P^9$ are bonded to form a divalent acyclic hydrocarbon group which forms a 2-oxocycloalkyl group together with the adjacent —CHCO—, and at least one —$CH_2$— in the divalent acyclic hydrocarbon group may be replaced with —CO—, —O— or —S— (hereinafter, simply referred to as the cation (IXc)); and a cation represented by the formula (IXd):

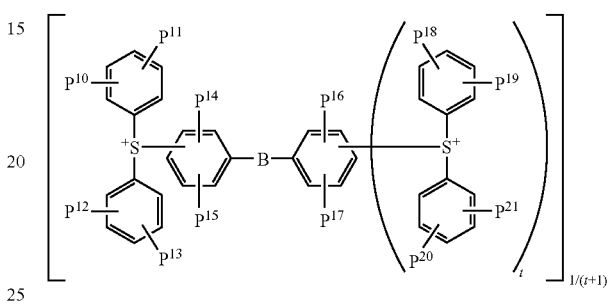
(IXd)

wherein $P^{10}$, $P^{11}$, $P^{12}$, $P^{13}$, $P^{14}$, $P^{15}$, $P^{16}$, $P^{17}$, $P^{18}$, $P^{19}$, $P^{20}$ and $P^{21}$ each independently represent a hydrogen atom, a hydroxyl group, a C1-C12 alkyl group or a C1-C12 alkoxy group, B represents a sulfur or oxygen atom and t represents 0 or 1 (hereinafter, simply referred to as the cation (IXd)).

Examples of the C1-C12 alkoxy group in the cations (IXz), (IXb) and (IXd) include a methoxy group, an ethoxy group, an n-propoxy group, an isopropoxy group, an n-butoxy group, an isobutoxy group, a sec-butoxy group, a tert-butoxy group, an n-pentyloxy group, an n-hexyloxy group, an n-octyloxy group and a 2-ethylhexyloxy group.

Examples of the C3-C12 cyclic hydrocarbon group in the cation (IXz) include a cyclopentyl group, a cyclohexyl group, a 1-adamantyl group, a 2-adamantyl group, a phenyl group, a 2-methylphenyl group, a 4-methylphenyl group, a 1-naphthyl group and a 2-naphthyl group.

Examples of the C1-C30 alkyl group which may be substituted with at least one selected from the group consisting of a hydroxyl group, a C3-C12 cyclic hydrocarbon group and a C1-C12 alkoxy group in the cation (IXz) include a methyl group, an ethyl group, an n-propyl group, an isopropyl group, an n-butyl group, an isobutyl group, a sec-butyl group, a tert-butyl group, an n-pentyl group, an n-hexyl group, an n-octyl group, a 2-ethylhexyl group and benzyl group.

Examples of the C3-C30 cyclic hydrocarbon group which may be substituted with at least one selected from the group consisting of a hydroxyl group and a C1-C12 alkoxy group in the cation (IXz) include a cyclopentyl group, a cyclohexyl group, a 1-adamantyl group, a 2-adamantyl group, a bicyclohexyl group, a phenyl group, a 2-methylphenyl group, a 4-methylphenyl group, a 4-ethylphenyl group, a 4-isopropylphenyl group, a 4-tert-butylphenyl group, a 2,4-dimethylphenyl group, a 2,4,6-trimethylphenyl group, a 4-n-hexylphenyl group, a 4-n-octylphenyl group, a 1-naphthyl group, a 2-naphthyl group, a fluorenyl group, a 4-phenylphenyl group, a 4-hydroxyphenyl group, a 4-methoxyphenyl group, a 4-tert-butoxyphenyl group and a 4-n-hexyloxyphenyl group.

Examples of the C1-C12 alkyl group in the cations (IXb), (IXc) and (IXd) include a methyl group, an ethyl group, an n-propyl group, an isopropyl group, an n-butyl group, an isobutyl group, a sec-butyl group, a tert-butyl group, an n-pentyl group, an n-hexyl group, an n-octyl group and a 2-ethylhexyl group.

Examples of the C3-C12 cycloalkyl group in the cation (IXc) include a cyclopropyl group, a cyclobutyl group, a cyclopentyl group, a cyclohexyl group, a cycloheptyl group, a cyclooctyl group and a cyclodecyl group. Examples of the C3-C12 divalent acyclic hydrocarbon group formed by bonding $P^6$ and $P^7$ include a trimethylene group, a tetramethylene group and a pentamethylene group. Examples of the ring group formed together with the adjacent $S^+$ and the divalent acyclic hydrocarbon group include a tetramethylenesulfonio group, a pentamethylenesulfonio group and oxybisethylenesulfonio group.

Examples of the aromatic group in the cation (IXc) include a phenyl group, a tolyl group, a xylyl group, a 4-n-butylphenyl group, a 4-isobutylphenyl group, a 4-tert-butylphenyl group, a 4-cyclohexylphenyl group, a 4-phenylphenyl group and a naphthyl group. The aromatic group may be substituted, and the examples of the substituents include a C1-C6 alkoxy group such as a methoxy group, an ethoxy group, an n-propoxy group, an n-butoxy group, a tert-butoxy group and an n-hexyloxy group; a C2-C12 acyloxy group such as an acetyloxy group and a 1-adamantylcarbonyloxy group; and a nitro group.

Examples of the divalent acyclic hydrocarbon group formed by bonding $P^8$ and $P^9$ include a methylene group, an ethylene group, a trimethylene group, a tetramethylene group and a pentamethylene group and examples of the 2-oxocycloalkyl group formed together with the adjacent —CHCO— and the divalent acyclic hydrocarbon group include a 2-oxocyclopentyl group and a 2-oxocyclohexyl group.

Examples of the cation (IXz) include the followings:

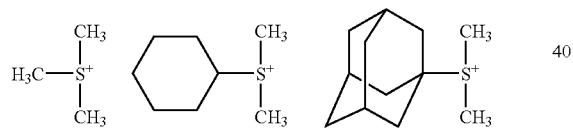

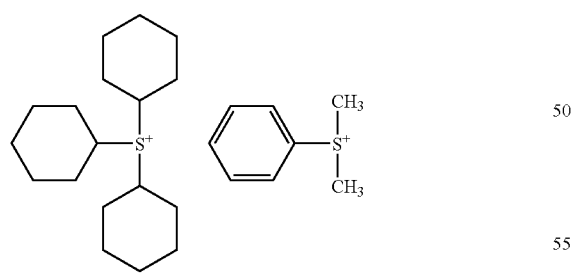

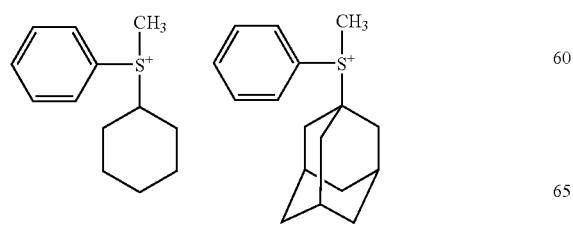

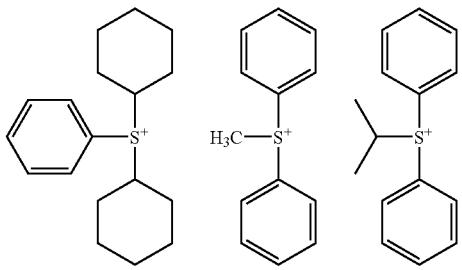

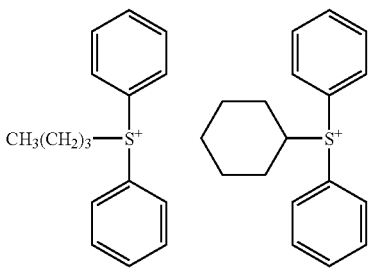

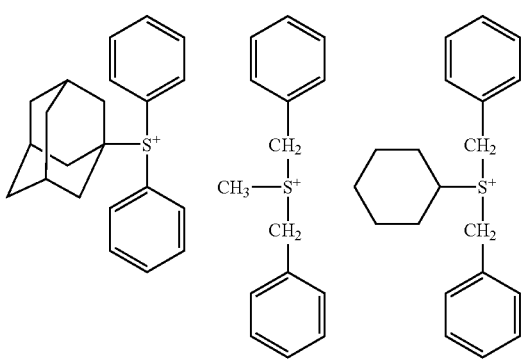

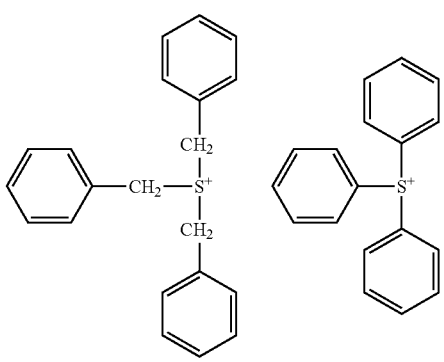

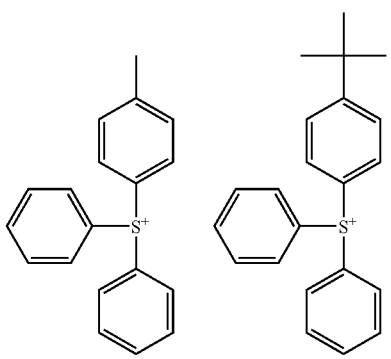

-continued
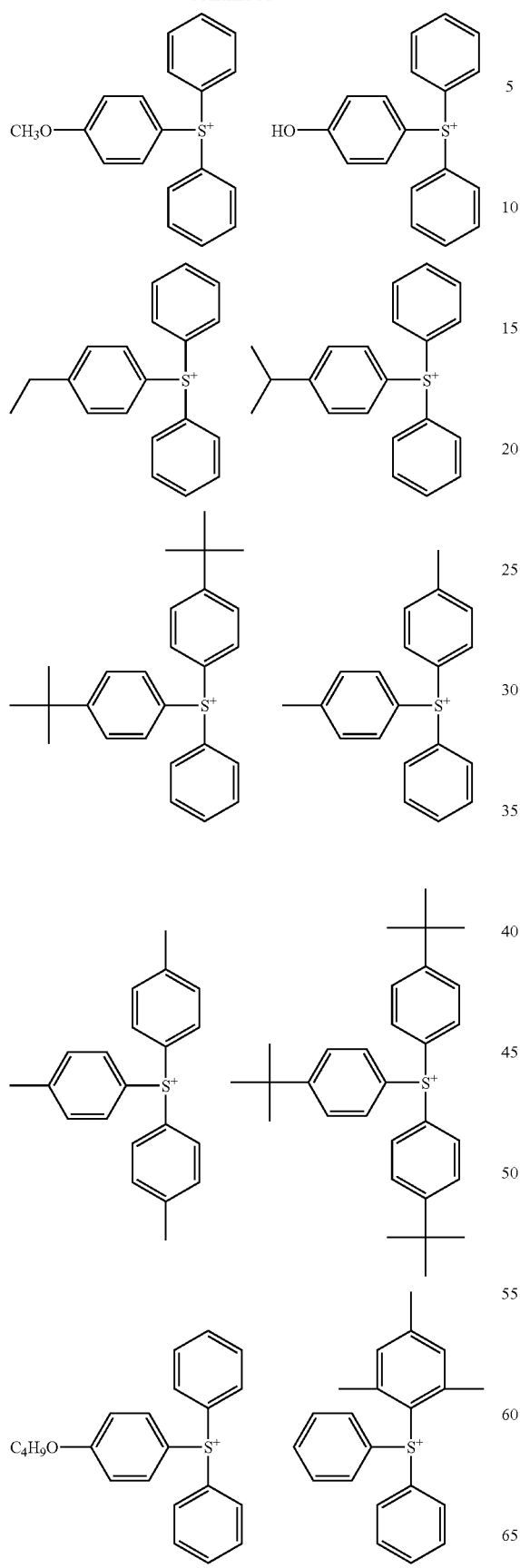
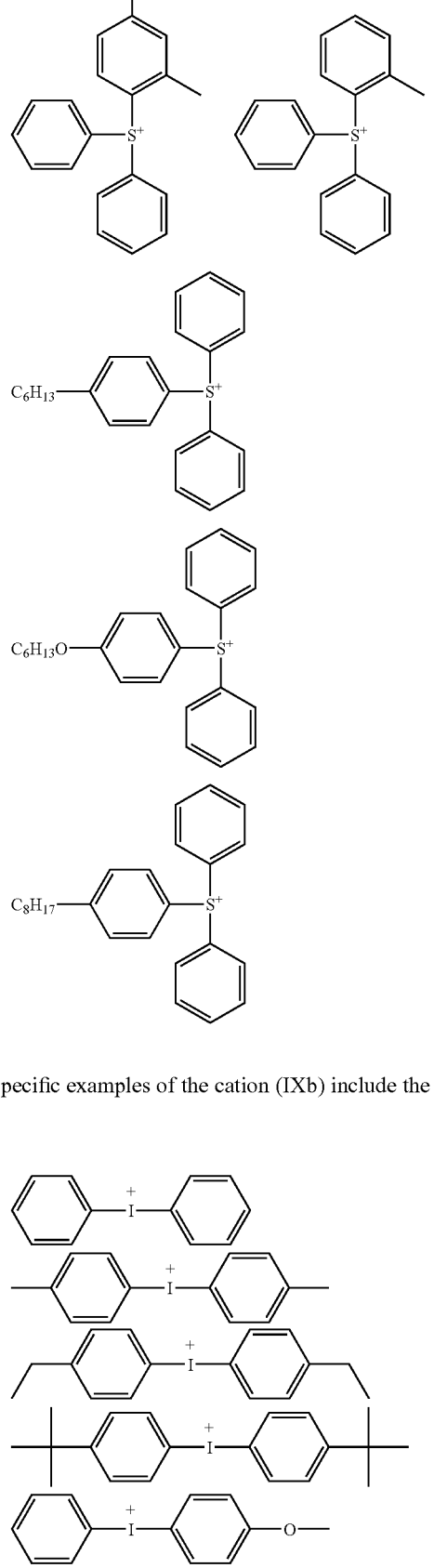
Specific examples of the cation (IXb) include the following:
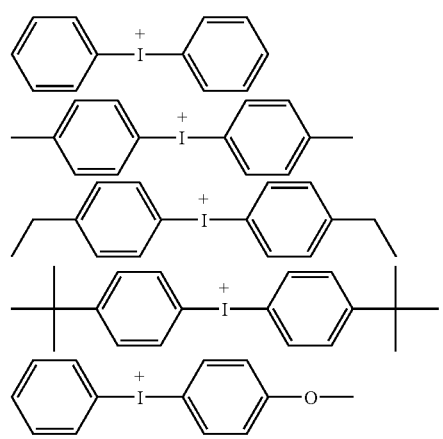

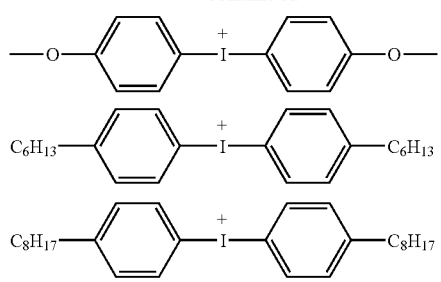
Specific examples of the cation (IXc) include the following:
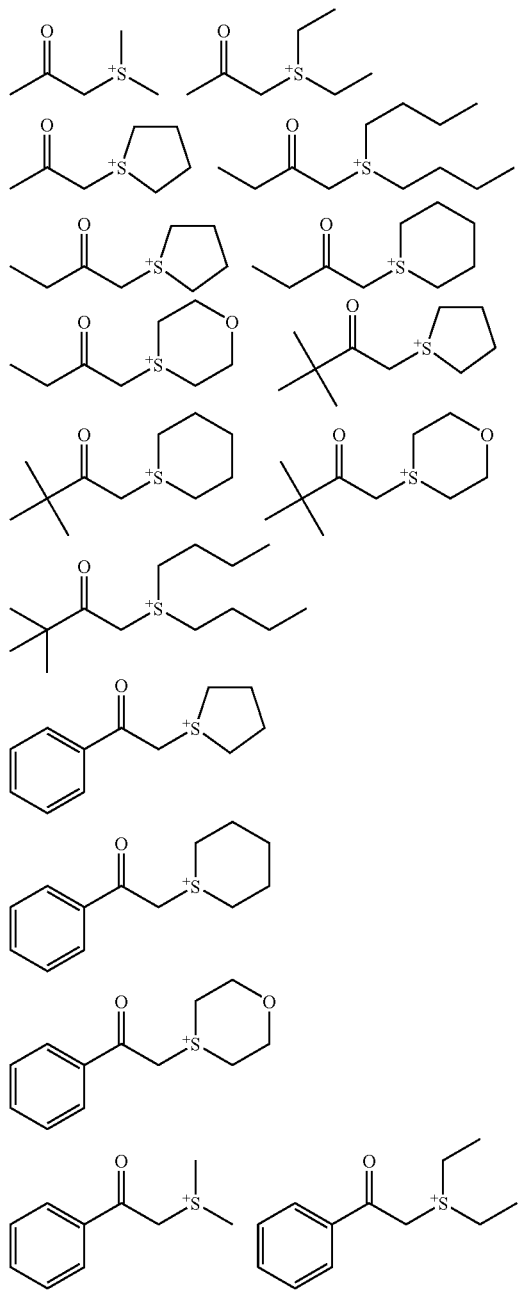
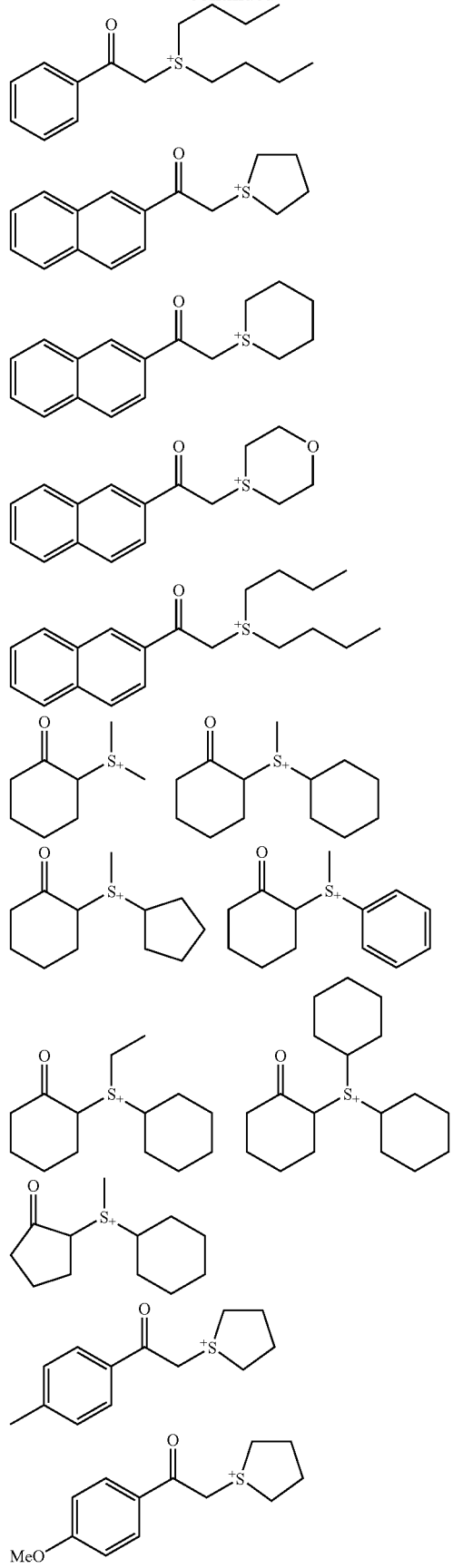

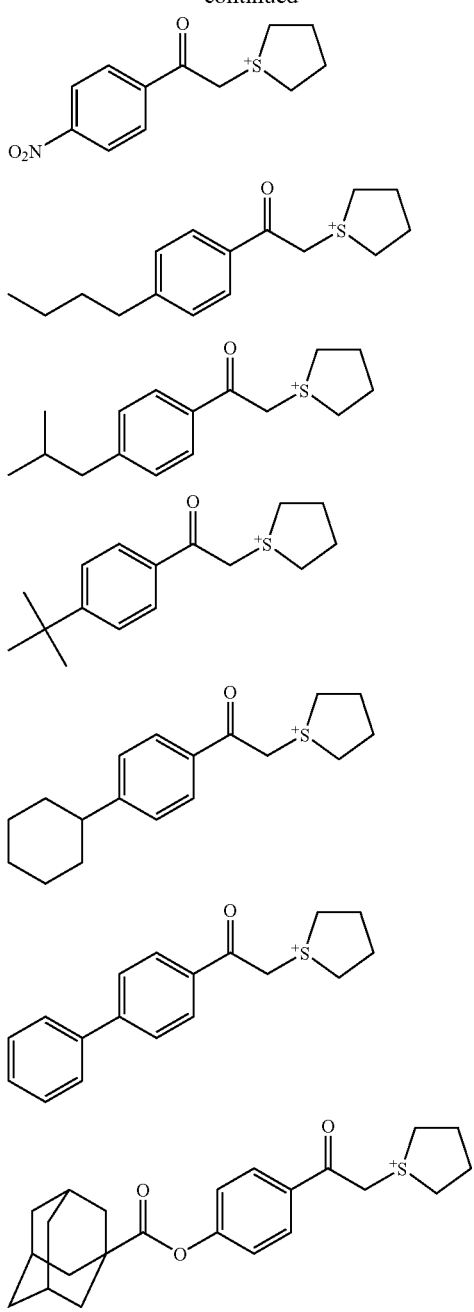
Specific examples of the cation (IXd) include the following:
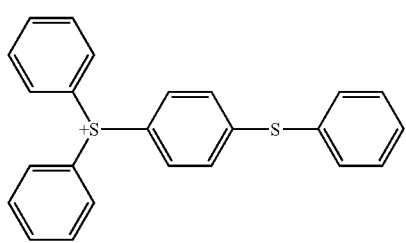
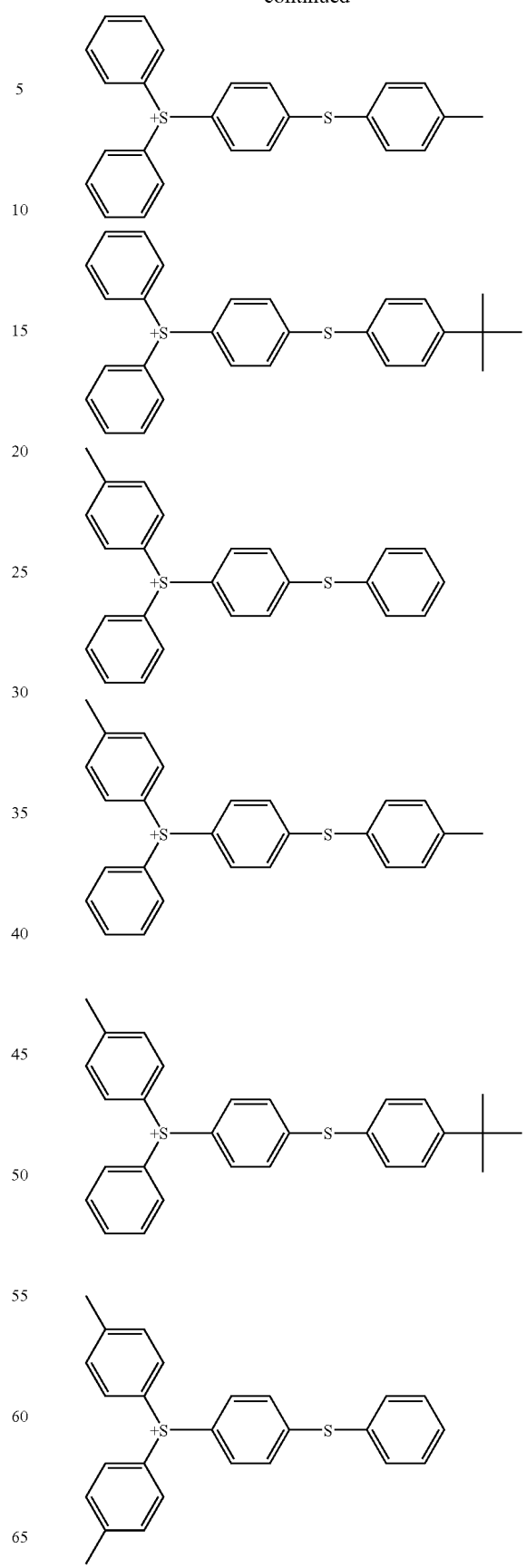

127
-continued
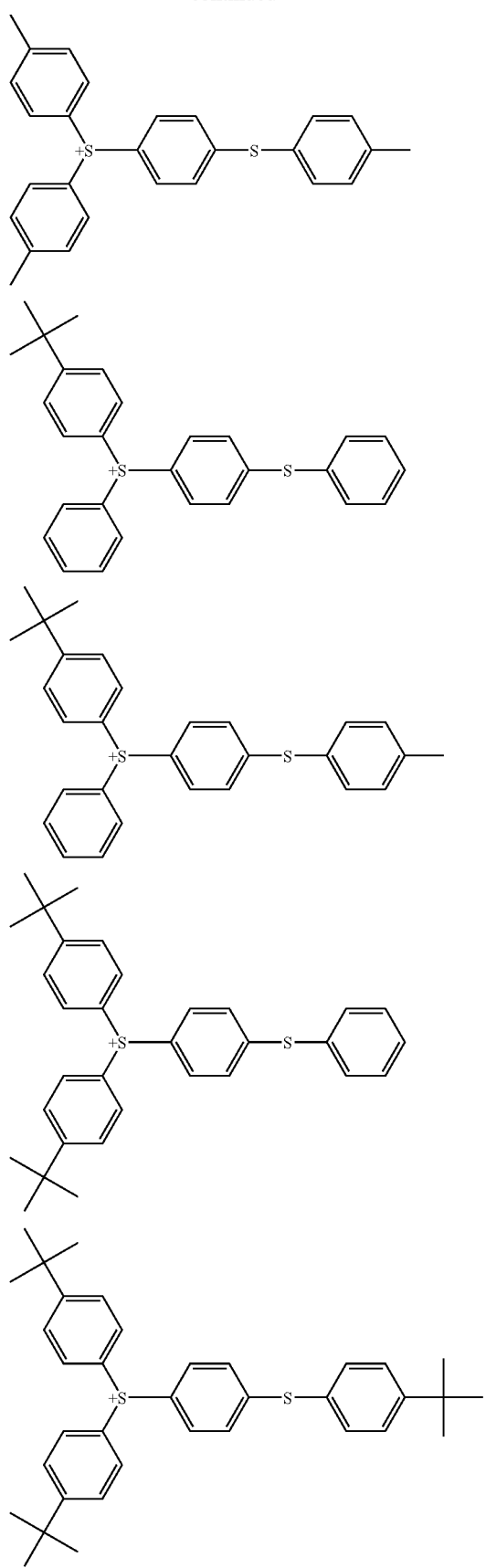
128
-continued
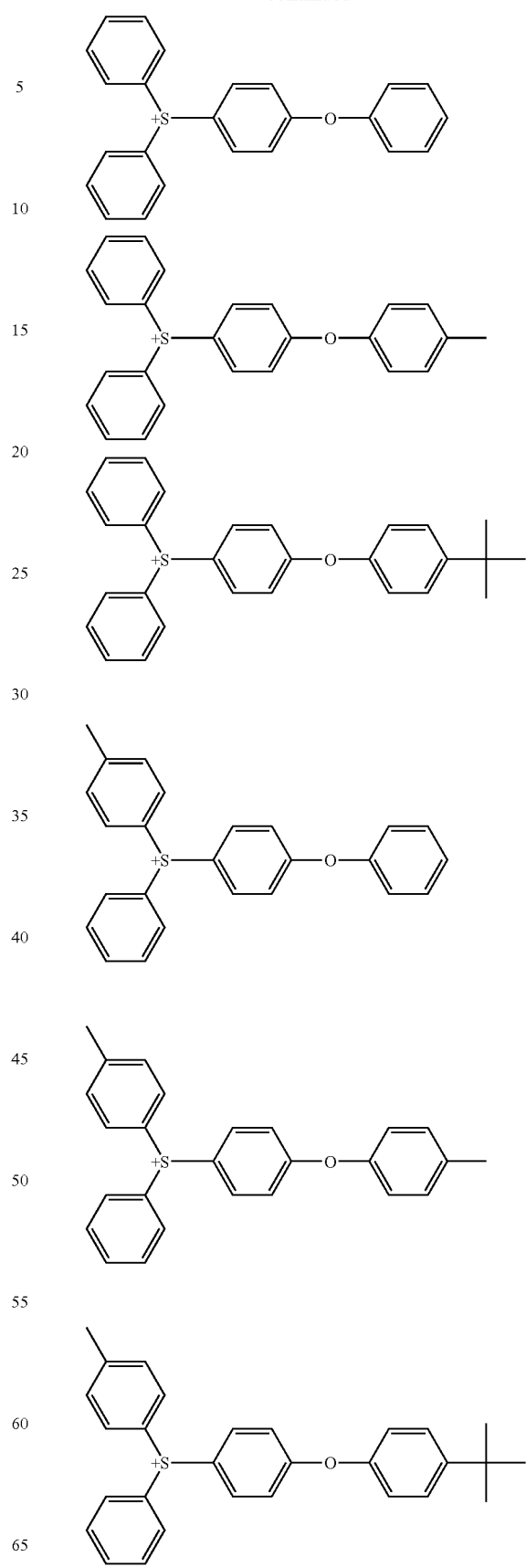

129
-continued
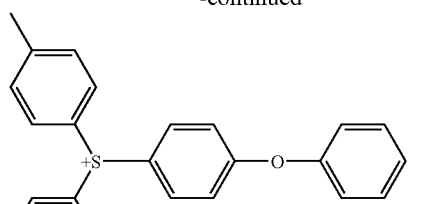
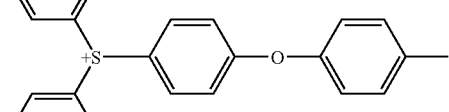
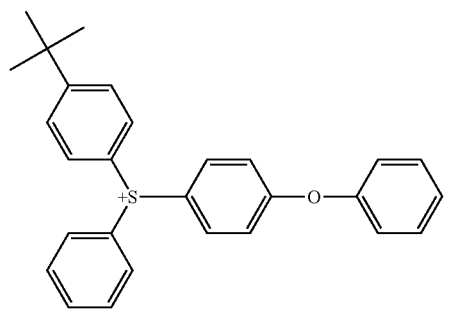
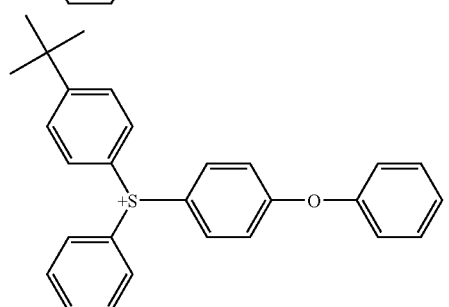
130
-continued
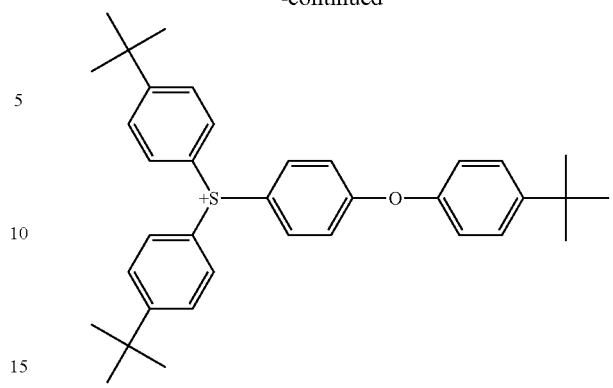
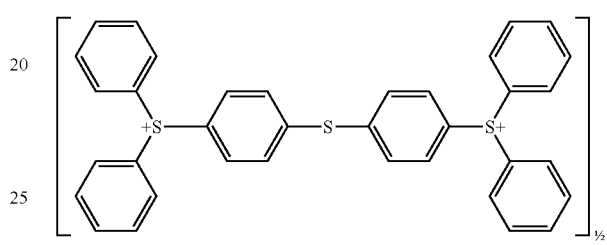
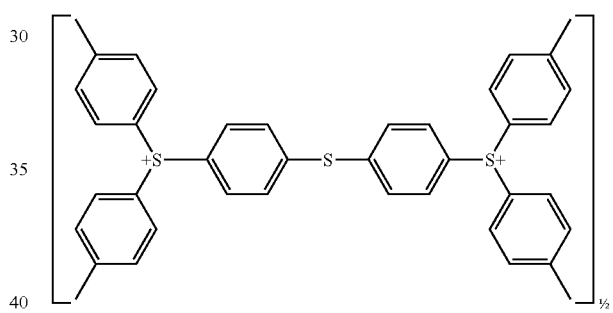
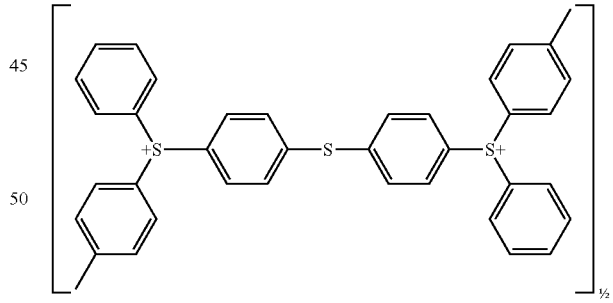
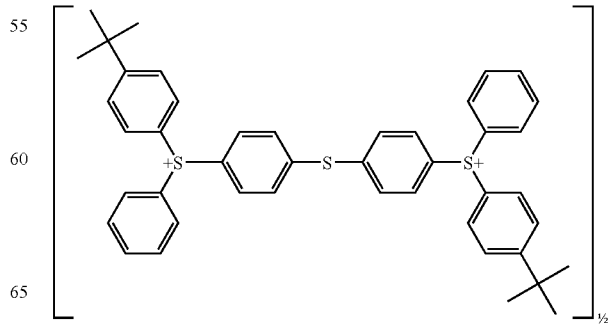

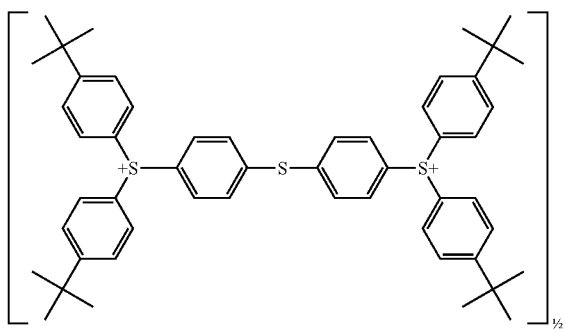

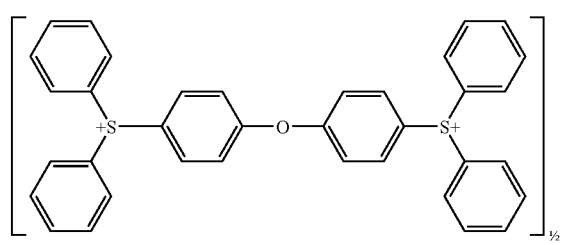

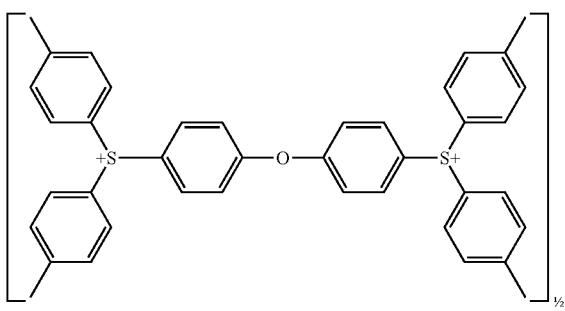

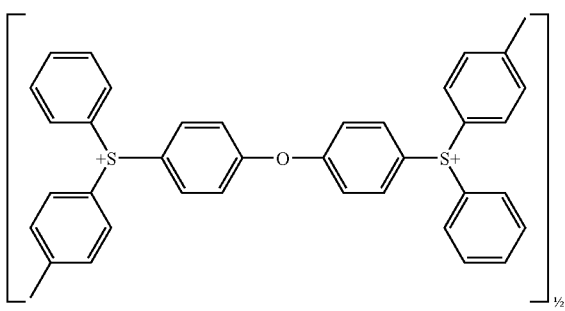

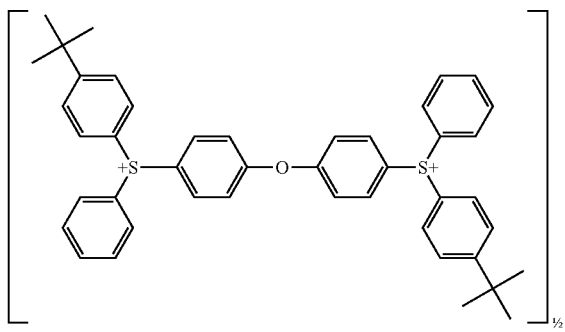

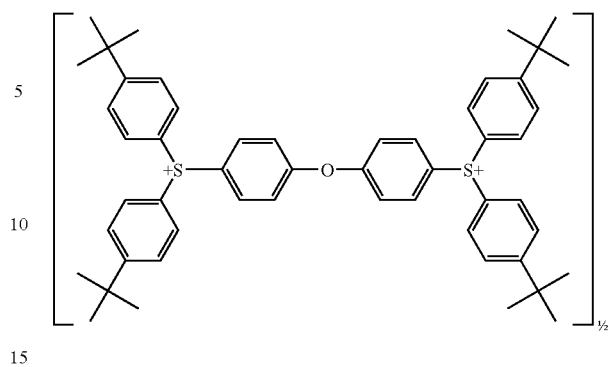

Among the cation (IXz), the cation represented by the formula (IXa):

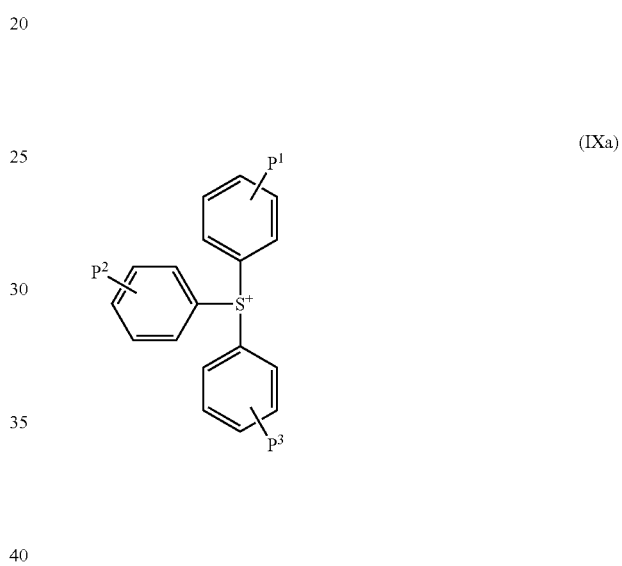

wherein $P^1$, $P^2$ and $P^3$ each independently represent a hydrogen atom, a hydroxyl group, a C1-C12 alkyl group or a C1-C12 alkoxy group, is preferable. Examples of the C1-C12 alkyl group and the C1-C12 alkoxy group include the same as described above.

As the organic counter ion represented by $A^+$, a cation represented by the following formulae (IXe):

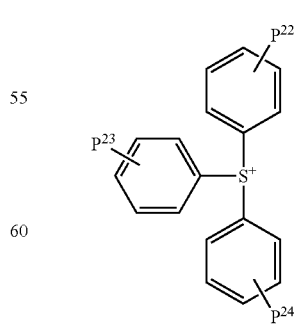

wherein $P^{22}$, $P^{23}$ and $P^{24}$ each independently represent a hydrogen atom or a C1-C4 alkyl group, is also preferable.

As the Salt (VI), a salt wherein A⁺ is the cation represented by the formulae (IXe) and the anion part is any one of the followings:

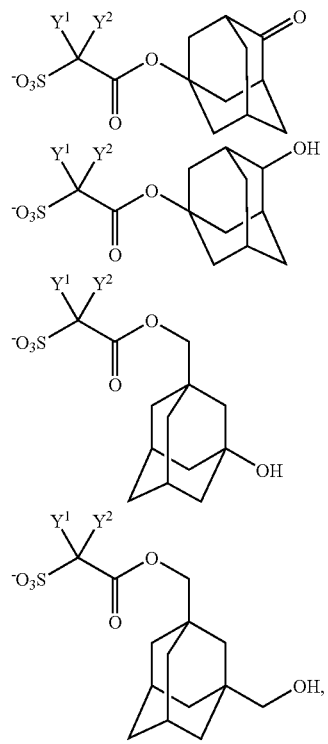

and a salt wherein A⁺ is the cation represented by the formulae (IXc) and the anion part is any one of the followings:

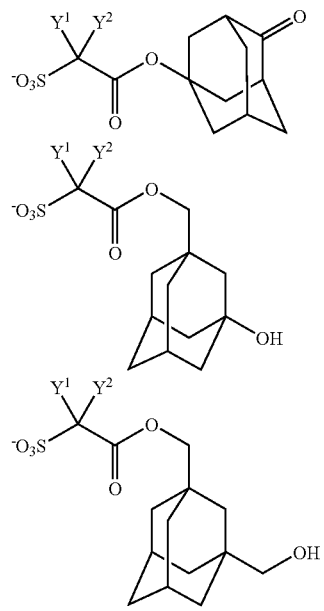

are preferable.

Salt (VI) can be produced according to known methods such as a method described in JP 2007-249192 A1.

The present resist composition preferably includes 80 to 99.9% by weight of the polymer of the present invention and 0.1 to 20% by weight of the acid generator based on the total amount of the polymer of the present invention and the acid generator.

In the present resist composition, performance deterioration caused by inactivation of acid which occurs due to post exposure delay can be diminished by adding an organic base compound, particularly a nitrogen-containing organic base compound as a quencher.

Specific examples of the nitrogen-containing organic base compound include an amine compound represented by the following formulae:

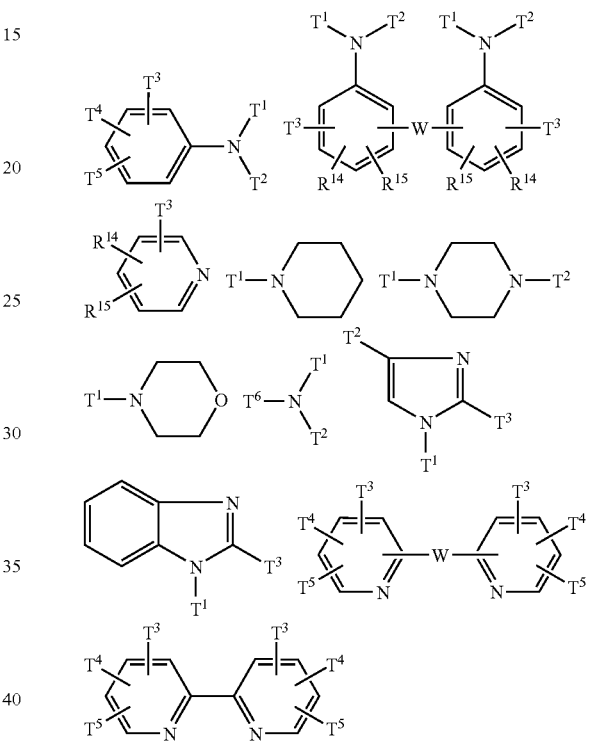

wherein $T^1$ and $T^{12}$ independently represent a hydrogen atom, an alkyl group, a cycloalkyl group or an aryl group, and the alkyl, cycloalkyl and aryl group may be substituted with at least one group selected from the group consisting of a hydroxyl group, an amino group which may be substituted with a C1-C4 alkyl group and a C1-C6 alkoxy group which may be substituted with a C1-C6 alkoxy group, $T^3$ and $T^4$ independently represent a hydrogen atom, an alkyl group, a cycloalkyl group, an aryl group or an alkoxy group, and the alkyl, cycloalkyl, aryl and alkoxy group may be substituted with at least one group selected from the group consisting of a hydroxyl group, an amino group which may be substituted with a C1-C4 alkyl group and a C1-C6 alkoxy group, or $T^3$ and $T^4$ bond together with the carbon atoms to which they bond to form an aromatic ring, $T^5$ represent a hydrogen atom, an alkyl group, a cycloalkyl group, an aryl group, an alkoxy group or a nitro group, and the alkyl, cycloalkyl, aryl and alkoxy groups which may be substituted with at least one group selected from the group consisting of a hydroxyl group, an amino group which may be substituted with a C1-C4 alkyl group and a C1-C6 alkoxy group, $T^6$ represents an alkyl or cycloalkyl group, and the alkyl and cycloalkyl group may be substituted with at least one group selected from the group consisting of a hydroxyl group, an amino group which may be substituted with a C1-C4 alkyl group and a C1-C6 alkoxy group, and W represents —CO—, —NH—, —S—, —S—S—, an alkylene group of which at least one methylene group may be replaced with —O—, or an alkenylene group of which at least one methylene group may be replaced with —O—, and a quaternary ammonium hydroxide represented by the following formula:

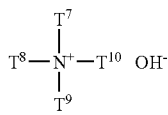

wherein $T^7$, $T^8$, $T^9$ and $T^{10}$ independently represent an alkyl group, a cycloalkyl group or an aryl group, and the alkyl, cycloalkyl and aryl groups may be substituted with at least one group selected from the group consisting a hydroxyl group, an amino group which may be substituted with a C1-C4 alkyl group and a C1-C6 alkoxy group.

The alkyl group in $T^1$, $T^2$, $T^3$, $T^4$, $T^5$, $T^6$, $T^7$, $T^8$, $T^9$ and $T^{10}$ preferably has about 1 to 10 carbon atoms, and more preferably has about 1 to 6 carbon atoms.

Examples of the amino group which may be substituted with the C1-C4 alkyl group include an amino group, a methylamino group, an ethylamino group, an n-butylamino group, a dimethylamino group and a diethylamino group. Examples of the C1-C6 alkoxy group which may be substituted with the C1-C6 alkoxy group include a methoxy group, an ethoxy group, an n-propoxy group, an isopropoxy group, an n-butoxy group, a tert-butoxy group, an n-pentyloxy group, an n-hexyloxy group and a 2-methoxyethoxy group.

Specific examples of the alkyl group which may be substituted with at least one group selected from the group consisting of a hydroxyl group, an amino group which may be substituted with a C1-C4 alkyl group, and a C1-C6 alkoxy group which may be substituted with a C1-C6 alkoxy group include a methyl group, an ethyl group, an n-propyl group, an isopropyl group, an n-butyl group, a tert-butyl group, an n-pentyl group, an n-hexyl group, an n-octyl group, an n-nonyl group, an n-decyl group, a 2-(2-methoxyethoxy) ethyl group, a 2-hydroxyethyl group, a 2-hydroxypropyl group, a 2-aminoethyl group, a 4-aminobutyl group and a 6-aminohexyl group.

The cycloalkyl group in $T^1$, $T^2$, $T^3$, $T^4$, $T^5$, $T^6$, $T^7$, $T$, $T^9$ and $T^{10}$ preferably has about 5 to 10 carbon atoms. Specific examples of the cycloalkyl group which may be substituted with at least one group selected from the group consisting of a hydroxyl group, an amino group which may be substituted with a C1-C4 alkyl group and a C1-C6 alkoxy group include a cyclopentyl group, a cyclohexyl group, a cycloheptyl group and a cyclooctyl group.

The aryl group in $T^1$, $T^2$, $T^3$, $T^4$, $T^5$, $T^6$, $T^7$, $T^8$, $T^9$ and $T^{10}$ preferably has about 6 to 10 carbon atoms. Specific examples of the aryl group which may be substituted with at least one group selected from the group consisting of a hydroxyl group, an amino group which may be substituted with a C1-C4 alkyl group and a C1-C6 alkoxy group include a phenyl group and a naphthyl group.

The alkoxy group in $T^3$, $T^4$ and $T^5$ preferably has about 1 to 6 carbon atoms and specific examples thereof include a methoxy group, an ethoxy group, an n-propoxy group, an isopropoxy group, an n-butoxy group, a tert-butoxy group, an n-pentyloxy group and an n-hexyloxy group.

The alkylene and alkenylene groups in W preferably have 2 to 6 carbon atoms. Specific examples of the alkylene group include an ethylene group, a trimethylene group, a tetramethylene group, a methylenedioxy group and an ethylene-1,2-dioxy group, and specific examples of the alkenylene group include an ethene-1,2-diyl group, a 1-propene-1,3-diyl group and a 2-butene-1,4-diyl group.

Specific examples of the amine compound include n-hexylamine, n-heptylamine, n-octylamine, n-nonylamine, n-decylamine, aniline, 2-methylaniline, 3-methylaniline, 4-methylaniline, 4-nitroaniline, 1-naphthylamine, 2-naphthylamine, ethylenediamine, tetramethylenediamine, hexamethylenediamine, 4,4'-diamino-1,2-diphenylethane, 4,4'-diamino-3,3'-dimethyldiphenylmethane, 4,4'-diamino-3,3'-diethyldiphenylmethane, dibutylamine, dipentylamine, dihexylamine, diheptylamine, dioctylamine, dinonylamine, didecylamine, N-methylaniline, piperidine, diphenylamine, triethylamine, trimethylamine, tripropylamine, tributylamine, tripentylamine, trihexylamine, triheptylamine, trioctylamine, trinonylamine, tridecylamine, methyldibutylamine, methyldipentylamine, methyldihexylamine, methyldicyclohexylamine, methyldiheptylamine, methyldioctylamine, methyldinonylamine, methyldidecylamine, ethyldibutylamine, ethyldipentylamine, ethyldihexylamine, ethyldiheptylamine, ethyldioctylamine, ethyldinonylamine, ethyldidecyamine, dicyclohexylmethylamine, tris[2-(2-methoxyethoxy)ethyl]amine, triisopropanolamine, N,N-dimethylaniline, 2,6-diisopropylaniline, imidazole, benzimidazole, pyridine, 4-methylpyridine, 4-methylimidazole, bipyridine, 2,2'-dipyridylamine, di-2-pyridyl ketone, 1,2-di(2-pyridyl)ethane, 1,2-di(4-pyridyl)ethane, 1,3-di(4-pyridyl)propane, 1,2-bis(2-pyridyl)ethylene, 1,2-bis(4-pyridyl)ethylene, 1,2-bis(4-pyridyloxy)ethane, 4,4'-dipyridyl sulfide, 4,4'-dipyridyl disulfide, 1,2-bis(4-pyridyl)ethylene, 2,2'-dipicolylamine and 3,3'-dipicolylamine.

Examples of the quaternary ammonium hydroxide include tetramethylammonium hydroxide, tetrabutylammonium hydroxide, tetrahexylammonium hydroxide, tetraoctylammonium hydroxide, phenyltrimethylammonium hydroxide, (3-trifluoromethylphenyl)trimethylammonium hydroxide and (2-hydroxyethyl)trimethylammonium hydroxide (so-called "choline").

A hindered amine compound having a piperidine skeleton as disclosed in JP 11-52575 A1 can be also used as the quencher.

In the point of forming patterns having higher resolution, the quaternary ammonium hydroxide is preferably used as the quencher.

When the basic compound is used as the quencher, the present resist composition preferably includes 0.01 to 1% by weight of the basic compound based on the total amount of the polymer of the present invention and the acid generator.

The present resist composition can contain, if necessary, a small amount of various additives such as a sensitizer, a dissolution inhibitor, other polymers, a surfactant, a stabilizer and a dye as long as the effect of the present invention is not prevented.

The present resist composition is usually in the form of a resist liquid composition in which the above-mentioned ingredients are dissolved in a solvent and the resist liquid composition is applied onto a substrate such as a silicon wafer by a conventional process such as spin coating. The solvent used is sufficient to dissolve the above-mentioned ingredients, have an adequate drying rate, and give a uniform and smooth coat after evaporation of the solvent, Solvents generally used in the art can be used.

Examples of the solvent include a glycol ether ester such as ethyl cellosolve acetate, methyl cellosolve acetate and propylene glycol monomethyl ether acetate; an acyclic ester such as ethyl lactate, butyl acetate, amyl acetate and ethyl pyruvate; a ketone such as acetone, methyl isobutyl ketone, 2-heptanone and cyclohexanone; and a cyclic ester such as γ-butyrolactone. These solvents may be used alone and two or more thereof may be mixed to use.

A resist film applied onto the substrate and then dried is subjected to exposure for patterning, then heat-treated to facilitate a deblocking reaction, and thereafter developed with an alkali developer. The alkali developer used may be any one of various alkaline aqueous solution used in the art. Generally, an aqueous solution of tetramethylammonium hydroxide or (2-hydroxyethyl)trimethylammonium hydroxide (commonly known as "choline") is often used.

It should be construed that embodiments disclosed here are examples in all aspects and not restrictive. It is intended that the scope of the present invention is determined not by the above descriptions but by appended claims, and includes all variations of the equivalent meanings and ranges to the claims.

The present invention will be described more specifically by way of examples, which are not construed to limit the scope of the present invention. The "%" and "part(s)" used to represent the content of any component and the amount of any material used in the following examples and comparative examples are on a weight basis unless otherwise specifically noted. The weight-average molecular weight of any material used in the following examples is a value found by gel permeation chromatography [HLC-8120GPC Type, Column (Three Columns): TSKgel Multipore HXL-M, Solvent: Tetrahydrofuran, Detector: $R^1$ detector, manufactured by TOSOH CORPORATION] using styrene as a standard reference material.

Salt Synthetic Example 1

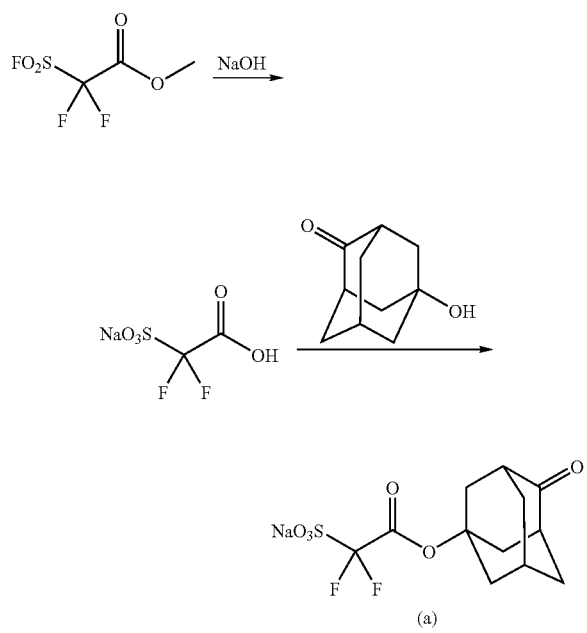

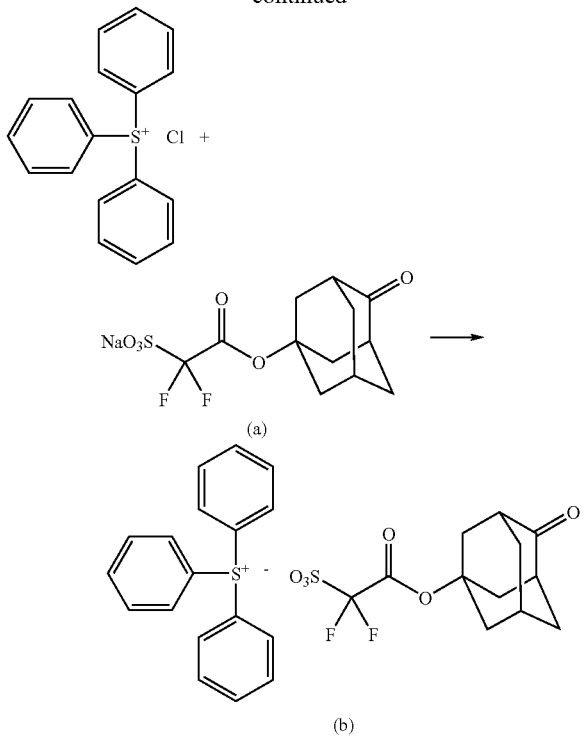

(1) Into a mixture of 100 parts of methyl difluoro(fluorosulfonyl)acetate and 250 parts of ion exchanged water in a ice bath, 230 parts of 30% aqueous sodium hydroxide solution was added. The resultant mixture was heated and refluxed at 100° C. for 3 hours. After cooling, the mixture was neutralized with 88 parts of conc. hydrochloric acid and the solution obtained was concentrated to obtain 164.8 parts of sodium salt of difluorosulfoacetic acid (containing inorganic salt, purity: 62.6%).

(2) Five point zero parts of sodium difluorosulfoacetate (purity: 62.8%), 2.6 parts of 4-oxo-1-adamantanol and 100 parts of ethylbenzene were mixed and 0.8 parts of conc. sulfuric acid was added thereto. The resultant mixture was refluxed for 30 hours. After cooling, the mixture was filtrated to obtain solids, and the solids were washed with tert-butyl methyl ether to obtain 5.5 parts of the salt represented by the above-mentioned formula (a). The purity thereof was 35.6%, which was calculated by the result of $^1$H-NMR analysis.

(3) To 5.4 Parts of the salt represented by the formula (a), which was obtained in above-mentioned (2), a mixed solvent of 16 parts of acetonitrile and 16 parts of ion exchanged water was added. To the resultant mixture, a solution prepared by mixing 1.7 parts of triphenylsulfonium chloride, 5 parts of acetonitrile and 5 parts of ion-exchanged water was added. After stirred for 15 hours, the mixture obtained was concentrated and extracted with 142 parts of chloroform. The organic layer obtained was washed with ion-exchanged water and concentrated. The concentrate obtained was washed with 24 parts of tert-butyl methyl ether and the solvent was decanted to remove to obtain 1.7 parts of the salt represented by the above-mentioned formula (b) in the form of white solid, which is called as B1.

Monomers used in the following Resin Synthetic Examples are following monomers M1, M2, M3, M4 and M5

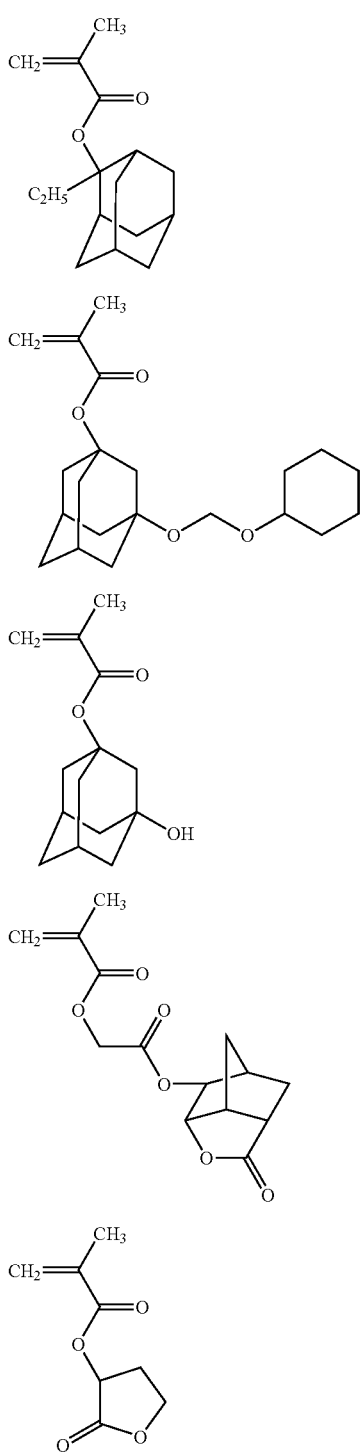

Resin Synthetic Example 1

Into a four-necked flask equipped with a thermometer and a reflux condenser, 21.97 parts of 1,4-dioxane was charged and a nitrogen gas was blown into it for 30 minutes. Under a nitrogen gas atmosphere, a solution obtained by mixing 13.40 parts of the monomer M1, 3.22 parts of the monomer M2, 2.19 parts of the monomer M3, 9.94 parts of the monomer M4, 7.87 parts of the monomer M5, 0.25 part of 2,2'-azobisisobutyronitrile, 1.15 parts of 2,2'-azobis(2,4-dimethylvaleronitrile) and 32.95 parts of 1,4-dioxane was added dropwise thereto over 1 hour at 75° C. (Monomer ratio: monomer M1/M2/M3/M4/M5=35/6/6/23/30). The resultant mixture was heated at 75° C. for 5 hours. The reaction mixture was cooled and was diluted with 40.28 parts of 1,4-dioxane. The resultant mixture was poured into a solution obtained by mixing 381 parts of methanol and 95 parts of ion-exchanged water to cause precipitation. The precipitated polymer was isolated by filtration. The polymer was mixed with 238 parts of methanol, and the resultant mixture was stirred and then filtrated to obtain a polymer. This procedure was further repeated twice. The obtained polymer was dried under reduced pressure to obtain 29.6 parts of a polymer having a weight-average molecular weight (Mw) of 8,680 and Mw/Mn of 1.94 in a yield of 81%. This polymer had the following structural units. This is called as polymer R1.

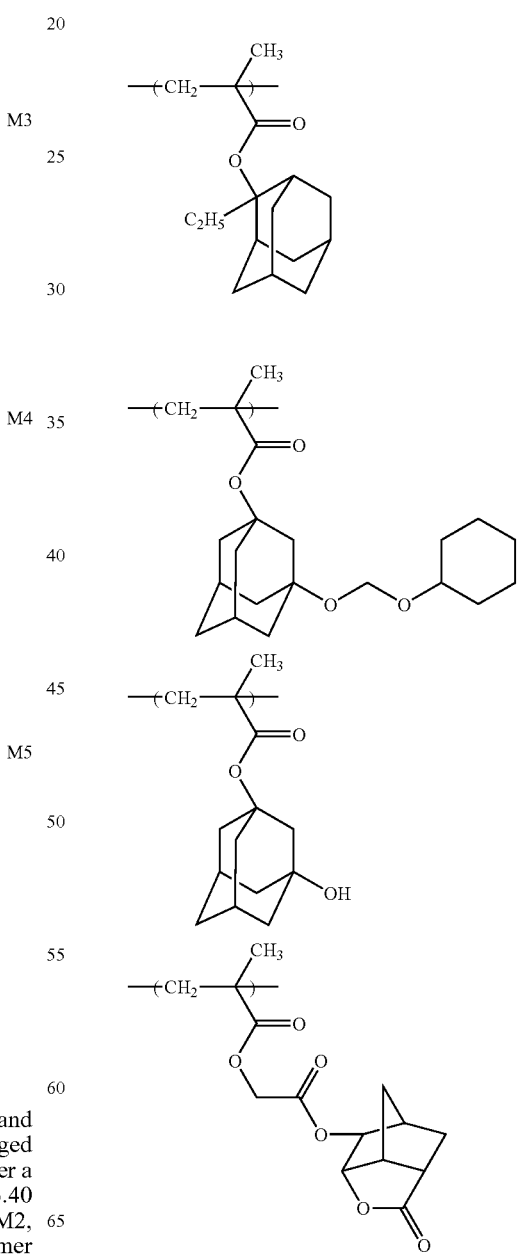

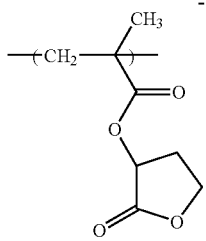

Molar ratio of the structural units in polymer R1 was as followed: Structural unit derived from monomer M1: Structural unit derived from monomer M2: Structural unit derived from monomer M3: Structural unit derived from monomer M4: Structural unit derived from monomer M5=29.0:6.5:6.5:25.0:33.0

The molar ratio of the structural units in polymer R1 was calculated based on the amounts of the unreacted monomers in the reaction mixture measured by high performance liquid chromatography analysis.

The glass transition temperature of polymer R1 was 150.1° C. The glass transition temperature of polymer R1 was measured with a differential scanning calorimeter (DSC Q1000 (TA)) by a temperature-modulated differential scanning calorimetry method.

Resin Synthetic Example 2

Into a four-necked flask equipped with a thermometer and a reflux condenser, 21.92 parts of 1,4-dioxane was charged and a nitrogen gas was blown into it for 30 minutes. Under a nitrogen gas atmosphere, a solution obtained by mixing 13.00 parts of the monomer M1, 6.25 parts of the monomer M2, 9.64 parts of the monomer M4, 7.63 parts of the monomer M5, 0.25 parts of 2,2'-azobisisobutyronitorile, 1.11 parts of 2,2'-azobis(2,4-dimethylvaleronitrile) and 32.88 parts of 1,4-dioxane was added dropwise thereto over 1 hour at 75° C. (Monomer ratio: monomer M1/M2/M4/M5=35/12/23/30). The resultant mixture was heated at 75° C. for 5 hours. The reaction mixture was cooled and was diluted with 40.18 parts of 1,4-dioxane. The resultant mixture was poured into a solution obtained by mixing 380 parts of methanol and 95 parts of ion-exchanged water to cause precipitation. The precipitated polymer was isolated by filtration. The polymer was mixed with 237 parts of methanol, and the resultant mixture was stirred and then filtrated to obtain a polymer. This procedure was further repeated twice. The obtained polymer was dried under reduced pressure to obtain 29.5 parts of a polymer having a weight-average molecular weight (Mw) of 8,790 and Mw/Mn of 1.97 in a yield of 81%. This polymer had the following structural units. This is called as polymer R2.

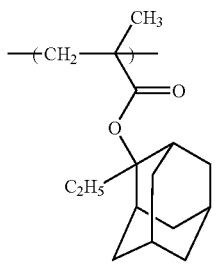

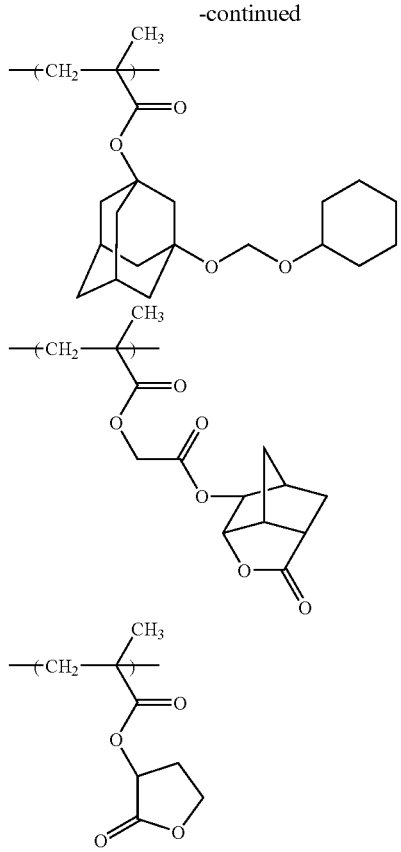

Molar ratio of the structural units in polymer R2 was as followed: Structural unit derived from monomer M1: Structural unit derived from monomer M2: Structural unit derived from monomer M4: Structural unit derived from monomer M5=28.9:13.0:25.0:33.1

The molar ratio of the structural units in polymer R2 was calculated based on the amounts of the unreacted monomers in the reaction mixture measured by high performance liquid chromatography analysis.

The glass transition temperature of polymer R2 was 139.7° C. The glass transition temperature of polymer R2 was measured with a differential scanning calorimeter (DSC Q1000 (TA)) by a temperature-modulated differential scanning calorimetry method.

Resin Synthetic Example 3

Into a four-necked flask equipped with a thermometer and a reflux condenser, 23.90 parts of 1,4-dioxane was charged and a nitrogen gas was blown into it for 30 minutes. Under a nitrogen gas atmosphere, a solution obtained by mixing 15.00 parts of the monomer M1, 4.89 parts of the monomer M3, 11.12 parts of the monomer M4, 8.81 parts of the monomer M5, 0.28 parts of 2,2'-azobisisobutyronitorile, 1.29 parts of 2,2'-azobis(2,4-dimethylvaleronitrile) and 35.84 parts of 1,4-dioxane was added dropwise thereto over 1 hour at 75° C. (Monomer ratio: monomer M1/M3/M4/M5=35/12/23/30). The resultant mixture was heated at 75° C. for 5 hours. The reaction mixture was cooled and was diluted with 43.81 parts of 1,4-dioxane. The resultant mixture was poured into a solution obtained by mixing 414 parts of methanol and 104 parts of ion-exchanged water to cause precipitation. The precipitated polymer was isolated by filtration. The polymer was mixed with 155 parts of methanol, and the resultant mixture was stirred and then filtrated to obtain a polymer. This procedure was further repeated twice. The obtained polymer was dried under reduced pressure to obtain 31.1 parts of a polymer. This polymer had the following structural units. This is called as polymer R3.

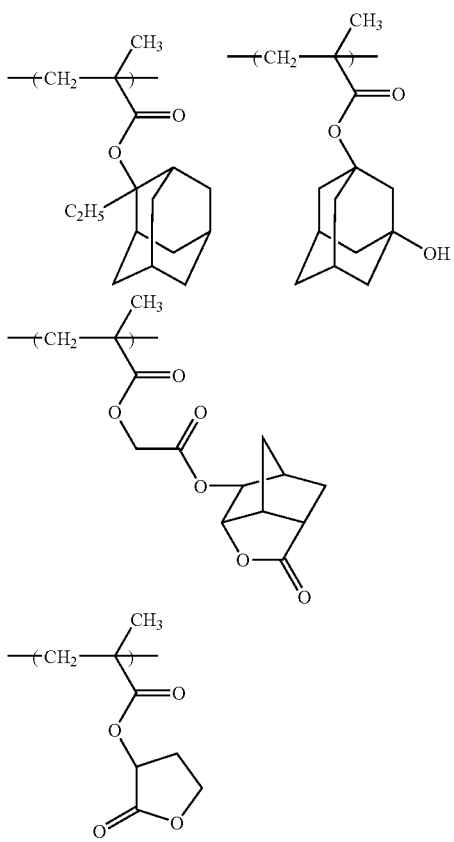

Examples 1 to 2 and Comparative Example 1

Acid Generator

Acid generator B1:

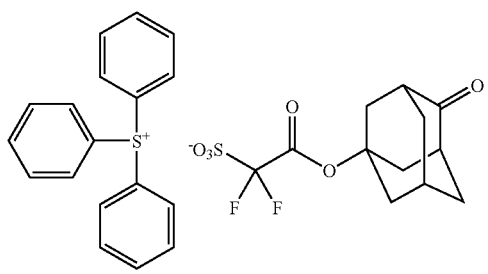

<Resin>

Polymer R1

Polymer R2

Polymer R3

<Quencher>

Q1: 2,6-diisopropylaniline

<Solvent>

| Y1: | propylene glycol monomethyl ether acetate | 140 parts |
| | 2-heptanone | 20 parts |
| | propylene glycol monomethyl ether | 20 parts |
| | γ-butyrolactone | 3.5 parts |

The following components were mixed and dissolved, further, filtrated through a fluorine resin filter having pore diameter of 0.2 μm, to prepare resist liquid.

Resin (kind and amount are described in Table 1)

Acid generator (kind and amount are described in Table 1)

Quencher (kind and amount are described in Table 1)

Solvent (kind is described in Table 1)

TABLE 1

| Ex. No. | Polymer (kind/amount (part)) | Acid generator (kind/amount (part)) | Quencher (kind/amount (part)) | Solvent |
|---|---|---|---|---|
| Ex. 1 | R1/10 | B1/0.5 | Q1/0.055 | Y1 |
| Ex. 2 | R2/10 | B1/0.5 | Q1/0.055 | Y1 |
| Comp. Ex. 1 | R3/10 | B1/0.5 | Q1/0.055 | Y1 |

Silicon wafers were each coated with "ARC-95", which is an organic anti-reflective coating composition available from Nissan Chemical Industries, Ltd., and then baked under the conditions: 215° C., 60 seconds, to form a 780 Å-thick organic anti-reflective coating. Each of the resist liquids prepared as above was spin-coated over the anti-reflective coating so that the thickness of the resulting film became 0.15 μm after drying. The silicon wafers thus coated with the respective resist liquids were each prebaked on a direct hotplate at 100° C. for 60 seconds. Using an ArF excimer stepper ("FPA5000-AS3" manufactured by CANON INC., NA=0.75, 2/3 Annular), each wafer thus formed with the respective resist film was subjected to line and space pattern exposure with mask having 1:1 line and space pattern of line width of 100 mm.

After the exposure, each wafer was subjected to post-exposure baking on a hotplate at 105° C. for 60 seconds and then to paddle development for 60 seconds with an aqueous solution of 2.38 wt % tetramethylammonium hydroxide.

Each of a resist pattern developed on the organic anti-reflective coating substrate after the development was observed with a scanning electron microscope, the results of which are shown in Table 2.

Effective Sensitivity (ES): It was expressed as the amount of exposure that the line pattern and the space pattern become 1:1 after exposure through 100 nm line and space pattern mask and development.

Line Width Roughness: The resist patterns after conducting a lithography process were observed by a scanning electron microscope, and when the wall surface is smoother than that of Comparative Example 1, its evaluation is marked by "○", when the wall surface is smooth as same as that of Comparative Example 1, its evaluation is marked by "Δ", and when the wall surface is rougher than that of Comparative Example 1, its evaluation is marked by "X".

TABLE 2

| Ex. No. | ES (mJ/cm$^2$) | Line Width Roughness |
| --- | --- | --- |
| Ex. 1 | 38 | ○ |
| Ex. 2 | 35 | ○ |
| Comp. Ex. 1 | 42 | — |

The present polymer is a novel polymer and a composition comprising the same provides good resist pattern in sensitivity and line width roughness, and is especially suitable for ArF excimer laser lithography, KrF excimer laser lithography and ArF immersion lithography.

What is claimed is:

1. A polymer comprising a structural unit represented by the formula (Ia) or (Ib):

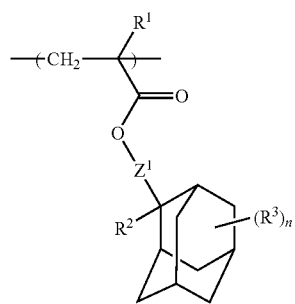

(Ia)

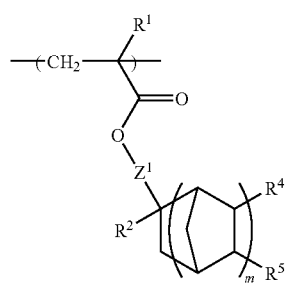

(Ib)

wherein $R^1$ represents a hydrogen atom or a methyl group, $R^2$ represents a linear, branched chain or cyclic C1-C8 alkyl group, $R^3$ represents a methyl group, n represents an integer of 0 to 14, $Z^1$ represents a single bond or —[CH$_2$]$_k$—COO—, k represents an integer of 1 to 4, $R^4$ and $R^5$ each independently represents a hydrogen atom or a C1-C8 monovalent hydrocarbon group which may have one or more heteroatoms, or $R^4$ and $R^5$ may be bonded to form a C1-C8 divalent hydrocarbon group which may have one or more heteroatoms and which forms a ring together with the adjacent carbon atoms to which $R^4$ and $R^5$ are bonded, or $R^4$ and $R^5$ may be bonded to form a carbon-carbon double bond between the carbon atom to which $R^4$ is bonded and the carbon atom to which $R^5$ is bonded, and m represents an integer of 1 to 3, a structural unit represented by the formula (II):

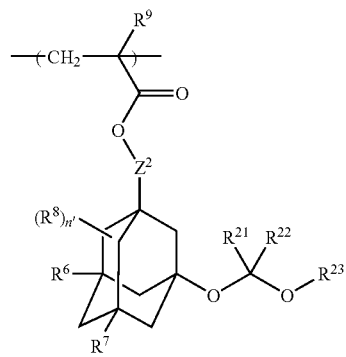

(II)

wherein $R^6$ and $R^7$ each independently represents a hydrogen atom, a methyl group or a hydroxyl group, $R^8$ represents a methyl group, $R^9$ represents a hydrogen atom or a methyl group, n' represents an integer of 0 to 12, $Z^2$ represents a single bond or —[CH$_2$]$_{k'}$—COO—, k' represents an integer of 1 to 4, $R^{21}$ and $R^{22}$ each independently represents a hydrogen atom or a C1-C4 alkyl group, and $R^{23}$ represents a C1-C30 monovalent hydrocarbon group, and at least one structural unit selected from the group consisting of structural units represented by the formulae (IIIc), (IIIb), (IIIc), (IIId) and (IIIf):

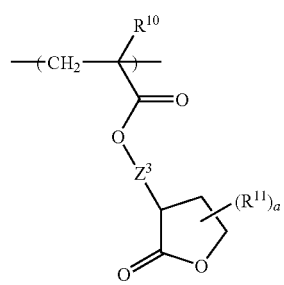

(IIIa)

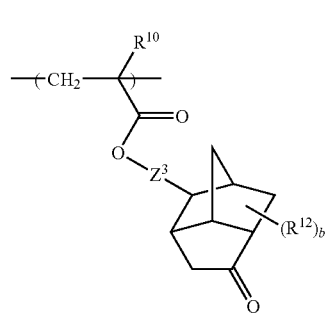

(IIIb)

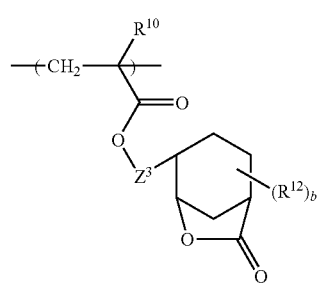

(IIIc)

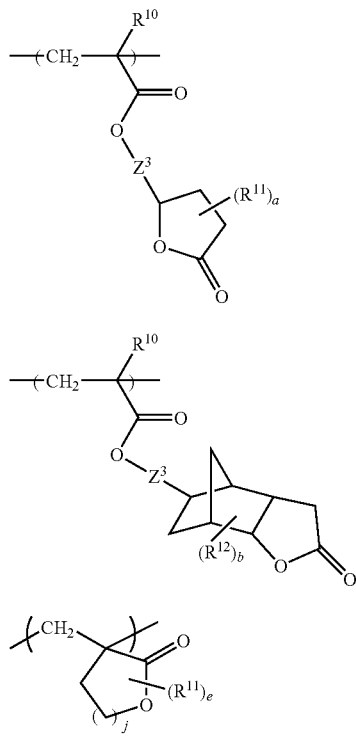

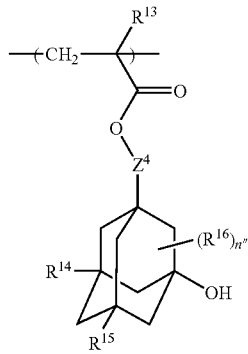

wherein $R^{10}$ represents a hydrogen atom or a methyl group, $R^{11}$ represents a methyl group, $R^{12}$ is independently in each occurrence a carboxyl group, a cyano group or a C1-C4 hydrocarbon group, j represents an integer of 0 to 3, a represents an integer of 0 to 5, b represents an integer of 0 to 3, c represents an integer of 0 to (2j+2), $Z^3$ represents a single bond or a —$(CH_2)_{k''}$—COO— group, and k" represents an integer of 1 to 4.

2. The polymer according to claim 1, wherein $R^{23}$ in the formula (II) is a C4-C10 monovalent alicyclic hydrocarbon group.

3. The polymer according to claim 1, wherein the polymer contains the structural unit represented by the formula (IIIb).

4. The polymer according to claim 1, wherein the polymer further contains the structural unit represented by the formula (IV):

wherein $R^{13}$ represents a hydrogen atom or a methyl group, $R^{14}$ and $R^{15}$ each independently represents a hydrogen atom, a methyl group or a hydroxyl group, $R^{16}$ represents a methyl group, n" represents an integer of 0 to 12, $Z^4$ represents a single bond or a —$(CH_2)_q$—COO— group, and q represents an integer of 1 to 4.

5. A chemically amplified resist composition comprising a polymer according to any one of claims 1 to 4 and an acid generator.

6. The chemically amplified resist composition according to claim 5, wherein the acid generator is a salt represented by the formula (V):

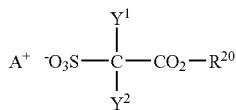

wherein $Y^1$ and $Y^2$ each independently represent a fluorine atom or a C1-C6 perfluoroalkyl group, $R^{20}$ represents a C1-C6 linear or branched chain hydrocarbon group or a C3-C30 monocyclic or polycyclic hydrocarbon group which may be substituted with at least one selected from the group consisting of a C1-C6 alkyl group, a C1-C6 alkoxy group, a C1-C4 perfluoroalkyl group, a hydroxyl group and a cyano group, and at least one —$CH_2$— in the hydrocarbon group may be substituted with —CO— or —O— or at least one hydrogen atom in the hydrocarbon group may be substituted with a hydroxyl group, and $A^+$ represents an organic counter ion.

* * * * *